United States Patent
Kerzner et al.

(10) Patent No.: US 11,640,677 B2
(45) Date of Patent: May 2, 2023

(54) NAVIGATION USING SELECTED VISUAL LANDMARKS

(71) Applicant: Alarm.com Incorporated, Tysons, VA (US)

(72) Inventors: Daniel Todd Kerzner, McLean, VA (US); Ahmad Seyfi, Tysons, VA (US); Timon Meyer, Tysons, VA (US); Donald Gerard Madden, Columbia, MD (US); Babak Rezvani, Tysons, VA (US); Glenn Tournier, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 174 days.

(21) Appl. No.: 17/071,680

(22) Filed: Oct. 15, 2020

(65) Prior Publication Data

US 2021/0110137 A1  Apr. 15, 2021

Related U.S. Application Data

(60) Provisional application No. 62/915,278, filed on Oct. 15, 2019, provisional application No. 63/051,611, filed on Jul. 14, 2020.

(51) Int. Cl.
*G06V 20/13* (2022.01)
*G06T 7/73* (2017.01)
(Continued)

(52) U.S. Cl.
CPC .............. *G06T 7/74* (2017.01); *B64C 39/024* (2013.01); *G06F 18/22* (2023.01); *G06V 10/764* (2022.01);
(Continued)

(58) Field of Classification Search
CPC ...... G06V 20/13; G06V 20/36; G06V 10/764; G06V 20/10; G06V 20/70; B64C 39/024;
(Continued)

(56) References Cited

U.S. PATENT DOCUMENTS 9,205,886 B1 * 12/2015 Hickman ............. G06Q 10/087
9,589,436 B2 * 3/2017 Herman ............... G08B 25/007
(Continued)

FOREIGN PATENT DOCUMENTS

KR   10-2019-0099165   *   8/2019 ............. G06F 3/041
WO   WO 2019/089017       5/2019

OTHER PUBLICATIONS

PCT International Search Report and Written Opinion in International Application No. PCT/US2020/055827, dated Jan. 27, 2021, 15 pages.
EP Partial Supplementary European Search Report in European Appln. No. 20877157.6, dated Nov. 17, 2022, 12 pages.
Extended European Search Report in European Appln. No. 20877157.6, dated Mar. 14, 2023, 11 pages.

*Primary Examiner* — Jerome Grant, II
(74) *Attorney, Agent, or Firm* — Fish & Richardson P.C.

(57) ABSTRACT

Methods, systems, and apparatus, including computer programs encoded on computer-storage media, for navigation using planar landmarks. In some implementations, images depicting an area of a property captured by a camera are obtained. Landmarks in the area are identified based on the images. An expected stability for each of the landmarks are determined. A map for the area is generated based on the expected stability for each of the landmarks. The map is transmitted to one or more electronic devices.

21 Claims, 10 Drawing Sheets

(51) Int. Cl.
*B64C 39/02* (2023.01)
*G06V 20/00* (2022.01)
*G06F 18/22* (2023.01)
*G06V 10/764* (2022.01)
*G06V 20/70* (2022.01)
*G06V 20/17* (2022.01)
*G06V 20/10* (2022.01)
*B64U 101/30* (2023.01)

(52) U.S. Cl.
CPC .............. *G06V 20/10* (2022.01); *G06V 20/17* (2022.01); *G06V 20/36* (2022.01); *G06V 20/70* (2022.01); *B64U 2101/30* (2023.01)

(58) Field of Classification Search
CPC .......... B64C 2201/127; B64C 2201/12; B64C 2201/123; B64C 2201/145; G06K 9/6215; G06K 9/627; G06T 7/74
USPC ........................................................ 382/103
See application file for complete search history.

(56) References Cited

U.S. PATENT DOCUMENTS

| | | | |
|---|---|---|---|
| 9,702,724 B2* | 7/2017 | O'Beirne | G01C 21/367 |
| 9,891,057 B2* | 2/2018 | Goto | G01C 21/30 |
| 9,978,238 B2* | 5/2018 | Fadell | G08B 27/003 |
| 10,698,422 B2* | 6/2020 | Tuukkanen | G01C 21/3691 |
| 11,020,860 B2* | 6/2021 | Cheuvront | G07C 5/0808 |
| 11,151,357 B2* | 10/2021 | Kim | G01C 21/206 |
| 11,280,630 B2* | 3/2022 | Gibson | G01C 21/3811 |
| 11,400,600 B2* | 8/2022 | Noh | G06V 10/80 |
| 11,416,003 B2* | 8/2022 | Whitman | G05D 1/0214 |
| 11,417,069 B1* | 8/2022 | Gupta | G06V 10/40 |
| 2013/0129194 A1* | 5/2013 | Gusis | G06T 5/50 |
| | | | 382/154 |
| 2017/0053538 A1* | 2/2017 | Samarasekera | G06V 10/811 |
| 2019/0019062 A1 | 1/2019 | Fukui | |
| 2019/0130630 A1* | 5/2019 | Ackerson | H04N 13/111 |
| 2019/0220711 A1* | 7/2019 | Taylor | G01C 11/06 |
| 2019/0259170 A1 | 8/2019 | Qi | |
| 2019/0333302 A1* | 10/2019 | Kagnew | G06Q 10/0836 |

* cited by examiner

NAVIGATION USING SELECTED VISUAL LANDMARKS

CROSS-REFERENCE TO RELATED APPLICATIONS

This application claims the benefit of U.S. Provisional Application No. 62/915,278, filed Oct. 15, 2019, and titled "NAVIGATION USING SELECTED VISUAL LANDMARKS," and U.S. Provisional Application No. 63/051,611, filed Jul. 14, 2020, and titled "NAVIGATION USING SELECTED VISUAL LANDMARKS," which are both incorporated by reference in their entirety.

TECHNICAL FIELD

The present specification relates to robotic navigation using select visual landmarks.

BACKGROUND

Typical vision-based guidance systems will attempt to create a map based on all visual features in the environment, however some of these features are not reliable. For example, an object corresponding to a visual feature may frequently change appearances, locations, etc. A robotic device attempting to navigate an area using a map containing unreliable visual features may experience a number of problems. For example, using a map containing unreliable visual features may result in the robotic device being unable to navigate the area, may result in a delayed navigation of the area as it may require the robotic device to obtain additional images and/or require additional processing of images, may result in errors in pose estimation which may lead to the robotic device experiencing a crash, etc.

SUMMARY

In some implementations, a system can generate an environment map using a subset of images collected from a property. The images may be collected using a drone or another robotic device. The system may perform scene segmentation on the subset of image to identify one or more visual landmarks of the property and/or to categorize the identified visual landmarks. The system may employ one or more machine learning techniques such as one or more classifiers to classify the visual landmarks as a particular type of physical object. The system may further identify features of one or more of the identified visual landmarks. The system can generate an environment map using the visual landmarks and/or the landmark features.

The system may determine a reliability score for each of the visual landmarks and/or the landmark features. In determining a reliability score, the system may consider the number of vantage points the feature/landmark may be viewed from, how the appearance of the feature/landmark changes from different vantage points, the maximum distance from which the feature/landmark may be viewed from, if the feature/landmark changes over time and/or how often does the feature/landmark change over time (e.g., does it move locations, is it sometimes blocked from view, etc.), the amount of parallax observed with the feature/landmark, how much uncertainty is associated with the feature/landmark, the categorization and/or classification of the visual landmark (e.g., that the feature corresponds with), etc.

The system may modify the environment map by applying a threshold landmark score and/or a threshold feature score. The system may remove any features from the environment map that have a reliability score that does not meet the threshold feature score. The system may remove any landmarks from the environment map that have a reliability score that does not meet the threshold landmark score.

In one general aspect, a method includes: obtaining images captured by a camera, the images depicting an area of a property; identifying landmarks in the area based on the images; determining an expected stability for each of the landmarks; generating a map for the area based on the expected stability for each of the landmarks; and transmitting the map to one or more electronic devices.

In some implementations, obtaining images captured by the camera includes obtaining a set of images captured by a camera of a drone flying in the property.

In some implementations, obtaining images captured by the camera includes obtaining a set of images captured from a particular location in the property, the set of images including images corresponding to different perspectives of the camera.

In some implementations, identifying the landmarks in the area includes identifying an object or a surface of an object using one or more algorithms, where the object or the surface of the object is a landmark of the landmarks.

In some implementations, identifying the object or the surface of an object using the one or more algorithms includes performing object localization on the images using at least one algorithm of the one or more algorithms to identify one or more of the following: discrete objects in the area of the property based on the images; discrete surfaces of particular objects in the area of the property based on the images; an area corresponding to discrete objects in the area of the property based on the images; or an area corresponding to discrete objects in the area of the property based on the images.

In some implementations, identifying the object or the surface of an object using the one or more algorithms includes classifying the object or the surface of an object using at least one algorithm of the one or more algorithms. Classifying the object or the surface of an object includes classifying the object or the surface of an object as belonging to a type of object, and determining the expected stability for each of the landmarks includes determining the expected stability for the object or the surface of an object based on the type of object.

In some implementations, identifying the object or the surface of an object using the one or more algorithms includes classifying the object or the surface of an object using at least one algorithm of the one or more algorithms. Classifying the object or the surface of an object includes classifying the object or the surface of an object as planar or non-planar, and determining the expected stability for each of the landmarks includes determining the expected stability for the object or the surface of an object based on the planar classification or the non-planar classification.

In some implementations, identifying the object or the surface of an object using the one or more algorithms includes performing scene segmentation on the images using at least one algorithm of the one or more algorithms to identify one or more of the following: discrete objects in the area of the property based on the images; discrete surfaces of particular objects in the area of the property based on the images; individual areas each corresponding to only a single discrete object in the area of the property based on the images; or individual areas each corresponding to only a single discrete surface of particular objects in the area of the property based on the images.

In some implementations, identifying the landmarks in the area includes identifying groupings of related surfaces.

In some implementations, identifying groupings of related surfaces includes identifying one or more of the following: surfaces that are within a threshold distance from one another; surfaces that are adjacent to one another; surfaces that are coplanar; surfaces that are observed as having the same or substantially the same color; or surfaces that are in contact with one another.

In some implementations, identifying groupings of related surfaces includes identifying groupings of surfaces that each correspond to a particular object or a portion of a particular object in the area of the property.

In some implementations, determining the expected stability for each of the landmarks includes: determining a reliability score for each of the landmarks that corresponds to consistency in location of objects or surfaces of objects over time; determining a stability score for each of the landmarks that corresponds to consistency in appearance of objects or surfaces of objects across viewpoint locations; and calculating the expected stability using the reliability score and the stability score.

In some implementations, determining the reliability score for each of the landmarks includes: determining reliability scores for features of each of the landmarks; and determining the reliability score from the reliability scores for the features of each of the landmarks.

In some implementations, determining the reliability score for each of the landmarks includes determining the reliability score for each of the landmarks based one on or more of the following: frequency that a landmark or a portion of a landmark changes position; frequency that a landmark or a portion of a landmark changes appearance; level of uncertainty associated with a landmark or a portion of a landmark; or a classification of a landmark.

In some implementations, determining the stability score for each of the landmarks includes determining the stability score for each of the landmarks based one on or more of the following: number of vantage points that a landmark or a portion of a landmark is capable of being viewed from with respect to the camera; variability in appearance of a landmark or a portion of a landmark from different perspectives of the camera or different vantage points; maximum distance from which a landmark or a portion of a landmark is capable of being viewed from with respect to the camera; magnitude of parallax observed with a landmark or a portion of a landmark; level of uncertainty associated with a landmark or a portion of a landmark; a classification of a landmark; or prevalence of planar surfaces of a landmark or a portion of a landmark.

In some implementations, determining the stability score for each of the landmarks includes determining that the landmark or a surface of the landmark is planar by: identifying a set of interest points corresponding to the landmark or to a surface of the landmark; and determining that a threshold percent of the interest points are coplanar.

In some implementations, the method includes comparing the expected stability for each of the landmarks to a minimum level of stability to identify a subset of landmarks that meet the minimum level of stability, where generating the map for the area includes: generating a map for the area that includes representations of only the landmarks in the subset of landmarks; or generating a map for the area that includes representations of the landmarks in the subset of landmarks, the representations tagged to indicate that the corresponding landmarks have a sufficient level of stability.

In some implementations, comparing the expected stability for each of the landmarks to the minimum level of stability includes: comparing reliability scores for the landmarks to a threshold reliability score to identify the subset of landmarks that meet the threshold reliability score; and comparing stability scores for the landmarks to a threshold stability score to identify the subset of landmarks that meet the threshold stability score.

The techniques disclosed in this document can be used to provide numerous improvements. Specifically, the techniques disclosed can improve vision-based guidance of robotic devices. For example, vision-based guidance of robotic devices can be improved by recording the visual features found within an environment and their geometries, determining which visual features are most stable, and generating a map of the environment using only those visual features that are sufficiently stable. By selecting only those visual features that are sufficiently stable for inclusion in the map, a robotic device that refers to the map, such as a drone, can more accurately and efficiently navigate through uncontrolled environments, such as residences, commercial properties, etc.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue of having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
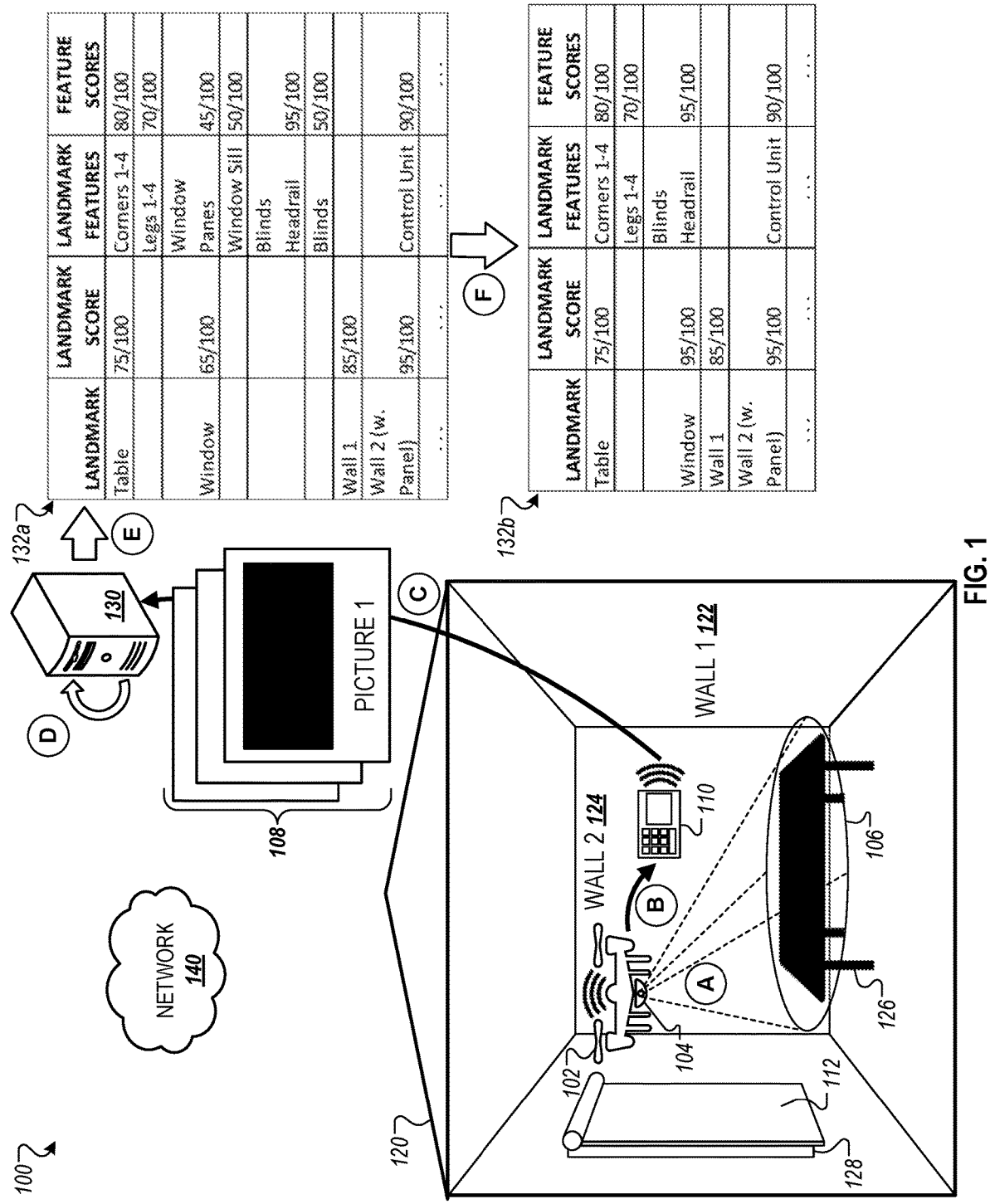
FIG. 1 is a diagram showing an example of a system for navigation using selected landmarks.

FIG. 1 is a diagram showing an example of a system 100 for determining and analyzing visual landmarks of a monitored property 120 to be used in navigating the monitored property 120. The system 100 includes a drone 102, a control unit 110, and a monitoring server 130. The system 100 may also include one or more security devices such as, for example, one or more cameras that monitor the interior and/or exterior of the monitored property 120. The system 100 may also include one or more other robotic devices, including other drones. Using the drone 102 or one or more other robotic devices, the system 100 is able to obtain images of various portions of the monitored property 120, identify visual landmarks using the obtained images, optionally identify one or more features for one or more of the landmarks, optionally assign a reliability score to the one or more landmark features, assign a reliability score to each of the identified landmarks, and filter out those landmarks whose reliability score does not meet a threshold level. The system 100 can generate an environment map for the monitored property 120 that includes those landmarks with a sufficient reliability score. The drone 102 may use the environment map containing those landmarks with a sufficient reliability score to navigate through the monitored property 120.

FIG. 1 also illustrates various events, shown as stages (A) to (F), with each representing a step in an example process for selecting visual landmarks to be used in navigation. Stages (A) to (F) may occur in the illustrated sequence, or in a sequence that is different from the illustrated sequence. For example, some of the stages may occur concurrently.

The monitored property 120 may be any residential or commercial building such as a house, an apartment complex, an office building, etc.

The monitoring server 130 may include one or more computing devices. The monitoring server 130 may also include one or more data storage devices. The monitoring server 130 may communicate with a device of an occupant of the monitored property 120 over the network 140 or over a cellular network. In some implementations, the monitoring server 130 is the monitoring server 960 shown in FIG. 9.

The security devices may include various sensors and/or equipment. For example, as shown, the security devices of the system 100 include automated blinds 112 covering the window 128. The automated blinds 112 are configured to open and close upon receiving a corresponding instruction. The system 100 may also include other security devices such as, for example, a camera for monitoring at least a portion of the interior of the monitored property 120, a camera for monitoring at least a portion of the exterior of the monitored property 120, automated interior and/or exterior lights that are configured to turn on and off upon receiving one or more corresponding instructions, etc. The cameras may include visible-light cameras, infrared-light (IR) cameras, or a combination of visible-light and IR cameras. The system 100 may include additional sensors and/or equipment.

The drone 102 is able to move around the monitored property 120 using multiple rotors. The drone 102 may include one or more sensors. These sensors may include, for example, a camera 104, one or more additional cameras, one or more light sources such as one or more light-emitting diodes (LEDs), one or more time of flight (ToF) sensors, a GPS sensor, one or more inertial sensors, one or more depth sensors, etc. The one or more inertial sensors may include one or more accelerometers and one or more rotation sensors, e.g., gyroscopes. The camera 104 may be a visible-light camera. The camera 104 may be part of a depth sensor. The camera 104 may be independently adjustable with respect to the drone 102 such that its field of view (FOV) 106 can be repositioned despite the position and/or pose of the drone 102 remaining the same. The one or more additional cameras may be visible-light cameras, IR cameras, or a combination of visible-light and IR cameras. The one or more additional cameras may be part of a depth sensor.

The drone 102 and/or the security device(s) may be able to communicate with the control unit 110. The drone 102 and/or the security device(s) may be able to communicate with the control unit 110 using a wireless connection, such as a Wi-Fi network, a cellular network, a Bluetooth network, etc. One or more of the security device(s) may be able to communicate with the control unit 110 using a wired connection.

In some implementations, the drone 102 may be able to directly communicate with one or more of the security device(s) through a wireless connection.

In some implementations, a robotic device instead of the flying drone 102 may be used to monitor the monitored property 120. In these implementations, the robotic device may be a land-based device that can navigate, for example, using one or more wheels and/or legs.

The network 140 can include public and/or private networks and can include the Internet.

In general, visual landmarks may correspond to physical objects. For example, with respect to the monitored property 120, there may be a corresponding landmark for a first wall 122 ("Wall 1"), a second wall 124 ("Wall 2"), a table 126, a window 128, and a panel of the control unit 110. There may be additional landmarks corresponding to the floor of the monitored property 120, with the other walls of the monitored property 120, with the ceiling of the monitored property 120, etc. There may be additional landmarks corresponding to security devices that are located in the monitored property 120. For example, there may be a corresponding landmark for the automated blinds 112.

As will be discussed in more detail below with respect to FIGS. 2A-2B, the environment map(s) generated and updated by the system 100 may include an indication of physical objects within the monitored property 120. These physical objects may be represented within the environment map(s) as landmarks. The landmarks may have or be associated with a location that indicates the location of the corresponding physical object within the monitored property 120. The landmarks may have or be associated with particular dimensions that match, substantially match, or estimate the dimensions of the corresponding physical object within the monitored property 120.

The techniques disclosed in this document can be used to improve vision-based guidance of robotic devices. The system 100 improves vision-based guidance by recording the visual features found within an environment and their geometries, determining which visual features are most stable, and generating a map of the environment using only those visual features that are sufficiently stable. By selecting only those visual features that are sufficiently stable for inclusion in the map, the system 100 allows for a robotic device that refers to the map, such as the drone 102, to better navigate uncontrolled environments, such as a residence.

In stage (A), the system 100 collects images that are to be later analyzed and used to either identify one or more visual landmarks or used to adjust a reliability or stability score of one or more previously identified visual landmarks. The system 100 may collect images to be added to a subset of images 108 of images through the drone 102. The system 100 may collect images to be added to a subset of images 108 of images through one or more cameras installed in the monitored property 120. The system 100 may collect images to be added to a subset of images 108 of images that cover the entirety of the interior of the monitored property 120 or cover the majority of the interior of the monitored property

120, e.g., the images may not collectively include the entire ceiling of the monitored property 120. For example, the drone 102 may collect images to be added to a subset of images 108 of images using the camera 104 and/or one or more other cameras periodically as it navigates the monitored property 120, e.g., every second, ever two seconds, every five seconds, etc. As another example, the drone 102 may collect images when the drone 102 is in a novel pose (e.g., with respect to a landmark or to a feature of the landmark) such that it does not yet have an image from that pose (e.g., an image taken from the drone 102's position and orientation, or an image taken from the drone 102's position and orientation with an onboard camera at a particular orientation) or does not have a recent image from that pose.

As another example, the drone 102 may collect an image to be added to a subset of images 108 of images using the camera 104 and/or one or more other cameras after its location has changed by a threshold amount as it navigates the monitored property 120, e.g., every foot, every two feet, every five feet, etc. In this example, the threshold amount may correspond to a longitudinal distance, a latitudinal distance, a vertical distance, or a combination thereof. In some implementations, initial collection of images may also be done by manually navigating or manipulating the drone 102, or by manually scanning the monitored property 120 (e.g., with a surrogate of the drone 102 (e.g., a smartphone), or a specialized device with higher resolution, higher accuracy, and/or different modalities of sensors.

When collecting images to be later analyzed, the drone 102 may navigate, or be instructed to navigate in a randomized pattern or in a set pattern, e.g., a stripe pattern. Navigating in a randomized pattern or a set pattern may include changes to the longitudinal position, e.g., X coordinate, of the drone 102, the transverse position, e.g., Y coordinate, of the drone 102, and/or the vertical position, e.g., Z coordinate, of the drone 102. Navigating in a randomized pattern or a set pattern may include changes to the orientation of the camera 104 and/or orientations to one or more additional onboard cameras. For example, if the drone 102 changes its vertical position, it may, in response, increase the vertical angle of its camera 104.

Navigating in a randomized or set pattern may involve the drone 102 moving to a new location taking one or more first images using the camera 104 and/or one or more other onboard cameras, adjusting its pose (e.g., by rotating) or the orientation of the camera 104 (or an orientation of one or more other onboard cameras), and taking one or more second images using the camera 104 and/or one or more other onboard cameras. This process may be repeated one or more times for any given location, e.g., three-dimensional point, before continuing to the next location. In navigating in a randomized pattern or a set pattern, the drone 102 may deviate from the pattern as needed in order to avoid objects or people.

In navigating through the monitored property 120, the drone 102 may employ techniques such as Simultaneous Location and Mapping (SLAM). SLAM is a well-known technique.

The drone 102 may also navigate based on objects it detects. For example, if the drone 102 detects an object, it may obtain one or more images of the object using the camera 104 and/or one or more other onboard cameras at a first position, may adjust its position, e.g., by changing its longitudinal, transverse, and/or vertical position, and may capture one or more additional images of the object using the camera 104 and/or one or more other onboard cameras. The drone 102 may repeat this process in order to capture multiple images of the object from various angles. As another example, if the drone 102 detects an object, it may obtain one or more images of the object using the camera 104 and/or one or more other onboard cameras at a first position, may adjust an orientation of the camera 104 and/or the orientation of one or more other onboard cameras, e.g., by adjusting a vertical and/or horizontal angle of the camera 104 and/or one or more other onboard cameras, and may capture one or more additional images of the object using the camera 104 and/or one or more other onboard cameras. The drone 102 may repeat this process in order to capture multiple images of the object from various angles.

In navigating through the monitored property 120, the drone 102 may employ relative position techniques for localization. For example, the drone 102 may use one or more inertial sensors to determine its relative position compared to a starting position, e.g., a home base. The drone 102 may additionally use visual inertial odometry by combining inertial sensors with the local movement of short-lived features in its visual field of view. As will be discussed in more detail with respect to FIG. 3, in navigating through the monitored property 120, the drone 102 may employ absolute position techniques for localization. For example, the drone 102 may use its camera 104 and one or more other sensing devices, such as a depth sensor or one or more other onboard cameras, to detect previously identified visual landmarks.

As will be discussed in more detail with respect to FIG. 3, the drone 102 may refer to a previously created environment map to identify visual landmarks and to determine its absolute position based on the visual landmarks. The environment map may be three-dimensional (3D). The previously created environment map may include a user created environment map. This user created environment map may, for example, only include the walls of the monitored property 120. This user may be an occupant of the monitored property 120 and may provide this environment map through, for example, a computing device. In this example, the drone 102 may initially use only the walls, including the first wall 122 and the second wall 124, as visual landmarks for determining its absolute position until a more robust environment map for the monitored property 120 is generated. As another example, the monitoring server 130 and/or the control unit 110 may obtain a blue print of the monitored property 120, e.g., an occupant of the monitored property 120 may upload a blue print of the monitored property 120 through a computing device. The monitoring server 130 or the control unit 110 may convert the blue print into an environment map. The environment map may be provided to the drone 102 to reference in navigating the monitored property 120.

The system 100 may collect specific images to be added to a subset of images 108 of images of previously identified visual landmarks, e.g., in order to later determine if the landmark is still present or to later determine if an appearance of the landmark has changed. For example, the drone 102 may refer to a previously generated environment map for the monitored property 120 and proceed to position itself and/or its camera 104 such that the FOV 106 encompasses a physical object that corresponds with a previously identified visual landmark. As another example, the control unit 110 may refer to a previously generated environment map for the monitored property 120 and proceed to instruct the drone 102 to navigate to a particular location and/or instruct the drone 102 to adjust the orientation of its camera 104, e.g., may provide a vertical and horizontal angle that the camera 104 should be set to, such that the FOV 106 of the camera 104 encompasses a physical object corresponding to previously identified visual landmark. In these examples, the previously generated environment map may be stored on the monitoring server 130 and accessed by the control unit 110. In these examples, the previously generated environment map may be stored on the monitoring server 130 and sent to the control unit 110 in response to a received request from the control unit 110. In these examples, the previously generated environment map may be stored on the control unit 110, e.g., the control unit 110 may store the most recently generated or updated environment map for the monitored property 120.

As shown, the drone 102 is positioned and/or its camera 104 is positioned such that the FOV 106 of the camera 104 encompasses the table 126. The drone 102 proceeds to capture an image of the table 126 using the camera 104 that is to be added the subset of images 108. The drone 102 may have taken and added the image to the subset of images 108 once it has determined that the table 126 is in its camera 104's FOV 106. The drone 102 may have taken and added the image to the subset of images 108 based on it being configured to take and add images to the subset of images 108 periodically, and/or based on its position having changed a threshold amount since it last took and added an image to the subset of images 108.

The drone 102 may associate its position, e.g., its X, Y, and Z coordinates, when it took the image with the image. The drone 102 may determine its position using, for example, an onboard GPS sensor. The drone 102 may determine its position using one or more visual landmarks. The drone 102 may determine its position using a combination of an onboard GPS sensor and one or more visual landmarks. The drone 102 may associate the orientation of the camera 104 that was used to capture the image with the image, e.g., a vertical angle of the camera 104 and a horizontal angle of the camera 104 at the time the image was taken. The drone may associate data from one or more other sensors at the time the image was taken with the image. For example, the drone may associate the image with data from one or more inertial and depth sensors taken at the time the image was taken. The drone 102 may associate the time when it took the image with the image.

In stage (B), the system 100 sends one or more of the collected images to the control unit 110. Here, the drone 102 provides the image it captures of the table 126 to the control unit 110. The drone 102 may also provide data associated with the image such as, for example, the drone 102's position at the time the image was taken, the camera 104's orientation at the time the image was taken using the camera 104, the time when the image was taken, data from an inertial sensor at the time image was taken, data from a depth sensor at the time the image was taken such as supplemental IR and RGB images, etc. The drone 102 may provide the captured image to the control unit 110 along with subsequently and/or previously captured images, e.g., images that it had previously or since taken and added to the subset of images 108. Alternatively, the drone 102 may have already provided the previously captured images that were added to the subset of images 108 to the control unit 110. For example, the drone 102 may send images that are added to the subset of images 108 to the control unit 110 right after they are captured along with any data associated with those previously captured images.

In stage (C), the system 100 sends the captured images to the monitoring server 130 to be analyzed. Here, as shown, the control unit 110 sends the subset of images 108 to the monitoring server 130 over the network 140. The subset of images 108 includes the image of the table 126 captured by the drone 102 using the camera 104.

In stage (D), the system 100 analyzes the captured images. The system 100 may analyze the images to identify one or more landmarks in the monitored property 120. The system 100 may analyze the images to identify one or more features of one or more of the identified landmarks. The system may analyze the images to generate a reliability and/or stability score for the identified landmarks. The system may analyze the images to generate a reliability and/or stability score for each of the one or more features. The system may analyze the images to update a reliability and/or stability score of one or more previously identified landmarks, and/or to update a reliability and/or stability score of one or more landmark features of a previously identified landmark. The system 100 may analyze the captured images through the monitoring server 130. For example, the monitoring server 130 analyzes each of the images in the subset of images 108 that it received from the control unit 110.

In some implementations, the system 100 generates a single or overall score for a given landmark or feature. This single score may be a reliability score that indicates how recognizable the landmark or feature is. This single score may be a stability score that indicates how consistent the landmark or feature is. In generating a stability score, the system 100 (e.g., through the monitoring server 130) may compare the current location of the landmark or feature to previous location, e.g. by accessing and analyzing stored images or stored data. The single score may be an average of the reliability score and of the stability score.

In some implementations, stability and reliability may be different scores, each with multiple dimensions. For example, a landmark corresponding to a carpet may have a very stable location in that it is unlikely to ever move, but unreliable visually because the nap changes appearance from different angles. Accordingly, the monitoring server 130 may assign a high stability score but a low reliability score to the landmark corresponding to the carpet. As another example, a coffee table book can be easy to recognize, but unlikely to be in the same place. Accordingly, monitoring server 130 may assign a low stability score but a high reliability score to the landmark corresponding to the coffee table book. In addition, the drone 102 or the monitoring server 130 may apply different thresholds to the stability and reliability scores, e.g., when determining whether to include the landmark in an environment map, determining whether to remove the landmark from an environment map, or, in the case of the drone 102, to use while navigating a property. For example, the monitoring server 130 may compare the stability score of a particular landmark with a stability threshold and may proceed to compare the reliability score of the landmark with a reliability threshold. If either landmark threshold score is not met, the monitoring server 130 may remove the landmark from the environment map that it provides to the drone 102.

In analyzing the captured images, the monitoring server 130 can generate a 3D environment map for the monitored property 120. As will be discussed in more detail below with respect to FIGS. 2A-2B, the environment map may be a three-dimensional map. In generating the environment map, the monitoring server 130 may use the collected images, e.g., the images within the subset of images 108. In generating the environment map, the monitoring server 130 may use data associated with the collected images such as, for example, the drone 102's position at the time each of the images were taken, the camera 104's orientation or an orientation of one or more other cameras at the time each the images were taken, the time when each of the images were taken, data from an inertial sensor at the time each of the images were taken, data from a depth sensor, such as supplemental IR and RGB images, at the time each of the images were taken, etc. In generating the environment map, the monitoring server 130 will reject actively moving objects as part of the bundle adjustment process. Actively moving objects may also or alternatively be rejected at the image collection time, e.g., based on comparing sequential data (such as, frame-to-frame differencing when the drone 102 is still or video taken by the camera 104 is stabilized) or using other sensors (e.g., Doppler radar/sonar, etc.). The 3D environment map may be stored on the monitoring server 130. The 3D environment map may be provided to the control unit 110 by the monitoring server 130.

In some implementations, the monitoring server 130 does not generate an environment map until it has received multiple sets of images collected over different collection periods, e.g., over different trips of the drone 102 through the monitored property 120. By using images collected over different collection periods, the monitoring server 130 can more accurately determine the reliability of physical objects within the monitored property 120. For example, by using images collected over different collection periods, the monitoring server 130 can more accurately determine which physical objects tend to change locations, which physical objects tend to change appearance, which physical objects tend to disappear, etc. The number of collection periods needed may be preset, e.g., the monitoring server 130 may require two collection periods, three collection periods, five collection periods, etc. The monitoring server 130 may require a threshold amount of time between collection periods or a range of time between collection periods. For example, the monitoring server 130 may require that a second collection period take place at least forty-eight hours after the first collection period. As another example, the monitoring server 130 may require that a second collection period take place between ten and fourteen hours after the first collection period. In this example, the monitoring server 130 may send instructions to the control unit 110 to schedule a future navigation of the drone 102 through the monitored property 120.

In some implementations, the drone 102 generates the environment map itself. In these implementations, the drone 102 may employ techniques such as Simultaneous Location and Mapping (SLAM). The environment map generated by the drone 102 may be sent to the control unit 110. The control unit 110 may then send the environment map to the monitoring server 130 over the network 140.

In analyzing the captured images, the monitoring server 130 may identify one or more visual landmarks from the captured images and/or the generated 3D environment map. In identifying one or more visual landmarks, the monitoring server 130 may employ segmentation to label areas within the captured images where physical objects are and/or what the physical objects are. Specifically, the monitoring server 130 may employ two dimensional (2D) scene segmentation, which maps each pixel to a different object or surface category, e.g., wall, floor, furniture, etc. For example, the monitoring server 130 may perform segmentation on the subset of images 108, which, as previously explained, may have been subsampled spatially or temporally as the drone 102 moved through the monitored property 120. The resultant segmentation maps would be registered to the 3D environment map used for navigation, and the results fused.

In areas where the segmentation results differ, the monitoring server 130 may associate those areas with a lower confidence of the segmentation. The monitoring server 130 may actually calculate a confidence score for each area or may make a determination as to whether an area is acceptable, e.g., due to consistent segmentation results, or is unacceptable, e.g., due to differing segmentation results. Where an area is determined to have a confidence score below a first threshold level or is deemed unacceptable, the monitoring server 130 may label the area as having low confidence or as unacceptable. As an example, segmentation results may differ in areas of the monitored property 120 where appearance varies greatly by viewing angle, where a moving object is present, or where the segmentation algorithm is untrained for the surface(s) and/or physical object(s) present. In identifying one or more visual landmarks from the environment map, the monitoring server 130 may employ 3D scene segmentation. Each physical object identified through scene segmentation may be labelled as its own visual landmark. However, identified objects that were found within an area labelled as having low confidence or labelled as unacceptable may not be considered visual landmarks. This process may help to prevent moving objects such as people, animals, robots, etc. from being identified as visual landmarks.

Here, scene segmentation may reveal the first wall 122, the second wall 124, the window 128, and the table 126 as separate visual landmarks. Scene segmentation may also reveal the panel of the control unit 110 as its own visual landmark or it may be considered a subcomponent of the second wall 124 having one or more corresponding features. Similarly, scene segmentation may also reveal the automated blinds 112 as its own visual landmark or it may be considered a subcomponent of the window 128 having one or more corresponding features.

An object corresponding to a landmark may be composed of multiple subcomponents. For example, a couch landmark may have subcomponents including cushions, legs, buttons, and trim. The landmark and/or the subcomponents of the landmark may correspond to one or more recognized features. These features may be the pixel or kernel level identifiers that are recognized in the collected images during image analysis (e.g., low level image analysis).

Scene segmentation may be limited to a select number of categories, e.g., three categories, five categories, ten categories, etc. For example, the segmentation categories may include architecture (e.g., walls, stairs, etc.), furniture, and devices. After performing segmentation on the subset of images 108, the monitoring server 130 may then rely on one or more machine learning techniques to refine the results. For example, the monitoring server 130 may then rely on a nested classification neural network, working on 2D images such as those found in the subset of images 108 or fused 3D data, in order to further define the physical objects identified during segmentation.

Here, the window 128, the first wall 122, and the second wall 124 would be categorized as architecture. The table 126 would be categorized as furniture. The panel of the control unit 110 may be categorized as a device or may be, again, considered a subcomponent of the second wall 124 having one or more corresponding features. Similarly, the automated blinds 112 may be classified as a device or may be, again, considered a subcomponent of the window 128 having one or more corresponding features.

For example, if the scene segmentation labels a patch of pixels as "furniture", that patch might be sent to a furniture classifier to gain more detail. The furniture classifier may then identify the patch of pixels as, for example, a couch, a table, a chair, etc. The furniture classifier may have been trained using one or more mathematical models of couches, tables, chairs, etc. There may be a classifier for devices. For example, a patch of pixels identified during segmentation as a device may be sent to a device classifier. The device classifier may then identify the patch of pixels as, for example, a TV, a lamp, a refrigerator, an oven, a laptop, a desktop computer, a tablet, a panel interface, window blinds, etc. The device classifier may have been trained using one or more models of various devices. There may be a classifier for architecture. For example, a patch of pixels identified during segmentation as architecture may be sent to an architectural classifier. The architectural classifier may then identify the patch of pixels as, for example, a wall, a set of stairs, a door, a window, a floor, a ceiling, a doorframe and trim, window trim, switches and outlets, corners of a room, etc. The architectural classifier may have been trained using one or more models of structures that may be present within a property. The monitoring server 130 may have obtained the mathematical models used for training the classifiers from a database over the internet.

Alternatively, the monitoring server 130 may use statistical analysis to classify the visual landmarks. For example, the monitoring server 130 may employ cross-validation techniques to identify built-in architectural features of the monitored property 120 such as room corners, doorframes and trim, windows, and/or switches and outlets.

Alternatively, patches of pixels identified during segmentation may be sent by the monitoring server 130 to a binary classifier, trained only on good landmarks versus bad landmarks. As an example, the binary classifier may be trained to recognize that objects appearing similar to tables and couches should be classified as good landmarks, e.g., since tables and couches rarely change position. In this example, the binary classifier may be trained to recognize that objects appearing similar to chairs should be classified as bad landmarks, e.g., since chairs frequently change position.

Here, using one or more classifiers or alternative approaches, the monitoring server 130 may identify the first wall 122 as a wall, the second wall 124 as a wall, the table 126 as a table, and the window 128 as a window. The panel of the control unit 110 may be identified as a panel interface or as a tablet, or may be, again, considered a subcomponent of the second wall 124 having one or more corresponding features. Similarly, the automated blinds 112 may be classified as window blinds or may be, again, considered a subcomponent of the window 128 having one or more corresponding features. Features of the window 128 and of other landmarks may also include speed up robust features (SURF) or scale-invariant feature transform (SIFT) features, or similar features derived from the initial layers of a trained convolution neural network (CNN). These more fine-grained features may be used and/or defined for objects/landmarks where the system 100 does not have the context to understand what the object is or does not yet have the context to understand what the object is. In analyzing the captured images, the monitoring server 130 may identify one or more features of one or more of the identified visual landmarks. Typically, each identified feature will belong to a single visual landmark. Each of the features may be identified with a 3D representation. For example, once a visual landmark has been classified, the monitoring server 130 may refer to a lookup table for the classification or to a model for the classification to identify one or more features that are typical for the particular classification. For example, in regards to the table 126, the monitoring server 130 may refer to a lookup table for furniture tables. The lookup table may reveal that furniture tables typically have four legs and four corners. In a similar fashion, the monitoring server 130 may identify blinds, a blind headrail, window panes, and/or a window sill as subcomponents that a window typically has and may identify corresponding features.

The monitoring server 130 may analyze the captured images and/or the results of the scene segmentation to confirm the existence of the expected features of the visual landmarks. If a feature cannot be confirmed, the monitoring server 130 may remove the feature from the corresponding landmark. For example, if the table 126 actually had three legs instead four. The monitoring server 130 may remove the features corresponding to one of the expected four legs such that the visual landmark corresponding to the table 126 includes only three legs. Similarly, the monitoring server 130 may analyze the captured images and/or the results of the scene segmentation to determine if there are any additional features that should be added to the visual landmarks. For example, the monitoring server 130 may identify the panel of the control unit 110 as a subcomponent of the second wall 124 with one or more corresponding features that were not expected based on lookup table or a model for walls.

Alternatively, the monitoring server 130 may further analyze the captured images within the set of images 108 or may analyze the scene segmentation results to identify features of one or more of the visual landmarks. For example, the monitoring server 130 may analyze the images within the set of images 108 that include the table 126 and/or may analyze the results of segmentation data with respect to the table 126 in identifying that the table has four corners and four legs. In identifying the features of one or more of the visual landmarks, the monitoring server 130 may compare a mathematical model for the class of physical object corresponding to the visual landmark, e.g., a mathematical model for a typical table for the table 126, with the captured images in the set of images 108 and/or with the segmentation data, e.g., the images in the set of images 108 that include all or a portion of the table 126 and/or segmentation data corresponding to areas where the table 126 is located. The mathematical models may be user generated and may be accessible by the monitoring server 130. The monitoring server 130 may identify the features of the visual landmark as those parts of the image(s) and/or segmentation data that are unique or are otherwise different than the mathematical model. For example, if a mathematical model for a table does not include any corners, e.g., the model is for a round table, the monitoring server 130 may recognize the four corners of the table 126 as features of the visual landmark corresponding to the table 126. In identifying the features, the monitoring server 130 may use one or more machine learning techniques such as, for example, one or more neural networks. The monitoring server 130 may use the one or more machine learning techniques to extract features from the identified visual landmarks.

In some implementations, where the monitoring server 130 has access to one or more specific pre-existing models for one or more particular objects, the monitoring server 130 may leverage a neural network to classify images (e.g., taken by the camera 104 of the drone 102) into the specific one or more models. The monitoring server 130 may then look up the dimensions of the corresponding landmark(s) using the specific model(s) to, for example, update the environment map and/or to update or generate a local model for the particular landmark(s) and, thereby, improve accuracy. For example, the monitoring server 130 may have access to and refer to a listing of 3D models for a particular brand of furniture (e.g., IKEA, La-Z-Boy, etc.). The monitoring server 130 can leverage a CNN trained to classify collected images into the 3D models. Based on the classification the monitoring server 130 may identify a landmark (e.g., a couch) within the monitored property 120 with one of the 3D models (e.g., a model for a particular couch). The monitoring server 130 may then import the 3D model into the environment map or may look up dimensions of the 3D model/corresponding object to update the environment map, update a local model for the identified landmark, and/or generate a local model for the identified landmark that is to be added to the environment map. Similar techniques may be employed for other objects where specific 3D models are available, such as standard architectural features (e.g., wall outlets) that are always or usually the same size.

In some implementations, the monitoring server 130 may not attempt to identify any features of a visual landmark. For example, the monitoring server 130 may have difficulty identifying a visual landmark, categorizing a visual landmark, or classifying a visual landmark. In these implementations, the monitoring server 130 may store raw imagery of an area containing the corresponding physical object and identify that raw imagery as the visual landmark itself. As another example, some landmarks may not have any separately identifiable features or may have features that are too small or complicated to consider, e.g., devices such as laptops, desktop computers, phones, etc.

Some features may belong to multiple landmarks. For example, the monitoring server 130 may identify two corners of the monitored property as both being features of the first wall 122 and the second wall 124, e.g., where the first wall 122 and the second wall 124 meet the floor and where the first wall 122 and the second wall 124 meet the ceiling.

In some implementations, the monitoring server 130 may store a feature as a landmark or convert a feature to a landmark. For example, in the case of a TV which may be visually difficult for the drone 102 to process or recognize (or may be difficult for the monitoring server 130 to identify, categorize, or classify) and therefore make a poor visual landmark, the monitoring server 130 may treat each corner of the frame as a separate landmark instead of as a feature of the TV. By using the edges or corners of the TV, reliance on the visually dynamic TV screen, which poses recognition problems, can be avoided. Accordingly, in building or modifying the 3D environment map, the monitoring server 130 may leave out the screen of the TV itself but would include each of the TV's corners as separate landmarks which the drone 102 could more easily identify. A similar process may be applied to a window, an open window, or a mirror, e.g., due to their fluctuating appearances. As an example, such techniques may not be employed in the case of a framed painting because it is not visually dynamic. In general, a framed painting is going to get a good landmark score because it is visible from many vantage points, it has a good amount of visual detail, and it is planar, e.g., its appearance is predictable from any angle.

In building or modifying the 3D environment map, the monitoring server 130 may, for example, initially add available mathematical models that correspond to the class of visual landmark and/or may add raw image data if a mathematical model is not available or if the monitoring server 130 experiences difficulty in identifying the visual landmark, categorizing the visual landmark, and/or classifying the visual landmark. The environment map may then be further modified to include the 3D representations of the identified features of the visual landmarks. The features may be included in the map such that they are stored with a range of potential poses and/or positions that the drone 102 could have.

The monitoring server 130 may determine a reliability score for each of the features that it identifies. The reliability score for a feature may be based on the number of vantage points the feature may be viewed from, the maximum distance from which the feature may be viewed from, if the feature changes over time and/or how often does the feature change over time (e.g., does it move locations, is it sometimes blocked from view, etc.), the amount of parallax observed with the feature, how much uncertainty is associated with the feature, the categorization and/or classification of the visual landmark that the feature corresponds with, etc.

For example, the monitoring server 130 may provide a feature a higher reliability score if the feature is recognizable, e.g., by the drone 102, from a greater distance. Similarly, the monitoring server 130 may provide a feature a higher reliability score if it is recognizable, e.g., by the drone 102, from more angles and/or different perspectives. As another example, the monitoring server 130 may provide a lower reliability score of a feature if there was low confidence in segmentation results of an area containing the physical object corresponding to the visual landmark having the feature. As another example, the monitoring server 130 may provide a higher reliability score for a feature that corresponds with a visual landmark that is categorized as architecture since the physical objects corresponding to visual landmarks in this category substantially never change position. As another example, the monitoring server 130 may provide a lower reliability score for a feature that corresponds with a visual landmark that is categorized as a device since the physical objects corresponding to visual landmarks in this category often change position. Similarly, the monitoring server 130 may provide a higher reliability score for a feature that corresponds with a visual landmark that is classified as a type of object that rarely moves. For example, a feature of couch may be provided a higher reliability score than a feature of a chair since couches change position far less frequently than chairs. As another example, the monitoring server 130 may provide a lower reliability score for a feature that corresponds with a visual landmark that is classified as a type of object that often moves. For example, a feature of chair may be provided a lower reliability score than a feature of a table since chairs change position more frequently than tables.

Here, the monitoring server 130 has determined a reliability score of 80% for each of the four corner features of the visual landmark corresponding to the table 126. The reliability score of 80% may reflect that the corners of the table 126 are viewable from most but not all vantage points and suffer from some parallax effects, e.g., the corners may be difficult to identify when the drone 102 has a vertical position that is not significantly higher than the height of the table. The monitoring server 130 has determined a reliability score of 70% for each of the four legs of the visual landmark corresponding to the table 126. The reliability score of 70% may reflect that the legs of the table 126 are viewable from many but not all vantage points and suffer from some parallax effects, e.g., the legs are not visible when the drone 102 has a vertical position that is significantly higher than the height of the table, the drone 102 may not be able to view all legs from most vantage points, etc.

The monitoring server 130 has determined a reliability score of 45% for the window panes feature of the visual landmark corresponding to the window 128. The reliability score of 45% may reflect that that the window panes are frequently hidden when the automated blinds 112 are lowered. In some cases, the reliability score for the window panes may be increased by, for example, the control unit 110 raising the automated blinds 112 every time the drone 102 began mapping and/or navigating the monitored property 120, thereby improving the likelihood that the window panes would be observable. In these cases, the monitoring server 130 may remove the blinds feature corresponding to the automated blinds 112 as they would no longer be observable. The monitoring server 130 has determined a reliability score of 50% for the window sill feature of the visual landmark corresponding to the window 128. The reliability score of 50% may reflect that that the window sill is frequently hidden, or is substantially hidden (e.g., visible from only a few vantage points), when the automated blinds 112 are lowered. In some cases, the reliability score for the window sill may be increased by, for example, the control unit 110 raising the automated blinds 112 every time the drone 102 began mapping and/or navigating the monitored property 120, thereby improving the likelihood that the window sill would be observable. In these cases, the monitoring server 130 may remove the blinds feature corresponding to the automated blinds 112 as they would no longer be observable. The monitoring server 130 has determined a reliability score of 95% for the blinds headrail feature of the visual landmark corresponding to the window 128. The reliability score of 95% may reflect that that the blinds headrail is viewable from the majority of vantage points and has a consistent appearance. Notably, the appearance of the blinds headrail is not significantly affected by whether the automated blinds 112 are in a raised or lowered position. The monitoring server 130 has determined a reliability score of 50% for the blinds feature, corresponding to the automated blinds 112, of the visual landmark corresponding to the window 128. The reliability score of 50% may reflect that that the automated blinds 112 are frequently hidden when they are in a raised position. In some cases, the reliability score for the blinds feature corresponding to the automated blinds 112 may be increased by, for example, the control unit 110 lowering the automated blinds 112 every time the drone 102 began mapping and/or navigating the monitored property 120. In these cases, the monitoring server 130 may remove the window panes feature and the window sill feature as they would no longer be observable or they would be substantially unobservable.

The monitoring server 130 has determined a reliability score of 90% for the panel of the control unit 110 feature of the visual landmark corresponding to the second wall 124. The reliability score of 90% may reflect that the panel of the control unit 110 is visible from vast majority of vantage points, does not suffer significantly from parallax effect, and/or has a consistent appearance.

The monitoring server 130 may determine a reliability score for each of the identified visual landmarks. The reliability score for a visual landmark may be a composite of the reliability score(s) of its one or more features. If a visual landmark does not have any features, the monitoring server 130 may treat the visual landmark itself as a feature in determining a reliability score for the visual landmark. For example, the monitoring server 130 may take into account the number of vantage points the visual landmark may be viewed from, the maximum distance from which the visual landmark may be viewed from, if the visual landmark changes over time and/or how often does the visual landmark change over time (e.g., does it move locations, is it sometimes blocked from view, etc.), the amount of parallax observed with the visual landmark, how much uncertainty is associated with the visual landmark, the categorization and/or classification of the visual landmark, etc.

Here, the monitoring server 130 has determined a reliability score of 75% for the table landmark corresponding to the table 126. The reliability score of 75% may have been calculated by the monitoring server 130 averaging the corresponding feature reliability scores.

The monitoring server 130 has determined a reliability score of 65% for the window landmark corresponding to the window 128. The reliability score of 65% may have been calculated by the monitoring server 130 first averaging the corresponding feature reliability scores to obtain 60%, and then adjusting the score based on the window 128 being categorized as architecture/classified as a window.

The monitoring server 130 has determined a reliability score of 85% for the first wall 122. The reliability score of 85% may reflect that the first wall 122 being categorized as architecture/being classified as a wall but having some inconsistent appearance, e.g., due to light coming through the window 128. In some cases, the reliability score for the first wall 122 may be increased by, for example, the control unit 110 lowering the automated blinds 112 every time the drone 102 began mapping and/or navigating the monitored property 120, thereby ensuring that limited light came through the window 128 and improving the consistency of the first wall 122's appearance. In these cases, the monitoring server 130 may remove the window panes feature and the window sill feature of the landmark corresponding to the window 128 as these features would no longer be observable or would be substantially unobservable. In these cases, the monitoring server 130 may also increase the reliability score of the blinds feature of the landmark corresponding to the window 128 as the automated blinds 112 would be more consistently observable. The monitoring server 130 has determined a reliability score of 95% for the second wall 124. The reliability score of 95% may reflect the high reliability score of 90% determined for the control unit 110 feature of the second wall 124 and may also reflect that the second wall 124 being categorized as architecture/being classified as a wall. Notably, the second wall 124 has a more consistent appearance than the first wall 122 as it is located adjacent to, not directly across from, the window 128, and, therefore, is not significantly affected by light coming through the window 128 or is not affected to the extent that the first wall 122 is.

The monitoring server 130 may modify a reliability score of a visual landmark based on contextual factors. For example, the monitoring server 130 may increase the reliability score provided to a visual landmark if it is categorized as architecture or if it is classified as a type of furniture that rarely moves, e.g., a couch or a table. As another example, the monitoring server 130 may decrease the reliability score provided to a visual landmark if it is categorized as an article or device, or if it is classified as a type of object that frequently moves or frequently changes appearance, e.g., a magazine, a TV, a tablet, a chair, etc. In some implementations, the monitoring server 130 may determine a reliability score of a visual landmark based only on contextual factors.

In determining a reliability score of a visual landmark, the monitoring server 130 may obtain a preset reliability score for the class of landmark that the visual landmark belongs to and then may modify the reliability score based on, for example, the various factors mentioned above. For example, table landmarks may have a preset reliability score of 70%. The monitoring server 130 may determine that because the table 126 has corner features, e.g., it is not a round table, then it is easier to identify from farther away, from more vantage points, etc.

The monitoring server 130 may adjust or modify the reliability score for a particular feature or for a visual landmark overtime. For example, the monitoring server 130 may obtain views from secondary cameras, such as a security camera, installed in the monitored property 120. The monitoring server 130 may use these views to determine the reliability of particular landmarks and/or features of landmarks over time and adjust the reliability scores for the particular landmarks and/or features of landmarks accordingly. For example, using these views, the monitoring server 130 may be able to determine how often the appearance of a particular landmark or feature changes, how often a particular landmark or feature changes locations, etc. Fixed secondary cameras may provide the benefit of being able to easily record footage of the same area of the monitored property 120 over time. In addition, data collected by one or more secondary cameras, light sensors, or cameras integrated with light sensors may be used by the monitoring server 130 to determine lighting changes in the monitored property and how these changes affect the reliability, e.g., the observability, of the various visual landmarks and their features.

As another example, the monitoring server 130 may obtain additional subsets of images collected by the drone 102 during later flights through the monitored property 120. These additional subsets of images may be used by the monitoring server 130 to determine the reliability of particular landmarks and/or features of landmarks over time and adjust the reliability scores for the particular landmarks and/or features of landmarks accordingly.

In stage (E), the monitoring server 130 can generate or update a table 132. The table 132 includes, for example, a listing of all of the identified landmarks and features in the monitored property 120 that are included in the 3D environment map of the monitored property 120. The table 132 may start as a preset table. For example, the table 132 may initially contain a listing of the expected reliability of each class of landmark, e.g., table landmarks may have a preset reliability score of 70%, windows may have a preset reliability score of 80%, walls may have a preset reliability score of 95%, etc. In this example, the table 132 could be learned from observation across many properties (e.g., properties in addition to the monitored property 120), and used to obtain reliability scores for a new property's landmarks. The reliability of each landmark can then fine-tuned as the monitoring server 130 observes the actual stability, in terms of both appearance and location, of each landmark in the specific property over time and multiple observation.

As shown, the monitoring server 130 has updated the table 132a using the reliability scores it determined for the visual landmarks of the monitored property 120 and their corresponding features.

In stage (F), the monitoring server 130 may apply a threshold score to the identified features and/or the visual landmarks. For example, the monitoring server 130 may compare the reliability scores for each of the features with a threshold feature score. The threshold feature score may be selected automatically or may be set by a user of the monitoring server 130. If the reliability score for a feature does not meet the threshold feature score, the monitoring server 130 may remove the feature from the 3D environment map. This is to ensure that the drone 102 will only rely on those features that are sufficiently stable when navigating through the monitored property 120 using the environment map.

Here, the monitoring server 130 has applied a threshold of greater than 50%. Accordingly, any features that had a reliability score not greater than 50% were removed from the 3D environment map. The monitoring server 130 may proceed to update the table 132b to reflect the landmarks and features that remain in the 3D environment map of the monitored property 120.

If a landmark has a single feature having a reliability score that does not meet the threshold feature score, the monitoring server 130 may either remove the landmark entirely from the 3D environment map, compare the reliability score of the landmark itself with the threshold feature score (e.g., since a landmark may have a higher reliability score than its single feature due to its classification/categorization), or may compare the reliability score of the landmark with a separate threshold landmark score. As an example, the landmark may be removed from the 3D environment map if its reliability score does not meet the threshold feature score of 50% or if its reliability score does not meet a separate landmark score.

As shown, the window panes feature, the window sill feature, and the blinds feature of the landmark corresponding to the window 128 have each been filtered out and removed from the environment map. Accordingly, the landmark corresponding to the window 128 has the blinds headrail as the only feature remaining in the 3D environment map.

Once the features with reliability scores that did not meet the threshold feature score have been filtered out, the monitoring server 130 may recalculate the reliability scores of one or more of the landmarks while taking into consideration the one or more features that have been removed. This will generally result in landmarks obtaining increased reliability scores. For example, the monitoring server 130 may update a reliability score for each of the visual landmarks whose reliability score was at least partially based on the reliability score(s) of its one or more features. As shown, the reliability score of the landmark corresponding to the window 128 was recalculated using only the blinds headrail featured. As a result, the reliability score of the landmark corresponding to the window 128 was increased from 65% to 95% due to the blinds headrail feature having a reliability score of 95%.

In some implementations, the monitoring server 130 may apply a threshold landmark score to the landmarks. The monitoring server 130 may apply the threshold landmark score in addition to the threshold feature score or in place of the threshold feature score. The threshold landmark score may be the same as the threshold feature score or higher than the threshold feature score. As an example, the threshold landmark score may be applied to the landmarks in the table 132b after the threshold feature score has been applied to the features in the table 132a. Any landmarks having a reliability score that does not meet the threshold landmark feature score may be removed from the 3D environment map by the monitoring server 130. In response to filtering out one or more landmarks, the table 132b may be updated by the monitoring server 130.

Figure 2A:
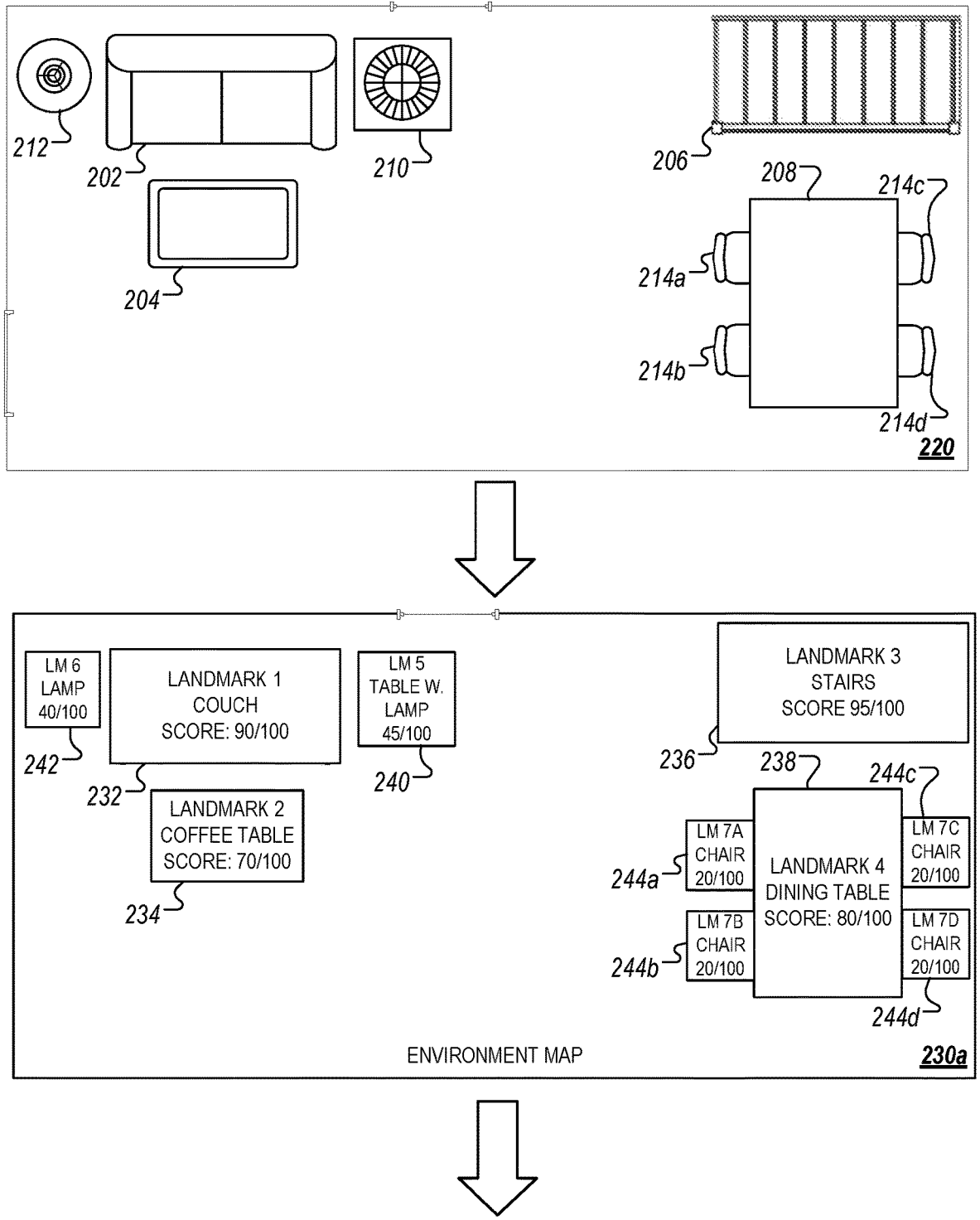
FIGS. 2A and 2B show example diagrams for generating an environment map for a property.
Figure 2B:
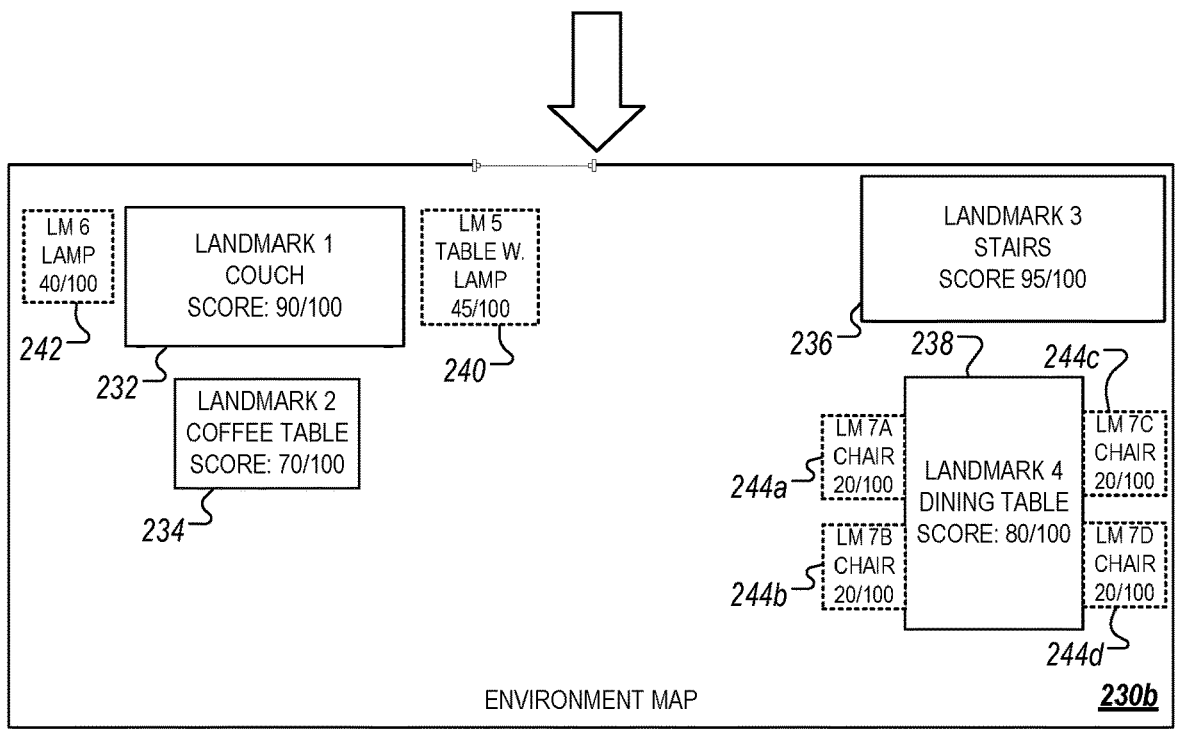
Figure 2B:
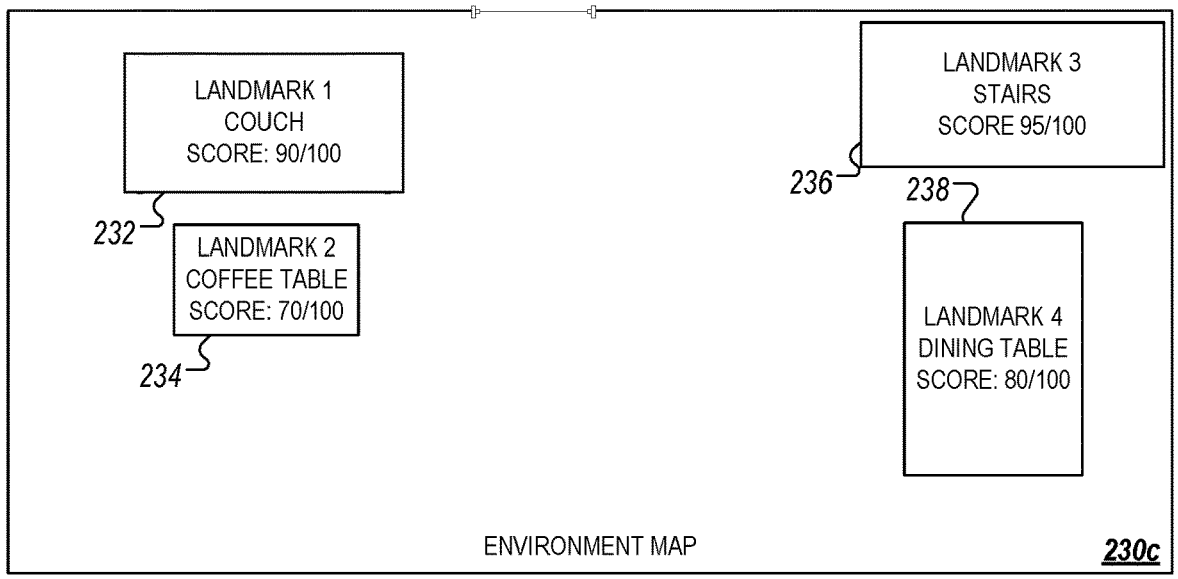

FIGS. 2A and 2B shown an example diagram for generating an environment map 230 for a property.

In FIG. 2A, a floor 220 of a monitored property contains various physical objects. These objects include a couch 202, a coffee table 204, stairs 206, a dining table 208, a side table with lamp 210, a lamp 212, and chairs 214a-d.

The drone 102 shown in FIG. 1 and/or one or more secondary cameras may take a subset of images of the floor 220 that include the physical objects within the floor 220. The monitoring server 130 may use these images to identify a visual landmark for each physical object within the floor 220 in accordance with the methods discussed above with respect to FIG. 1. The monitoring server 130 may determine a reliability score for each of the identified landmarks and/or features of the landmarks in the methods described above with respect to FIG. 1.

Using the images collected of the floor 220 and the identified landmarks, the monitoring server 130 may produce an environment map 230a containing an indication of each of the landmarks and a determined reliability score corresponding to each of the landmarks. The environment map 230a may be a 3D map.

As shown, the environment map 230a contains a landmark 232 corresponding to the couch 202 and having a reliability score of 90%, a landmark 234 corresponding to the coffee table 204 and having a reliability score of 70%, a landmark 236 corresponding to the stairs 206 and having a reliability score of 95%, a landmark 238 corresponding to the dining table 208 and having a reliability score of 80%, a landmark 240 corresponding to the side table with lamp 210 and having a reliability score of 45% (e.g., a low score since its appearance changes frequently as the lamp is turned on and off), a landmark 242 corresponding to the lamp 212 and having a reliability score of 40% (e.g., a low score since its appearance changes frequently as the lamp 212 is turned on and off, and a lower score than the landmark 240 because, unlike the landmark 240, it not combined with a table that has a more consistent location and appearance), and landmarks 244a-d corresponding to chairs 214a-d respectively and each having a reliability score of 20%.

In FIG. 2B, the monitoring server 130 shown in FIG. 1 may apply a threshold landmark score to the landmarks in the environment map 230b. Here, the monitoring server 130 may apply a threshold landmark score of 50% to the landmarks in the environment map 230b. As shown, the monitoring server 130 may identify those landmarks having a reliability score that does not exceed the threshold landmark score of 50%. Here, the monitoring server 130 has identified the landmark 240 which as reliability score of 45%, the landmark 242 which as reliability score of 40%, and the landmarks 244a-d which each have a reliability score of 20%.

After applying the threshold landmark score of 50% and identifying those landmarks which do not meet the threshold landmark score, the monitoring server 130 shown in FIG. 1 may remove the identified landmarks from the environment map 230c. As shown, the monitoring server 130 has removed the landmark 240, the landmark 242, and the landmarks 244a-d from the environment map 230c. The environment map 230c now only includes the landmarks 232-238.

As a result of removing the landmarks that did not meet the threshold landmark score, the monitoring server 130 shown in FIG. 1 produces a completed environment map 230c which may be provided to the drone 102 shown in FIG. 1. The drone 102 may refer to the environment map 230c in navigating through the floor 220 shown in FIG. 2A. Because the environment map 230c only contains those landmarks having a sufficiently high reliability score, the environment map 230c is more trustworthy and the drone 102 is less likely to experience errors during navigation caused by, for example, unreliable, unobservable, or unrecognizable visual landmarks.

Figure 3:
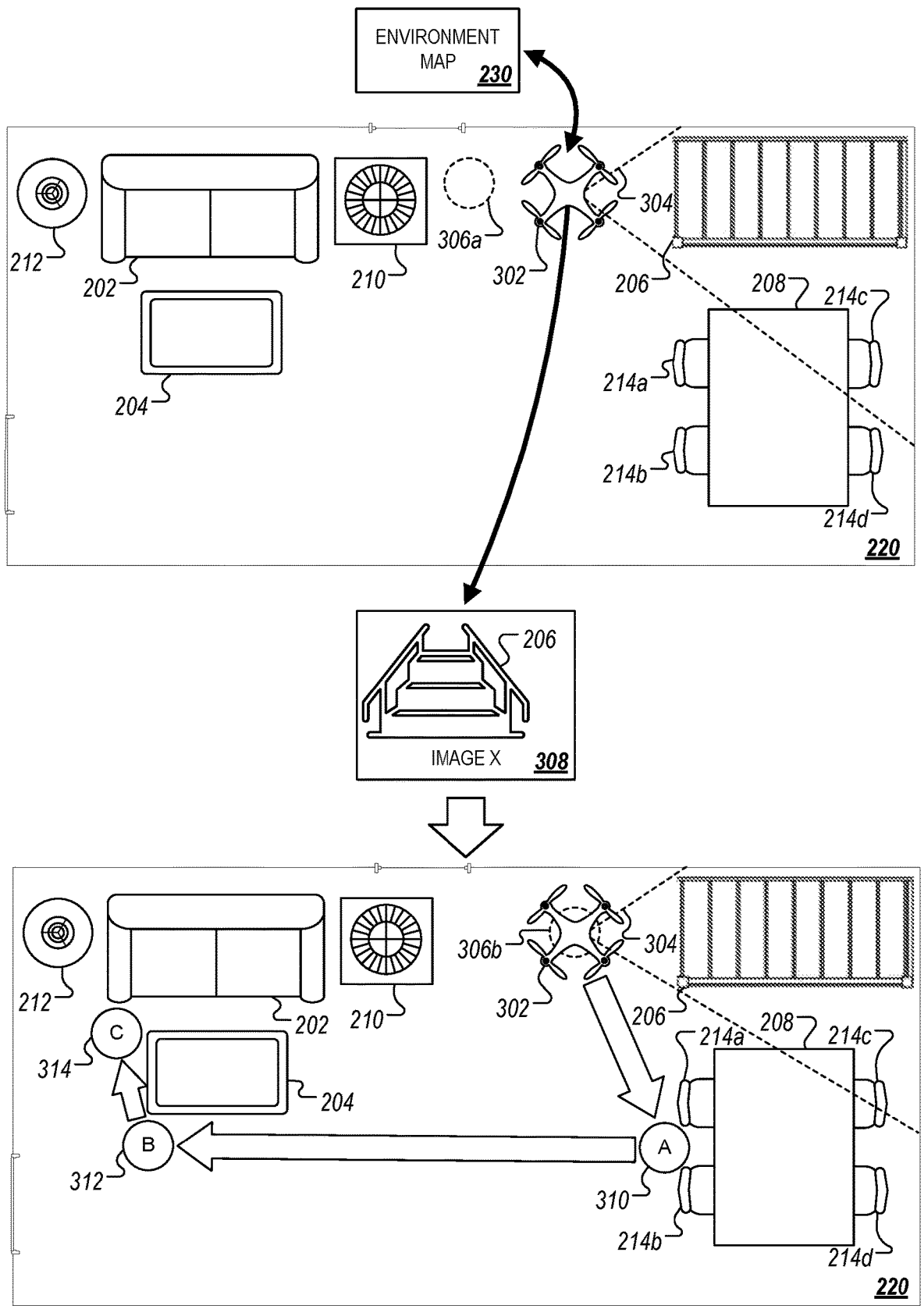
FIG. 3 is a diagram showing an example process for navigating through a property using an environment map.

FIG. 3 is a diagram showing an example process for navigating through a property using an environment map 230. A drone 302 can navigate through the floor 220 of a property using an environment map 230. As discussed above, the floor 220 contains various physical objects. These objects include the couch 202, the coffee table 204, the stairs 206, the dining table 208, the side table with lamp 210, the lamp 212, and the chairs 214a-d.

In navigating through the floor 220, the drone 302 may employ relative position techniques for localization. For example, the drone 302 may use one or more inertial sensors to determine its relative position compared to a starting position, e.g., a home base. However, relative position techniques are prone to errors such that the drone 302 may think that it is at a particular location on the floor 220 but is actually at a different location. These errors may get worse the longer the drone 302 is in flight and/or the more distance that the drone 302 has travelled in navigating the floor 220.

Here, the relative position errors have resulted in the drone 302 believing it is at the location 306a when it is actually at the location shown. The drone 102 can access and/or be provided the environment map 230 for the floor 220. The drone 302 may use the environment map 230 for localization. For example, the drone 302 may use the environment map 230 to determine its absolute position.

In determining its absolute position, the drone 302 may refer to the environment map 230 to identify those landmarks with the highest reliability score that are observable from where the drone 302 believes it is located, e.g., observable from the location 306a. For example, the drone 302 may not consider the landmark 234 corresponding to the coffee table 204 as it may, incorrectly, determine, based on the environment map 230 and its believed location 306a, that the couch 202 and/or the table with lamp 210 would significantly obscure any images that it would take of the coffee table 204. Here, due to the landmark 236 corresponding to the stairs 206 having the highest reliability score of 95% as shown in FIGS. 2A-2B, the stairs 206 being located within an observable range of an onboard camera of the drone 302 from the location 306a, and/or the environment map indicating that the stairs 206 are unobstructed from the vantage point of the location 306a, the drone 302 may attempt to determine its absolute position by using the landmark 236.

In using the landmark 236 to determine its absolute position, the drone 302 may position one or more of its onboard cameras towards the stairs 206 based on its believed location 306a. For example, the drone 302 may change its pose or may change a horizontal and/or angle of an onboard visible-light camera having an FOV 304 such that the FOV 304 of the onboard camera is directed to the stairs 206 if the drone 302 were actually positioned at the location 306a. Due to the drone 302's actual location not being the same as its believed location 306a, the FOV 304 is slighted skewed to the right such that the stairs 206 are not perfectly centered in the FOV 304.

Once the drone 302 has positioned itself or its one or more onboard cameras towards where it expects the landmark 236 shown in FIGS. 2A-2B to be located, the drone 302 may capture one or more images including an image 308 ("Image X"). As shown, the image 308 includes the stairs 206. The drone 302 may compare the image 308 with the environment map 230. Specifically, the drone 302 may compare the image 308 with the landmark 236 in the environment map 230 and any features associated with the landmark 236. In comparing the image 308, the drone 302 may identify the landmark 236 within the image 308 and/or the features of the landmark 236 within the image 308. In comparing the image 308, the drone 302 may identify an expected location of the landmark 236 and/or one or more features of the landmark 236 with an actual location of the landmark 236 and/or one or more features of the landmark 236 based on the image 308. The drone 302 may use the difference between the expected location of the landmark 236 and the actual location of the landmark 236, and/or the expected location of one or more features of the landmark 236 with the actual location of one or more features of the landmark 236, to determine its absolute position 306b.

After the drone 302 has determined its absolute position 306b, the drone 302 may refer to the environment map in order to map a route through the floor 220. The drone 302 may select the route such that one or more landmarks will be observable and/or unobstructed along the entirety of the route or at certain points along the route. The drone 302 may select one or more positions along the route when it should check its absolute position. For example, the drone 302 may determine a route from its current position at 306b to a second position 310 ("Position A") which is located next to the landmark 238 shown in FIGS. 2A-2B, a third position 312 ("Position B") that is located next to the landmark 234 shown in FIGS. 2A-2B, and a fourth position 314 ("Position C") that is located next to the landmark 232 shown in FIGS. 2A-2B.

The second position 310 may correspond to a point where the landmark 238 shown in FIGS. 2A-2B is observable and/or unobstructed from the view of at least one camera of the drone 302. Where the drone 302 navigates between the positions 306b and 310 through relative position techniques, the drone 302 may determine its absolute position when it estimates that it has reached the second position 310 using the landmark 238. When the drone 302 determines its absolute position, it may either attempt to navigate to the actual second position 310 before proceeding to the third position 312, or may adjust its route and move directly towards the third position 312.

The third position 312 may correspond to a point where the landmark 234 shown in FIGS. 2A-2B is observable and/or unobstructed from the view of at least one camera of the drone 302. Where the drone 302 navigates between the positions 310 and 312 through relative position techniques, the drone 302 may determine its absolute position when it estimates that it has reached the third position 312 using the landmark 234. When the drone 302 determines its absolute position, it may either attempt to navigate to the actual third position 312 before proceeding to the fourth position 314, or may adjust its route and move directly towards the fourth position 314.

The fourth position 314 may correspond to a point where the landmark 232 shown in FIGS. 2A-2B is observable and/or unobstructed from the view of at least one camera of the drone 302. Where the drone 302 navigates between the positions 312 and 314 through relative position techniques, the drone 302 may determine its absolute position when it estimates that it has reached the fourth position 314 using the landmark 232. When the drone 302 determines its absolute position, it may either attempt to navigate to the actual fourth position 314 before proceeding with its navigation of the floor 220, or may adjust its route and proceed with its navigation of the floor 220.

While navigating through the floor 220, the drone 302 may modify the environment map 230 by, for example, updating reliability scores of landmarks and/or landmark features. The drone 302 may update the reliability score of a particular landmark based on whether it could be detected, based on the distance the drone 302 was from the landmark when the landmark was detected, based on an orientation/position/pose of the drone 302 when the landmark was detected, and/or based on a position of an onboard camera of the drone 302 when the landmark was detected. For example, if the drone 302 was only able to detect the landmark within a short distance (e.g., less than 1 m, less than 0.5 m, less than 1 ft, etc.), then the drone 302 may lower a reliability score of the landmark. As another example, if the drone 302 was only able to detect the landmark from a limited number of orientations/positions/poses, then the drone 302 may lower the reliability score of the landmark. The drone 302 may update the reliability score of a particular landmark feature based on whether the feature could be detected, based on the distance the drone 302 was from the landmark feature when the feature was detected, based on an orientation/position/pose of the drone 302 when the feature was detected, and/or based on a position of an onboard camera of the drone 302 when the feature was detected.

If the drone 302 lowers the reliability score of a landmark below a threshold landmark score, the drone 302 or the monitoring server 130 shown in FIG. 1 may remove the landmark from the environment map 230. The drone 302 may then access and/or refer to the updated environment map 230. Similarly, if the drone 302 lowers the reliability score of a feature below a threshold feature score, the drone 302 or the monitoring server 130 may remove the feature from the environment map 230. The drone 302 may then access and/or refer to the updated environment map 230. The drone 302 or the monitoring server 130 may also update a reliability score for the corresponding landmark. If the feature removed was the only feature of the landmark, the drone 302 or the monitoring server 130 may also remove the landmark from the environment map 230. However, the monitoring server 130 may retain knowledge of this landmark or a different version of the environment map 230 having all landmarks (including those that were removed), while the drone 302 only gets a version of the environment map 230 with the landmarks that met a certain threshold. For example, with respect to FIGS. 2A-2B, the monitoring server 130 may retain the environment map 230a having all landmarks while the monitoring server 130 may provide the drone 302 only the environment map 230c having only those landmarks that scored above a certain threshold.

In some implementations, the threshold for a landmark to be in the drone 302's version of the environment map may be lower than the threshold to use that landmark (e.g., for navigation purposes), which enables the drone 302 to update landmarks that may be borderline useful. For example, with respect to FIGS. 2A-2B, the drone 302 may receive a version of the environment map 230 containing the landmarks 232, 234, 236, 238, and 240 after applying a first threshold score of 42%. However, the drone 302 may only use the landmarks 232, 234, 236, and 238 in navigating the floor 220 after applying a second threshold score of 65%.

In some implementations, removed landmarks may be marked (e.g., by the monitoring server 130) with a confidence value. For example, the monitoring server 130 or the drone 302 may mark a removed landmark with 75% confidence value, and increase or decrease this value over time with repeated observations or data from other sensors. As previously mentioned, the drone 302 may be provided an indication of some or all of the removed landmarks (e.g., based on the confidence value of those removed landmarks) so that the drone 302 does not assume that the landmark is not there and then runs into it.

In some implementations, the drone 302, the control unit 110, and/or the monitoring server 130 keeps a history of removed landmarks in electronic storage. Such a history may be helpful for cases where a removed landmark corresponds with an object that may return to a previous location, or an object that remains in a previously identified location but is currently obscured by something else. For example, there may be a chair that is placed against a wall of a property 364 days a year, and then moved to the table for Thanksgiving. Due to the chairs movement (and possibly due to other considerations such as the object being a chair), the drone 302, the control unit 110, or the monitoring server 130 may decrease the landmark score of the chair to the point that it is removed from an environment map for the property. In that case, we would want to keep the landmark corresponding to the chair in electronic storage. After Thanksgiving when the chair is moved back to its original location, the landmark may be retrieved and added to the environment map for the property.

While navigating through the floor 220, the drone 302 may collect additional images to be used in later analysis. For example, the drone 302 may collect additional images to be used by the monitoring server 130 to identify one or more landmarks, to identify one or more landmark features, to update a reliability score of one or more landmarks, to update a reliability score of one or more landmark features, etc. In collecting additional images, the drone 302 can generate a subset of images that are subsampled spatially or temporally as the drone 302 navigates through the floor 220. Additional image collection is triggered by the drone 302 being unable to detect a high number of features, e.g., being unable to detect 30% or more of the landmark features in the environment map 230, being unable to detect 50% or more of the landmark features in the environment map 230, being unable to detect 70% or more of the landmark features in the environment map 230, being unable to detect 70% or more of the features of a particular landmark, being unable to detect 80% or more of the features of a particular landmark, etc. When collecting additional images, the drone 302 may limit the areas of the floor 220 where it collects images from. For example, the drone 302 may only collect images from areas in the floor 220 containing landmarks and/or landmark features that it is having trouble detecting. As another example, the drone 302 may only collect images from areas in the floor 220 associated with low confidence scores during the segmentation process described above with respect to FIG. 1.

In some implementations, if the drone 302 is not able to detect enough quality landmarks to complete a navigation path, then one or more actions are triggered. These one or more actions may include lowering score thresholds, prompting users to confirm stability of landmarks or to place synthetic markers, etc.

Figure 4:
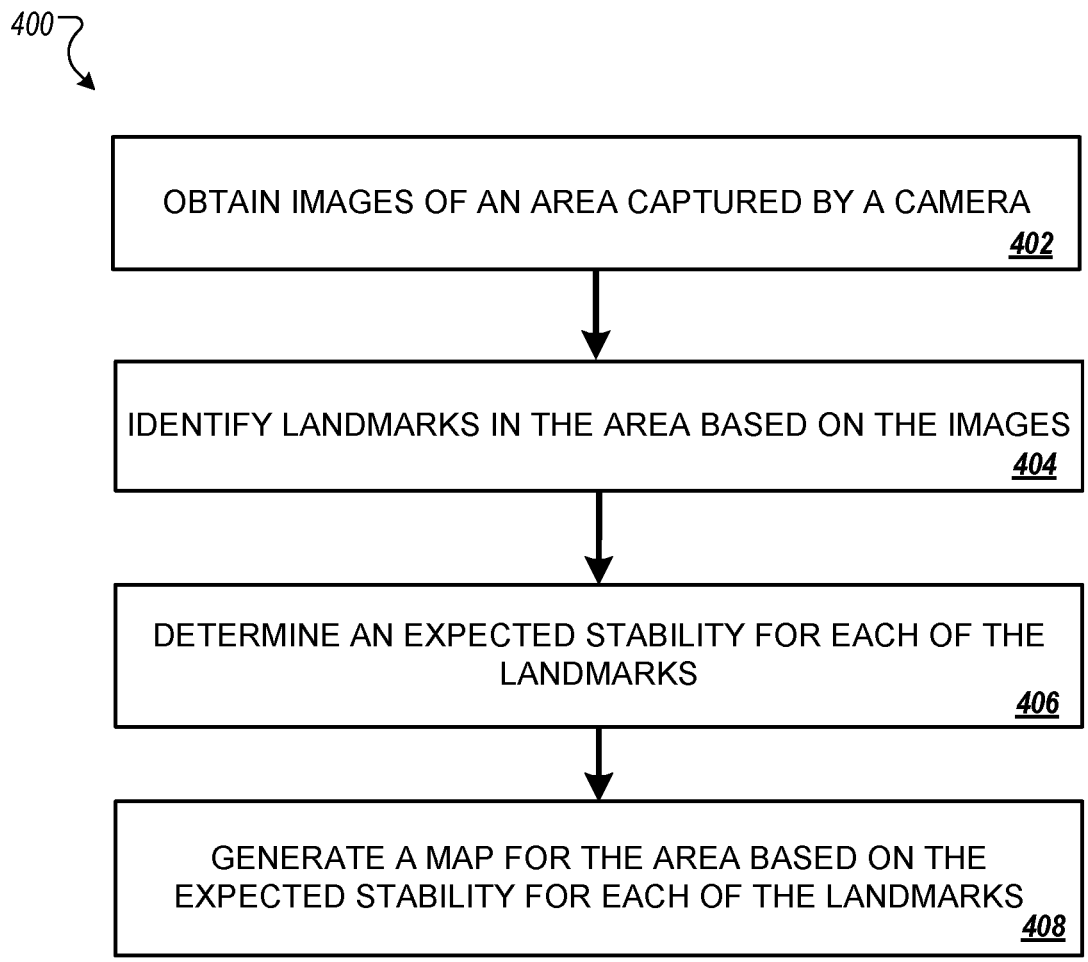
FIG. 4 is a flowchart of an example process for generating an environment map to be used in visual navigation.

FIG. 4 is a flowchart of an example process 400 for generating an environment map to be used in visual navigation. The process 400 can be performed, at least in part, using the system 100 described in FIG. 1 or the monitoring system 900 described in FIG. 9.

The process 400 includes obtaining images of an area captured by a camera (402). For example, as shown in FIG. 1, the drone 102 may collect images of the monitored property 120 using an onboard camera 104. The onboard camera 104 may be, for example, a visible-light camera, an infrared-light camera, or a time-of-flight camera. The drone 102 may provide a subset of images 108 that it collected to the control unit 110. In turn, the control unit 110 may provide the subset of images 108 to the monitoring server 130. Similarly, the monitoring server 130 may obtain the images from the drone 102 collected using the onboard camera 104, and/or from one or more other cameras.

The area of the property may be a room of the property, a floor of the property, or other portion of a property. In some cases, the images captured depict the entire property (e.g., where the property has a single floor, has a single room, etc.).

In some cases, obtaining images captured by the camera includes obtaining a set of images captured by a camera of a drone flying in the property. For example, with respect to FIG. 1, the set of images may be captured by the drone 102 while it is in flight and navigating through the property 120. Additionally or alternatively, the set of images or a portion of the set of images may be captured by other devices. For example, all or a portion of the set of images may be captured using cameras installed in the property. As another example, all or a portion of the set of images may be captured using a different type of robotic device such as a land-based robotic device that navigates through the use of wheels, tracks, and/or legs.

In some cases, obtaining images captured by the camera includes obtaining a set of images captured from a particular location in the property. For example, the set of images may be captured while the drone 102 is in a particular location of the property 120. Specifically, the drone 102 may hover in substantially one location in the property 120 as it captures the set of images. The set of images may include images corresponding to different perspectives of the camera. For example, the drone 102 may capture images in the set of images while changing its orientation. The drone 102 may change its orientation by rotating, leaning up (e.g., by increasing the thrust applied to two propellers, and/or decreasing the thrust applied to two different propellers), or leaning down. Additionally or alternatively, the drone 102 may capture images in the set of images while changing a position and/or settings of the onboard camera 104. For example, the drone 102 may change a vertical and/or horizontal position of the onboard camera 104 while the body of the drone 102 remains substantially fixed in place. As another example, the drone 120 may adjust the optical zoom for the onboard camera 104 to obtain images from different perspectives.

In some cases, the drone 102 collects other sensor data in addition to the collected images to be used to generate a map for the area of the property. For example, the drone 102 may use a lidar system to collect laser data that can be aggregated to generate a point cloud. The lidar system may be synchronized and registered to the onboard camera 104 of the drone 102, or to one or more other onboard cameras.

The process 400 includes identifying landmarks in the area based on the images (404). For example, as shown in FIG. 1, the monitoring server 130 analyzes the subset of images 108 to identify one or more visual landmarks and/or one or more landmark features. In identifying the landmarks and/or the features, the monitoring server 130 may perform scene segmentation on the subset of images 108 and/or may employ one or more machine learning techniques such as one or more detectors and/or classifiers. For example, the monitoring server 130 may use a detector model to identify outlets and light switches on each wall of the monitored property 120.

In some cases, identifying the landmarks in the area includes identifying an object or a surface of an object using one or more algorithms. The object or the surface of the object may be considered a landmark. For example, the drone 102 may use one or more machine learning algorithms to identify objects and/or particular surfaces of objects in the area of the property 120. The one or more machine learning algorithms may include object localization algorithms, classifier algorithms, object detection algorithms, and/or scene segmentation algorithms.

In some cases, identifying the object or the surface of an object using the one or more algorithms includes performing object localization on the images using at least one algorithm of the one or more algorithms to identify one or more of the following: discrete objects in the area of the property based on the images; discrete surfaces of particular objects in the area of the property based on the images; an area corresponding to discrete objects in the area of the property based on the images; or an area corresponding to discrete objects in the area of the property based on the images. For example, the drone 102 or the monitoring server 130 may analyze the set of images 108 using one or more object localization machine learning algorithms. The set of images 108 may be input to the one or more object localization machine learning algorithms.

The output of these one or more localization machine learning algorithms can indicate discrete objects in the area of the property, discrete surfaces of particular objects in the area of the property based on the images, an area (e.g., bounding box, outline, etc.) corresponding to discrete objects in the area of the property based on the images, and/or an area (e.g., bounding box, outline, etc.) corresponding to discrete objects in the area of the property based on the images. For example, the output of the one or more object localization machine learning algorithms may include a bounding-box layer (e.g., a mask) for each of the images in the set of images. The bounding-box layers may include an indication of the location, size, and/or shape of each of the objects depicted in the set of images 108. For example, a bounding-box layer may be generated that includes a bounding box corresponding to the table 126 in the first image of the set of images 108.

In some cases, the one or more object localization machine learning algorithms receive additional information as input. For example, the one or more object localization machine learning algorithms may also receive IR camera images, time-of-flight camera data, and/or lidar data to more accurately identify the discrete objects and/or surfaces in the area of the property 120, the locations of discrete objects and/or surfaces in the area of the property 120, and/or the sizes of discrete objects and/or surfaces in the area of the property 120.

In some cases, identifying the object or the surface of an object using the one or more algorithms includes classifying the object or the surface of an object using at least one algorithm of the one or more algorithms. For example, the drone 102 and/or the monitoring server 130 may use one or more classifier machine learning algorithms to identify the types of objects and/or surfaces of objects in the set of images 108. The input of the one or more classifier machine learning algorithms may include the set of images 108, or portions of images in the set of images (e.g., portions of images corresponding to identified objects and/or identified surfaces of objects). The output of the one or more classifier machine learning algorithms may be a type of object (e.g., furniture, chair, table, wall, mirror, sofa, bed, etc.; planar object or non-planar object), a type of surface (e.g., reflective surface, semi-reflective surface, etc.; planar surface or non-planar surface).

In some cases, classifying the object includes classifying the object as belonging to a type of object, and determining the expected stability for each of the landmarks includes determining the expected stability for the object based on the type of object. For example, the drone 102 and/or the monitoring server 130 may use the identified classification for an object or a surface of an object in determining a reliability score and/or a stability score for the object or the surface of the object. As an example, if the output of the one or more classifier machine learning algorithms indicates that the table 126 should be classified as a table, the monitoring server 130 may obtain a default reliability score and/or a default stability score corresponding to the table classification. As will be discussed in more detail below, the monitoring server 130 may proceed to update these one or more default scores to determine a reliability score and/or a stability score for the table 126.

In some cases, classifying the surface of an object includes classifying the surface as being planar or non-planar, and determining the expected stability for each of the landmarks comprises determining the expected stability for the surface of an object based on the surface being planar or non-planar. For example, the drone 102 and/or the monitoring server 130 may use the identified classification for an object or a surface of an object to eliminate an object or a surface of an object for consideration as a landmark (e.g., due to the classification corresponding to insufficient stability). For example, if a surface of an object is classified as non-planar, the monitoring server 130 may determine that the surface and/or the object corresponding to the surface should not be used as a landmark (e.g., will not be used for navigation).

In some cases, the one or more classifier machine learning algorithms first receive an indication of the locations of discrete objects and/or surfaces of objects generated using one or more localization algorithms. For example, the monitoring server 130 may obtain bounding boxes for each of the objects (or surfaces of objects) that include representations in the set of images 108 (e.g., that are located in the property 120) generated using one or more localization machine learning algorithms. The monitoring server 130 may proceed to provide portions of the images corresponding to the identified bounding boxes to the one or more classifier machine learning algorithms as input. Accordingly, the one or more classifier machine learning algorithms may only analyze particular portions of images in the set of images 108 that have already been identified as corresponding to a particular object or a particular surface of an object, thereby reducing the processing burden and improving the classification results. The output of the one or more classifier machine learning algorithms may include a classification (or a set of most likely classifications) for each bounding box.

In some cases, the one or more classifier machine learning algorithms first receive an indication of the locations of discrete objects and/or surfaces of objects generated using scene segmentation algorithms. For example, the monitoring server 130 may obtain mask layers for each of the objects (or surfaces of objects) that include representations in the set of images 108 (e.g., that are located in the property 120) generated using one or more scene segmentation machine learning algorithms. The mask layers may indicate the location, size, and/or outline of the objects (or the surfaces of objects) in the area of the property 120. The monitoring server 130 may proceed to provide portions of the images corresponding to different objects (or surfaces of objects) indicated by the mask layers to the one or more classifier machine learning algorithms as input. Accordingly, the one or more classifier machine learning algorithms may only analyze particular portions of images in the set of images 108 that have already been identified as corresponding to a particular object or a particular surface of an object, thereby reducing the processing burden and improving the classification results. The output of the one or more classifier machine learning algorithms may include a classification (or a set of most likely classifications) for each mask layer.

In some cases, identifying the object or the surface of an object using the one or more algorithms includes performing scene segmentation on the images using at least one algorithm of the one or more algorithms to identify one or more of the following: discrete objects in the area of the property based on the images; discrete surfaces of particular objects in the area of the property based on the images; individual areas each corresponding to only a single discrete object in the area of the property based on the images; or individual areas each corresponding to only a single discrete surface of particular objects in the area of the property based on the images. For example, the drone 102 or the monitoring server 130 may analyze the set of images 108 using one or more scene segmentation machine learning algorithms. The set of images 108 (or portions of images in the set of images 108) may be input to the one or more scene segmentation machine learning algorithms.

The output of these one or more scene segmentation machine learning algorithms can indicate discrete objects in the area of the property, discrete surfaces of particular objects in the area of the property based on the images, individual areas (e.g., outlines and/or discrete areas) each corresponding to only a single discrete object in the area of the property based on the images, and/or individual areas (e.g., outlines and/or discrete areas) each corresponding to only a single discrete surface of particular objects in the area of the property based on the images. For example, the output of the one or more scene segmentation machine learning algorithms may include a layer (e.g., a mask) for each of the objects or viewable surfaces of the objects. The layer may indicate the location, size, and/or shape of the corresponding object or surface of the object. For example, the output of a scene segmentation machine learning algorithm may be a mask corresponding to the table 126 depicted in the first image of the set of images 108.

The output of the one or more scene segmentation machine learning algorithms may be used by the drone 102 and/or the monitoring server 130 to determine if objects or surfaces of objects are planar. For example, the output of a scene segmentation machine learning algorithm may indicate an area corresponding to a particular surface of an object. The monitoring server 130 may identify a set of interest points within the area, and determine if the set of interest points are coplanar (e.g., threshold percent of the interest points are coplanar, and/or the interest points are coplanar within an acceptable error). The drone 102 and/or the monitoring server 130 may identify the interest points determined using, for example, a point cloud generated from time-of-flight camera data and/or lidar data. The drone 102 and/or the monitoring server 130 may determine the interest points using, for example, image analysis of visible-light and/or infrared light images to select points in the area and to proceed to estimate the distance of those points from the corresponding camera.

In some cases, determining if a set of interest points are coplanar includes attempting match the set of interest points with other set(s) of interest points in other images of the area from a different camera angle (e.g., camera angle of the camera 104) or different camera position. For example, the drone 102 may capture a first image and identify a set of interest points from that image or otherwise corresponding to that image. The drone 102 may proceed to capture subsequent images (e.g., frames) during its flight through the property and/or concurrent images (e.g., frames) from a stereo camera pair of the drone 102. The drone 102 (or the monitoring server 130) may perform point matching between the set of interest points in the first image to points of the subsequent and/or concurrent images to identify matching points. The drone 102 (or the monitoring server 130) observes the differences in position of the matched points with respect to the first image and the one or more subsequent and/or concurrent images. Based on these changes in position, the drone 102 (or the monitoring server 130) matched points from image to image conforms to a planar homography.

In some cases, the one or more scene segmentation machine learning algorithms receive additional information as input. For example, the one or more scene segmentation machine learning algorithms may also receive IR camera images, time-of-flight camera data, and/or lidar data to more accurately identify the discrete objects and/or surfaces in the area of the property 120, the locations of discrete objects and/or surfaces in the area of the property 120, and/or the sizes of discrete objects and/or surfaces in the area of the property 120.

In some cases, the one or more scene segmentation machine learning algorithms first receive an indication of the locations of discrete objects and/or surfaces of objects generated using one or more localization algorithms. For example, the monitoring server 130 may obtain bounding boxes for each of the objects (or surfaces of objects) that include representations in the set of images 108 (e.g., that are located in the property 120) generated using one or more localization machine learning algorithms. The monitoring server 130 may proceed to provide portions of the images corresponding to the identified bounding boxes to the one or more scene segmentation machine learning algorithms as input. Accordingly, the one or more scene segmentation machine learning algorithms may only analyze particular portions of images in the set of images 108 that have already been identified as corresponding to a particular object or a particular surface of an object, thereby reducing the processing burden and improving the scene segmentation results. The output of the one or more scene segmentation machine learning algorithms may include an outline and/or discrete area (e.g., corresponding to only the object or the surface of the object) for each bounding box.

In some cases, in order to be considered a landmark, an object or a surface of an object must meet some particular criteria. For example, as discussed in more detail below, the drone 102 or the monitoring server 130 may consider an object or a surface of an object a landmark if it meets one or more of the following: has a minimum size, can be viewed from a threshold number of vantage points, has a reliability score that meets a threshold reliability score, has a stability score that meets a threshold stability score, is identified as an acceptable type of object (e.g., is not a person, an animal, a pet, etc.), etc.

In some cases, identifying the landmarks in the area includes identifying groupings of related surfaces. For example, the drone 102 may identify a grouping of connected surfaces, and determine that these surfaces correspond to a single object. The drone 102 may determine that the object is and/or should be used as a landmark. Identifying groupings of related surfaces can include identifying one or more of the following: surfaces that are within a threshold distance from one another; surfaces that are adjacent to one another; surfaces that are coplanar; surfaces that are observed as having the same or substantially the same color; or surfaces that are in contact with one another. For example, the drone 102 and/or the monitoring server 130 may determine using the set of images 108 that a first surface corresponding to a first leg of the table 126 contacts two other surfaces corresponding to the first leg of the table. The drone 102 and/or the monitoring server 130 may also determine that two of the three surfaces are coplanar. Based on these determination, the drone 102 and/or the monitoring server 130 may determine that the three surfaces together are considered a landmark (e.g., the first leg of the table 126 is considered a landmark).

In some cases, identifying groupings of related surfaces includes identifying groupings of surfaces that each correspond to a particular object or a portion of a particular object in the area of the property. For example, the drone 102 and/or monitoring server 130 may determine that a first surface corresponding to a first leg of the table 126, three surfaces that make up a first corner of the table 126, and a surface that corresponds to the top of the table 126 are related as all belong to the table 126. The drone 102 and/or the monitoring server 130 may make this determination by, for example, comparing the locations of the surfaces with a previous known location of the table 126. Alternatively, the drone 102 and/or the monitoring server 130 may make this determination by determining, e.g., using one or more machine learning algorithms, that the surfaces are directly or indirectly connected to one another, and are located in an area that has been classified as a table.

The process 400 includes determining an expected stability for each of the landmarks (406). For example, as shown in FIG. 1, the monitoring server 130 may determine a reliability score for each of the visual landmarks and/or features. The monitoring server 130 may consider the following when determining a reliability or stability score: the number of vantage points the feature/landmark may be viewed from, the maximum distance from which the feature/landmark may be viewed from, if the feature/landmark changes over time and/or how often does the feature/landmark change over time (e.g., does it move locations, is it sometimes blocked from view, etc.), the amount of parallax observed with the feature/landmark, how much uncertainty is associated with the feature/landmark, the categorization and/or classification of the visual landmark (e.g., that the feature corresponds with), etc.

In some cases, determining the expected stability for each of the landmarks includes: determining a reliability score for each of the landmarks that corresponds to the consistency in location of objects or surfaces of objects over time; determining a stability score for each of the landmarks that corresponds to the consistency in appearance of objects or surfaces of objects across viewpoint locations; and calculating the expected stability using the reliability score and the stability score. For example, the monitoring server 130 may average the reliability score for each of the landmarks with its corresponding stability score to determine an overall score for the landmark (e.g., the expected stability for the landmark). As another example, the monitoring server 130 may apply a first weight to the reliability score and a second weight to the stability score before combining the weighted reliability score and the weighted stability score. The monitoring server 130 may combine the two weighted scores by averaging them, adding them, multiplying them, etc. The result of combining the two weighted scores may be an overall score for the corresponding landmark (e.g., the expected stability for the landmark).

In some cases, determining a reliability score for a landmark includes determining a reliability score for each feature of the landmark and aggregating the feature reliability scores. Each feature may be a surface of a landmark (e.g., a surface of an object) or a group of surfaces of surfaces of a landmark. For example, a feature of the table 126 shown in FIG. 1 may be a first leg that is made up of four individual surfaces, each corresponding to a face of the first leg. As another example, the automatic blinds 112 may include a first feature corresponding to the blinds themselves and a second feature corresponding to the headrail. The monitoring server 130 may determine a low reliability score (e.g., 24/100) for the first feature/blinds to reflect that the blinds are often changing position and/or appearance, and a high reliability score for the second feature/headrail (e.g., 94/100) to reflect that the headrail is not often changing position and/or appearance. The monitoring server 130 may aggregate the two feature reliability scores to determine an overall reliability score for the blinds 112 by averaging the two scores, multiplying the two scores, adding the two scores, etc. Alternatively, the monitoring server 130 may apply a weight to each feature reliability score first before averaging the two scores, multiplying the two scores, adding the two scores, etc. The weight may be based on the size of the features (e.g., combined surface area of each of the features; the first feature of the blinds 112 may be weighted greater than the second feature due to having a larger surface area than a surface area of the second feature), a classification of the features, a location of the features, etc.

Continuing the previous example, the monitoring server 130 may determine to only use the second feature/headrail as a landmark instead of the blinds 112 as a whole. For example, the monitoring server 130 may apply a threshold reliability score to the feature reliability scores in determining if an entire object or only a portion of an object should be used as a landmark. If all features meet the threshold reliability score (e.g., 80/100), then the monitoring server 130 may determine that the entire object can be used as a landmark (e.g., if stability score requirements are met). However, if one or more features do not meet the threshold reliability score, then the monitoring server 130 may determine to use only the passing features as landmarks.

In some cases, determining a stability score for a landmark includes determining a stability score for each feature of the landmark and aggregating the feature stability scores. Each feature may be a surface of a landmark (e.g., a surface of an object) or a group of surfaces of surfaces of a landmark. For example, a feature of the table 126 shown in FIG. 1 may be a first leg that is made up of four individual surfaces, each corresponding to a face of the first leg. A second feature of the table 126 may be a top of the table that is made up of a single surface. The monitoring server 130 may determine a low stability score (e.g., 40/100) for the first leg to reflect that the leg appears differently from different vantage points, is not planar (e.g., if the first leg is cylindrical), and/or is hidden from view from many vantage points, and a high reliability score for the top (e.g., 91/100) to reflect that the top is visible from many vantage points, is large, and is planar. The monitoring server 130 may aggregate the two feature stability scores to determine an overall stability score for the table 126 by averaging the two scores, multiplying the two scores, adding the two scores, etc. Alternatively, the monitoring server 130 may apply a weight to each feature stability score first before averaging the two scores, multiplying the two scores, adding the two scores, etc. The weight may be based on the size of the features (e.g., combined surface area of each of the features; the top of the table 126 may be weighted greater than the first leg due to the top having a larger surface area than a surface area of the first leg), a classification of the features, a location of the features, etc.

Continuing the previous example, the monitoring server 130 may determine to only use the second feature/top as a landmark instead of the table 126 as a whole. For example, the monitoring server 130 may apply a threshold reliability score to the feature stability scores in determining if an entire object or only a portion of an object should be used as a landmark. If all features meet the threshold stability score, then the monitoring server 130 may determine that the entire object can be used as a landmark (e.g., if reliability score requirements are also met). However, if one or more features do not meet the threshold stability score, then the monitoring server 130 may determine to use only the passing features as landmarks.

In some cases, calculating the expected stability using the reliability score and the stability score includes aggregating the reliability score and the stability score. For example, the drone 102 or the monitoring server 130 can average the reliability score and the stability score to determine an overall score (e.g., a landmark score) corresponding to the expected stability of the landmark. Similarly, the drone 102 or the monitoring server 130 can multiply the two scores, add the two scores, or perform other operations with the two scores to derive an overall score corresponding to the expected stability of the landmark. The drone 102 or the monitoring server 130 may, in some cases, apply a first weight to the reliability score and a second weight to the stability score, and proceed to use the weighted scores to determine an overall score corresponding to the expected stability of the landmark. The weights applied may be determined using one or more machine learning algorithms. For example, the weights applied may be updated over time to reflect improvements in identifying stable/reliable landmarks for drone navigation. The drone 102 and/or the monitoring server 130 may compare the overall score to a threshold score to determine if the landmark should be added to a three-dimensional map of the property 120 and/or area of the property 120.

In some cases, determining the reliability score for each of the landmarks includes determining the reliability score for each of the landmarks based one on or more of the following: frequency that a landmark or a portion of a landmark changes position; frequency that a landmark or a portion of a landmark changes appearance; level of uncertainty associated with a landmark or a portion of a landmark; or a classification of a landmark. For example, the monitoring server 130 may determine a high reliability score (e.g., 94/100) for a top surface of the table 126 based on the table 126 changing position infrequently (e.g., position changes more than 10.0 cm only once a month on average), position changes being below a threshold level (e.g., 98% of position changes are less than 1.0 cm), being classified as a table (e.g., which may have a default reliability score of 85/100), and/or there being a low uncertainty corresponding to the top surface of the table 126 (e.g., due to its large surface area).

In some cases, determining the stability score for each of the landmarks includes determining the stability score for each of the landmarks based one on or more of the following: number of vantage points that a landmark or a portion of a landmark is capable of being viewed from with respect to the camera; variability in appearance of a landmark or a portion of a landmark from different perspectives of the camera or different vantage points; maximum distance from which a landmark or a portion of a landmark is capable of being viewed from with respect to the camera; magnitude of parallax observed with a landmark or a portion of a landmark; level of uncertainty associated with a landmark or a portion of a landmark; a classification of a landmark; or prevalence of planar surfaces of a landmark or a portion of a landmark. For example, the monitoring server 130 may determine a high stability score for the top surface of the table 126 (e.g., 96/100) due to the top surface being viewable from a high percent of vantage points of the drone 102 (e.g., from at least 90% of possible vantage points in the area of the property 120), due the top surface being identifiable from far away (e.g., can be identified with at least 97% accuracy from the one or more furthest vantage points in the area of the property 120), and/or due to the top surface being coplanar.

In some cases, determining the stability score for each of the landmarks includes determining that the respective landmark or a surface of the respective landmark is planar by: identifying a set of interest points corresponding to the landmark or to a surface of the landmark; and determining that a threshold percent of the interest points are coplanar. For example, as described above, the monitoring server 130 and/or the drone 102 may generate a point cloud using the set of images 108, other images (e.g., IR images), time-of-flight camera data, and/or lidar data. The point cloud may include points corresponding to the landmark or the surface of the landmark. The monitoring server 130 and/or the drone 102 may, if the point cloud includes points other than those corresponding to the landmark or the surface of the landmark, identify a subset of points in the point cloud corresponding to the landmark or the surface of the landmark. The monitoring server 130 and/or the drone 102 may proceed to determine if a threshold percent of the interest points are coplanar. For example, the monitoring server 130 may determine that at least 95% of the points corresponding to the top surface of the table 126 to conclude that the top surface of the table 126 is planar. Determining if points are coplanar may include determining that the points are substantially in the same plane (e.g., within an acceptable level of error to account for sensor inaccuracies).

In some cases, where no landmark (e.g., no landmark in the viewable vicinity of the drone 102) is detected with a sufficient reliability score (or an insufficient number of landmarks have a sufficient reliability score), a refinement algorithm may be executed with positions of detected landmarks that could have moved. For example, a threshold reliability score may be set to 95%. If the drone 102 detects a landmark that has a reliability score of at least 95%, then there is sufficient confidence in the landmark for the drone 102 to determine, for example, its current position and/or pose, and/or to continue navigation using the detected landmarks. However, if the drone 102 fails to detect a landmark with a reliability score of at least 95%, then the drone 102 may trigger the execution of a refinement algorithm (e.g., iterative closest point algorithm) with positions of detected landmarks that could have moved. For example, the drone 102 may detect a chair with a reliability score of 80% and a table with a reliability score of 90%. The drone 102 may provide the positions of the chair and the table to a refinement algorithm which may use the positions as an initial estimate (e.g., an initial estimate of the drone 102's location in the property and/or of the positions of the table and the chair). However, leveraging a sufficiently reliable landmark, when detected, may be preferred over executing a refinement algorithm since such algorithms can be to CPU demanding.

The output of the refinement algorithm may be a more accurate location of the drone 102 in the property, and/or more accurate positions of the chair and table. The drone 102 may compare the positions of chair and table to the positions of the chair and table shown in the map, and, based on the comparison, update the reliability scores for the chair and table. For example, if the position of the table indicated by the output of the refinement algorithm is in the same position or substantially same position as indicated by the map (e.g., within an acceptable percent error), then the drone 102 may increase the reliability score of the table from 90% to 95%.

As another example, the refinement algorithm may be executed in response to determining that that the detected landmarks do not have a sufficient reliability score and stability score. For example, the drone 102 may compare reliability scores corresponding to the landmarks detected at the current location of the drone 102 (e.g., landmarks that are viewable and/or recognizable from one or more sensors of the drone 102; landmarks that the drone 102 is currently relying on to navigate thought the property 120, etc.) to a threshold reliability score, and stability scores corresponding to those landmarks to a threshold stability score. If no landmarks (or an insufficient number of landmarks) meet the threshold reliability score and the threshold stability score, the drone 102 may execute one or more refinement algorithms (e.g., to improve localization of the drone 102 in the property 120).

The output of the refinement algorithm(s) may be used to improve localization (e.g., to identify a more accurate location of the drone 102 with respect to the property 120). The output may also or alternatively be used to update the locations of landmarks in a map of the property 120. For example, after the drone 102 is localized using the output of the refinement algorithms, the drone 102 may update the positions of one or more landmarks in a map of the property 120.

In some cases, the drone 102 (or the monitoring server 130) may compare the updated positions of the landmarks to the detected positions or to previously determined positions of the landmarks (e.g., positions of landmarks in an existing map for the property 120 that the drone 102 is using to navigate the property 120). The reliability scores and/or stability scores for the landmarks may be updated to account for the change in position of the landmarks (e.g., the change in the landmarks' positions within a coordinate system for the property 120). For example, if the drone 102 determines that a landmark's position needs to be update, the drone 102 may reduce the reliability score for the landmark. Similarly, the extent to which the reliability scores and/or stability scores are changed may depend on the extent of the change in position of the landmarks. For example, the drone 102 may reduce the reliability score for a landmark by 5% if the change in position was between 1.0 and 5.0 cm in magnitude. However, the drone 102 may reduce the reliability score by 10% if the change was greater than 10.0 cm in magnitude.

In some cases, when a landmark appears to have moved or changed, a decision is made (e.g., by the monitoring server 130 or by the drone 102 as shown in FIG. 1) as to whether or not the landmark actually moved. This decision may be based upon the number of other landmarks that are visible, are known to be in their correct locations from the drone 102's current pose, and/or their stability and/or reliability scores. For example, if the drone 102 is confident that it knows where 95% reliable landmarks (e.g., landmarks having landmark reliability scores of 95%) are, and yet the couch appears to be 3' from where it expect the couch to be based on an environment map, then the drone 102 may determine that the couch has been moved (e.g., instead of making the determination that all the other landmarks have moved). In contrast, if the drone 102 can only see the landmarks corresponding to the table and the couch from its current pose, then it may hesitate to make a determination as to whether the couch or table has moved as they each have an equal or significant likelihood of having been moved.

In some implementations, stability and reliability may be different scores, each with multiple dimensions. For example, a landmark corresponding to a carpet may have a very stable location in that it is unlikely to ever move, but unreliable visually because the nap changes appearance from different angles. Accordingly, the monitoring server 130 in FIG. 1 may assign a high stability score but a low reliability score to the landmark corresponding to the carpet. As another example, a coffee table book can be easy to recognize, but unlikely to be in the same place. Accordingly, monitoring server 130 may assign a low stability score but a high reliability score to the landmark corresponding to the coffee table book. In addition, the drone 102 shown in FIG. 1 or the monitoring server 130 may apply different thresholds to the stability and reliability scores, e.g., when determining whether to include the landmark in an environment map, determining whether to remove the landmark from an environment map, or, in the case of the drone 102, to use while navigating a property. For example, the monitoring server 130 may compare the stability score of a particular landmark with a stability threshold and may proceed to compare the reliability score of the landmark with a reliability threshold. If either landmark threshold score is not met, the monitoring server 130 may remove the landmark from the environment map that it provides to the drone 102.

The process 400 includes generating a map for the area based on the expected stability for each of the landmarks (408). For example, as described with respect to FIG. 1, the monitoring server 130 can generate a 3D environment map containing those features that meet a threshold feature score, and/or containing those landmarks that meet a threshold landmark score. As show in FIGS. 2A-2B, an environment map 230 can be generated based on the physical objects within the floor 220 of a property such that each physical object corresponds with a visual landmark. Each visual landmark may be provided a reliability score. A threshold landmark score may be applied to the identified landmarks such that those landmarks having a reliability score that does not meet the threshold landmark score are removed from the environment map.

The process 400 optionally includes transmitting the map to one or more electronic devices. For example, with respect to FIG. 1, the drone 102 may transmit the generated map to the monitoring server 130 over the network 140. Alternatively, the monitoring server 130 may transmit the generated map to the drone 102. The drone 102 may proceed to store the map and/or use the map to navigate through the property 120.

In some cases, the process 400 optionally includes comparing the expected stability for each of the landmarks to a minimum level of stability to identify a subset of landmarks that meet the minimum level of stability. For example, the drone 102 and/or the monitoring server 130 may compare the expected stability for each of the landmarks to a threshold landmark score to identify a subset of landmarks that have a sufficient expected stability (e.g., to be used for consistent and/or reliable navigation). Generating the map for the area can include generating a map for the area (e.g., a three-dimensional map) that includes representations of only the landmarks in the subset of landmarks; or generating a map for the area that includes representations of the landmarks in the subset of landmarks, the representations tagged to indicate that the corresponding landmarks have a sufficient level of stability.

In some cases, comparing the expected stability for each of the landmarks to the minimum level of stability includes: comparing reliability scores for the landmarks to a threshold reliability score to identify the subset of landmarks that meet the threshold reliability score; and comparing stability scores for the landmarks to a threshold stability score to identify the subset of landmarks that meet the threshold stability score. For example, the drone 102 and/or the monitoring server 130 may determine that a representation of the table 126 should only be added to the three-dimensional map for the property 120 or should only be tagged as a sufficiently stable/reliable landmark after determining that a reliability score of the table 126 meets a threshold reliability score (e.g., 80/100), and that a stability score of the table 126 meets a threshold stability score (e.g., 85/100).

Figure 5:
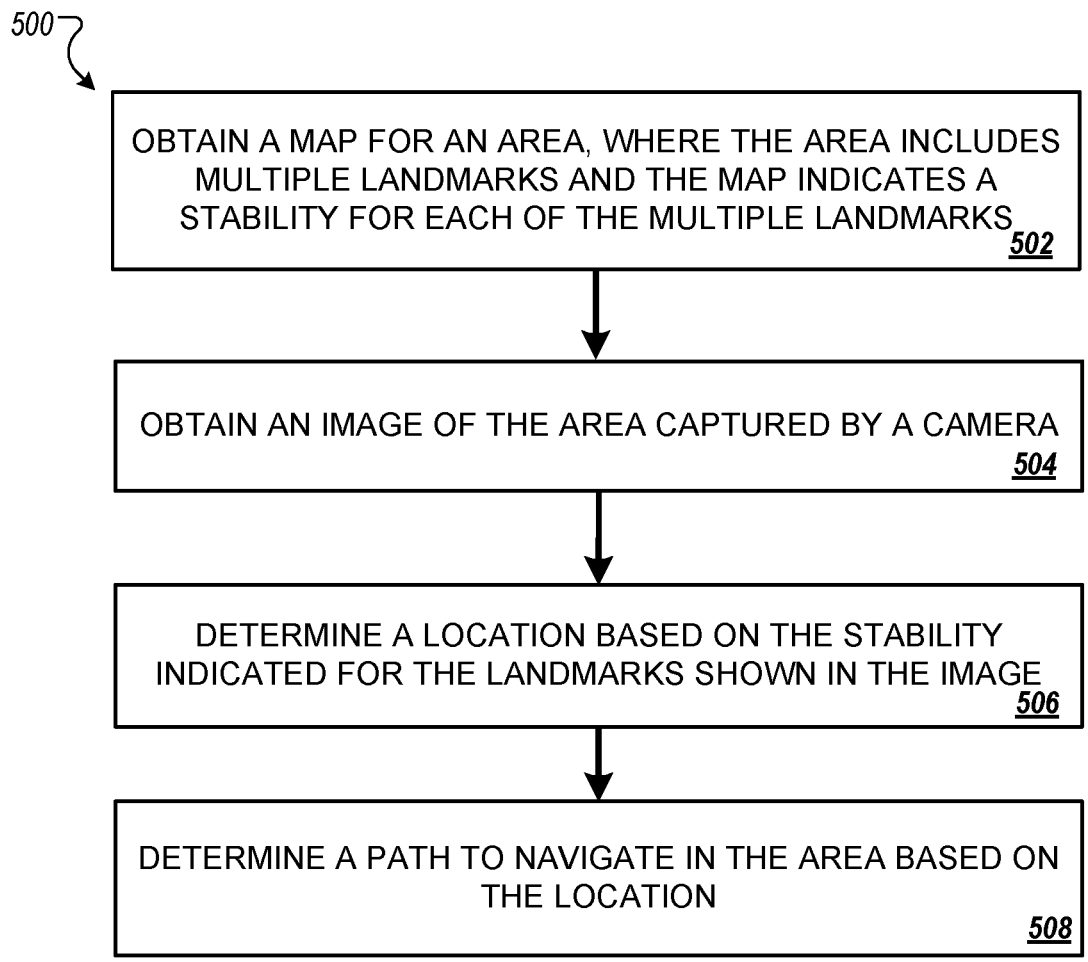
FIG. 5 is a flowchart of an example process for navigating through an area using an environment map.

FIG. 5 is a flowchart of an example process 500 for navigating through an area using an environment map. The process 500 can be performed, at least in part, using the system 100 described in FIG. 1 or the monitoring system 900 described in FIG. 9.

The process 500 includes obtaining a map for an area, where the area includes multiple landmarks and the map indicates a stability for each of the multiple landmarks (502). For example, as shown in FIG. 3, the drone 302 can access or be provided an environment map 230. As shown in FIGS. 2A-2B, the environment map 230 contains multiple landmarks that each correspond to a physical object located in the area of the floor 220. Each of the landmarks in the environment map 230 are provided a reliability score, e.g., by the monitoring server 130 shown in FIG. 1.

With respect to FIG. 1, the map can be stored on the monitoring server 130. Additionally or alternatively, the map, or another version of the map, can be stored on the drone 102.

The process 500 includes obtaining an image of the area captured by a camera (504). For example, as shown in FIG. 3, the drone 302 captures an image 308 using an onboard camera.

In some cases, the drone 302 captures multiple images. For example, the drone 302 may capture multiple images from a particular location to analyze (e.g., capturing images every 15 degrees while rotating in place). The drone 302 may proceed to determine (e.g., correct) its location using the multiple images as described below.

In some cases, the drone 302 captures sensor data in addition to the images. For example, the drone 302 may also capture time-of-flight camera data and/or lidar data that is synchronized with the onboard camera 104.

The process 500 includes determining a location based on the stability indicated for the landmarks shown in the image (506). For example, as shown in FIG. 3, the image 108 taken by the drone 302 contains the stairs 206 which correspond to the landmark 236 shown in FIGS. 2A-2B. Because the landmark 236 has a high stability of 95%, the drone 302 may select the landmark 236 to be used in determining its location, e.g., its absolute position. The drone 302 may compare an expected location of the landmark 236 with respect to the drone 302 with an actual location of the landmark 236 with respect to the drone 302 using the image 308, and, in doing so, determine an absolute position of the drone 302.

In some cases, the drone 302 uses other senor data in addition to the image(s) to determine (e.g., correct) a location. For example, the drone 302 may use captured time-of-flight camera data and/or a lidar data to confirm the determined location, and/or to improve the accuracy of the determined location (e.g., using the time-of-flight camera data to determine distances of the drone 302 from one or more landmarks or from particular surfaces of landmarks).

The process 500 includes determining a path to navigate in the area based on the location (508). For example, as shown in FIG. 3, the drone 302 can generate a route through the floor 220 such that one or more landmarks of the floor 220 will be observable and/or unobstructed along the entirety of the route or at certain points along the route. Specifically, the drone 302 (or the monitoring server 130) may generate a path in order to keep the drone 302 within a threshold distance (e.g., 1.0 m, 1.5 m, 1.7 m, etc.) of at least a threshold number of landmarks at any given time (e.g., at least two landmarks, at least three landmarks, etc.). Determining the path may also or alternatively be based on the visibility of the landmarks and/or particular surfaces of the landmarks. For example, the drone 302 or the monitoring server 130 may determine a path so that the drone 302 views particular landmarks from particular vantage points (e.g., in order to take advantage of particular reliable/stable surfaces of the landmark that might not be observable or sufficiently observable from different vantage points). Similarly, the drone 302 or the monitoring server may determine a path in order to have the drone 302 avoid parallax effects with respect to particular landmarks or particular surfaces of landmarks. Determining the path may also or alternatively be based on the size of landmarks and/or particular surfaces of landmarks, or, relatedly, the distance that landmarks and/or particular surfaces of landmarks can be identified from. For example, the drone 302 or the monitoring server 130 may determine a path so that the drone 302 is kept closer to smaller landmarks such that the drone 302 can still accurately identify larger landmarks along the path.

As shown in FIG. 3, the drone 302 generates a route from its current position 306b, to a second position 310 near the landmark 238, to a third position 312 near the landmark 234, and to a fourth position 314 near the landmark 232.

Figure 6:
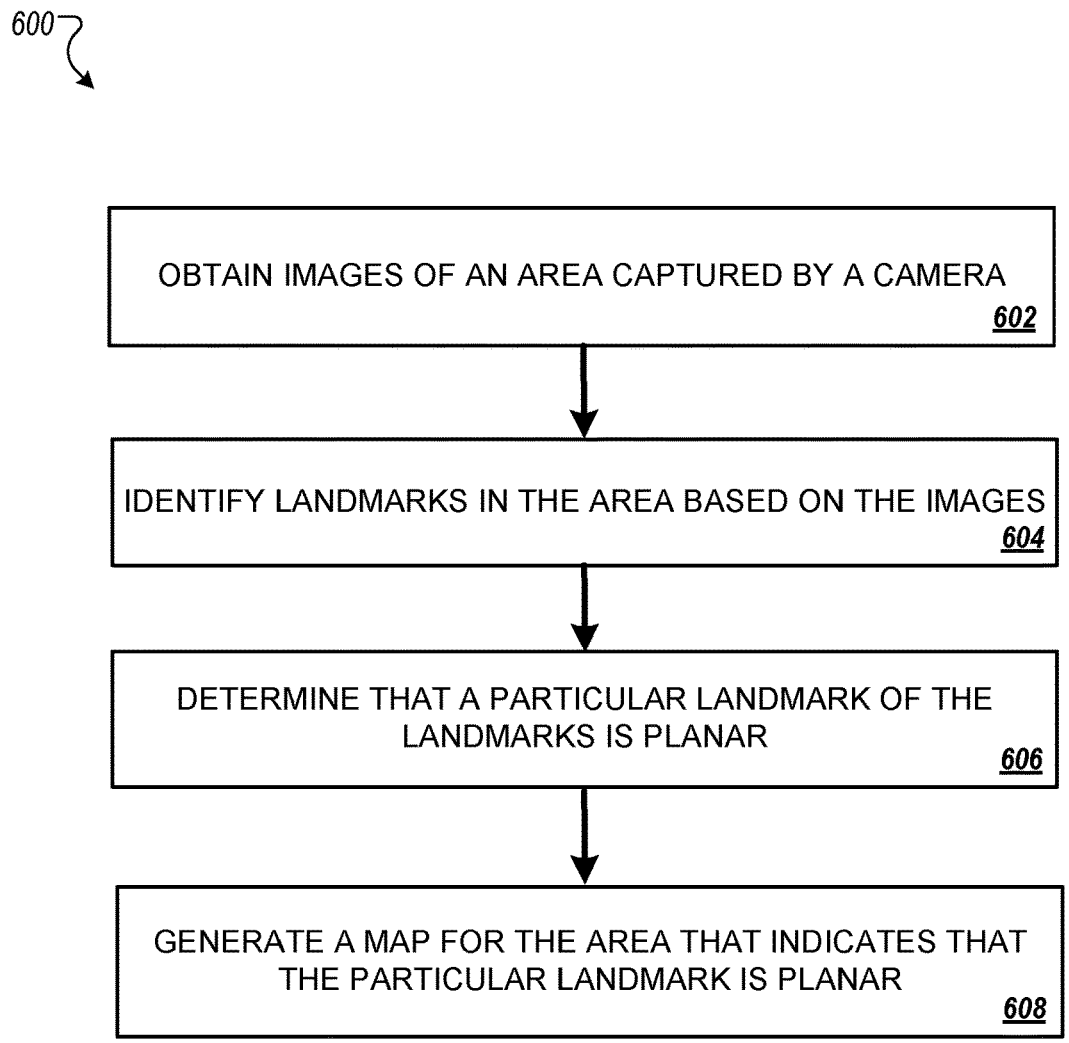
FIG. 6 is a flowchart of an example process for generating an environment map to be used in visual navigation.

FIG. 6 is a flowchart of an example process 600 for generating an environment map to be used in visual navigation. The process 600 can be performed, at least in part, using the system 100 described in FIG. 1 or the monitoring system 900 described in FIG. 9.

The process 600 includes obtaining images of an area captured by a camera (602). With respect to FIG. 1, the camera can be the camera 104 mounted on the drone 102. The images obtained can be the subset of images 108. Similarly, the monitoring server 130 may obtain the images from the drone 102 collected using the onboard camera 104, and/or from one or more other cameras. As an example, the area can include the floor 220 shown in FIG. 2A and FIG. 3. The camera can be a visible light camera.

The area of the property may be a room of the property, a floor of the property, or other portion of a property. In some cases, the images captured depict the entire property (e.g., where the property has a single floor, has a single room, etc.).

In some cases, obtaining images captured by the camera includes obtaining a set of images captured by a camera of a drone flying in the property. For example, with respect to FIG. 1, the set of images may be captured by the drone 102 while it is in flight and navigating through the property 120. Additionally or alternatively, the set images or a portion of the set of images may be captured by other devices. For example, all or a portion of the set images may be captured using cameras installed in the property. As another example, all or a portion of the set of images may be captured using a different type of robotic device such as a land-based robotic device that navigates through the use of wheels, tracks, and/or legs.

In some cases, obtaining images captured by the camera includes obtaining a set of images captured from a particular location in the property. For example, the set of images may be captured while the drone 102 is in a particular location of the property 120. Specifically, the drone 102 may hover in substantially one location in the property 120 as it captures the set of images. The set of images may include images corresponding to different perspectives of the camera. For example, the drone 102 may capture images in the set of images while changing its orientation. The drone 102 may change its orientation by rotating, leaning up (e.g., by increasing the thrust applied to two propellers, and/or decreasing the thrust applied to two different propellers), or leaning down. Additionally or alternatively, the drone 102 may capture images in the set of images while changing a position and/or settings of the onboard camera 104. For example, the drone 102 may change a vertical and/or horizontal position of the onboard camera 104 while the body of the drone 102 remains substantially fixed in place. As another example, the drone 120 may adjust the optical zoom for the onboard camera 104 to obtain images from different perspectives.

Similarly, the images can be taken from multiple perspectives at one or more locations. For example, when the drone 102 is at a first location in the area, the drone 102 can use the onboard camera 104 to take multiple images while changing the perspective of the onboard camera 104. A change in perspective of the onboard camera 104 can be achieved by, for example, the drone 102 controlling one or more actuators to change a vertical angle of the onboard camera 104, and/or change a horizontal angle of the onboard camera 104. A change in perspective of the onboard camera 104 can be achieved by, for example, the drone 102 changing a position of the onboard camera 104 along an X-axis, along a Y-axis, and/or along a Z-axis. A change in perspective of the onboard camera 104 can also be achieved by, for example, the drone 102 rotating in place. For example, the drone 102 can take an image every ten, twenty, or thirty degrees that it rotates. Rotating in place can involve the drone 102 rotating in a plane that is substantially parallel with a floor of the area.

In some cases, the camera is a time-of-flight camera.

In some cases, other sensor data is collected in addition to or in place of the images. For example, with respect to FIG. 1, the drone 102 can also include a time-of-flight sensor or other LiDAR systems, e.g., those including laser scanners.

The process 600 includes identifying landmarks in the area based on the images (604). Landmarks can correspond to physical objects. For example, with respect to the monitored property 120 of FIG. 1, there can be a corresponding landmark for the first wall 122 ("Wall 1"), the second wall 124 ("Wall 2"), the table 126, the window 128, and the panel of the control unit 110. In the example of FIG. 1, there can be additional landmarks corresponding to the floor of the monitored property 120, with the other walls of the monitored property 120, with the ceiling of the monitored property 120, or the like. There can be additional landmarks corresponding to security devices that are located in the monitored property 120. For example, there can be a corresponding landmark for the automated blinds 112.

In some cases, landmarks correspond to a grouping of related surfaces. For example, a grouping of adjacent planar surfaces can be recognized as a landmark. With respect to FIG. 1, the monitoring server 130 can analyze the images to identify groupings of surfaces in the images. The monitoring server 130 can recognize each of the individual groupings of surfaces, e.g., those surfaces that are determined to be related (e.g., belong to the same object as can be determined through the surfaces having the same or similar color, through the surfaces being visually adjacent to one another, and/or through use of a time of flight sensor to determine that the surfaces are in contact with one another), as a landmark or can associate them with an existing landmark.

The system can identify the landmarks using the camera, e.g., using the images captured by the camera. For example, the system, e.g., the monitoring server 130, can sample images captured by the camera. The landmarks can be identified by performing visual recognition on the images captured by the camera. The landmarks can be identified by a user. For example, a user can be presented the images on a computing devices such as a smartphone, and can identify objects in the images that the system, e.g., the monitoring server 130, should recognize as landmarks.

In some cases, identifying a landmark in the area based on the images includes identifying a set of interest points from one or more images. The set of interest points (e.g., image features) may include those that are located within a certain distance from one another (e.g., in a three-dimensional space), that are identified as belonging to the same object (e.g., the interest points have been associated with the table 126 shown in FIG. 1), and/or that are coplanar. The set of interest points may represent a landmark. The set of interest points may correspond to a single object or to a portion of a single object. The control unit 110, the monitoring server 130, and/or the drone 102 may associate the set of interest points with a particular object, e.g., based on the locations of the points in the set of interest points and/or using object recognition using the camera 104 of the drone 102.

In some cases, identifying a landmark in the area based on the images includes grouping multiple sets of interest points. For example, after the drone 102 has identified an initial set of interest points from one or more images, the drone 102 can use the camera 104 to take additional images of the area corresponding to the set of interest points from one or more different poses, positions of the camera 104, lighting conditions, etc. Multiple sets of interest points can be generated from these one or more additional images. The drone 102, the control unit 110, and/or the monitoring server 130 may combine the multiple sets of interest points with the initial set of interest points to generate a superset of interest points. This superset of interest points can represent a landmark.

As an example, one approach to identifying landmarks is for the control unit 110 to send instructions to the drone 102 to fly the drone 102, extract local interest points from a sequence of frames taken by the drone 102 using the camera 104, and proceed to match interest points between subsequent sets of interest points. For the matched sets of points, the drone 102 and/or the control unit 110 can then identify patches of points which match a planar homography estimated from the drone 102's change in odometry. The drone 102 and/or the control unit 110 can estimate some parameters of the homography (and reduce the search space for interest points) by using the depth data collected by the drone 102 to determine where planar surfaces are in the field of view of the camera 104.

In some cases, identifying the landmarks in the area includes identifying an object or a surface of an object using one or more algorithms. The object or the surface of the object may be considered a landmark. For example, the drone 102 may use one or more machine learning algorithms to identify objects and/or particular surfaces of objects in the area of the property 120. The one or more machine learning algorithms may include object localization algorithms, classifier algorithms, object detection algorithms, and/or scene segmentation algorithms.

In some cases, identifying the object or the surface of an object using the one or more algorithms includes performing object localization on the images using at least one algorithm of the one or more algorithms to identify one or more of the following: discrete objects in the area of the property based on the images; discrete surfaces of particular objects in the area of the property based on the images; an area corresponding to discrete objects in the area of the property based on the images; or an area corresponding to discrete objects in the area of the property based on the images. For example, the drone 102 or the monitoring server 130 may analyze the set of images 108 using one or more object localization machine learning algorithms. The set of images 108 may be input to the one or more object localization machine learning algorithms.

The output of these one or more localization machine learning algorithms can indicate discrete objects in the area of the property, discrete surfaces of particular objects in the area of the property based on the images, an area (e.g., bounding box, outline, etc.) corresponding to discrete objects in the area of the property based on the images, and/or an area (e.g., bounding box, outline, etc.) corresponding to discrete objects in the area of the property based on the images. For example, the output of the one or more object localization machine learning algorithms may include a bounding-box layer (e.g., a mask) for each of the images in the set of images. The bounding-box layers may include an indication of the location, size, and/or shape of each of the objects depicted in the set of images 108. For example, a bounding-box layer may be generated that includes a bounding box corresponding to the table 126 in the first image of the set of images 108.

In some cases, the one or more object localization machine learning algorithms receive additional information as input. For example, the one or more object localization machine learning algorithms may also receive IR camera images, time-of-flight camera data, and/or lidar data to more accurately identify the discrete objects and/or surfaces in the area of the property 120, the locations of discrete objects and/or surfaces in the area of the property 120, and/or the sizes of discrete objects and/or surfaces in the area of the property 120.

In some cases, identifying the object or the surface of an object using the one or more algorithms includes classifying the object or the surface of an object using at least one algorithm of the one or more algorithms. For example, the drone 102 and/or the monitoring server 130 may use one or more classifier machine learning algorithms to identify the types of objects and/or surfaces of objects in the set of images 108. The input of the one or more classifier machine learning algorithms may include the set of images 108, or portions of images in the set of images (e.g., portions of images corresponding to identified objects and/or identified surfaces of objects). The output of the one or more classifier machine learning algorithms may be a type of object (e.g., furniture, chair, table, wall, mirror, sofa, bed, etc.; planar object or non-planar object), a type of surface (e.g., reflective surface, semi-reflective surface, etc.; planar surface or non-planar surface).

In some cases, classifying the object includes classifying the object as belonging to a type of object, and determining the expected stability for each of the landmarks includes determining the expected stability for the object based on the type of object. For example, the drone 102 and/or the monitoring server 130 may use the identified classification for an object or a surface of an object in determining a reliability score and/or a stability score for the object or the surface of the object. As an example, if the output of the one or more classifier machine learning algorithms indicates that the table 126 should be classified as a table, the monitoring server 130 may obtain a default reliability score and/or a default stability score corresponding to the table classification. As will be discussed in more detail below, the monitoring server 130 may proceed to update these one or more default scores to determine a reliability score and/or a stability score for the table 126.

In some cases, classifying the surface of an object includes classifying the surface as being planar or non-planar, and determining the expected stability for each of the landmarks comprises determining the expected stability for the surface of an object based on the surface being planar or non-planar. For example, the drone 102 and/or the monitoring server 130 may use the identified classification for an object or a surface of an object to eliminate an object or a surface of an object for consideration as a landmark (e.g., due to the classification corresponding to insufficient stability). For example, if a surface of an object is classified as non-planar, the monitoring server 130 may determine that the surface and/or the object corresponding to the surface should not be used as a landmark (e.g., will not be used for navigation).

In some cases, the one or more classifier machine learning algorithms first receive an indication of the locations of discrete objects and/or surfaces of objects generated using one or more localization algorithms. For example, the monitoring server 130 may obtain bounding boxes for each of the objects (or surfaces of objects) that include representations in the set of images 108 (e.g., that are located in the property 120) generated using one or more localization machine learning algorithms. The monitoring server 130 may proceed to provide portions of the images corresponding to the identified bounding boxes to the one or more classifier machine learning algorithms as input. Accordingly, the one or more classifier machine learning algorithms may only analyze particular portions of images in the set of images 108 that have already been identified as corresponding to a particular object or a particular surface of an object, thereby reducing the processing burden and improving the classification results. The output of the one or more classifier machine learning algorithms may include a classification (or a set of most likely classifications) for each bounding box.

In some cases, the one or more classifier machine learning algorithms first receive an indication of the locations of discrete objects and/or surfaces of objects generated using scene segmentation algorithms. For example, the monitoring server 130 may obtain mask layers for each of the objects (or surfaces of objects) that include representations in the set of images 108 (e.g., that are located in the property 120) generated using one or more scene segmentation machine learning algorithms. The mask layers may indicate the location, size, and/or outline of the objects (or the surfaces of objects) in the area of the property 120. The monitoring server 130 may proceed to provide portions of the images corresponding to different objects (or surfaces of objects) indicated by the mask layers to the one or more classifier machine learning algorithms as input. Accordingly, the one or more classifier machine learning algorithms may only analyze particular portions of images in the set of images 108 that have already been identified as corresponding to a particular object or a particular surface of an object, thereby reducing the processing burden and improving the classification results. The output of the one or more classifier machine learning algorithms may include a classification (or a set of most likely classifications) for each mask layer.

In some cases, identifying the object or the surface of an object using the one or more algorithms includes performing scene segmentation on the images using at least one algorithm of the one or more algorithms to identify one or more of the following: discrete objects in the area of the property based on the images; discrete surfaces of particular objects in the area of the property based on the images; individual areas each corresponding to only a single discrete object in the area of the property based on the images; or individual areas each corresponding to only a single discrete surface of particular objects in the area of the property based on the images. For example, the drone 102 or the monitoring server 130 may analyze the set of images 108 using one or more scene segmentation machine learning algorithms. The set of images 108 (or portions of images in the set of images 108) may be input to the one or more scene segmentation machine learning algorithms.

The output of these one or more scene segmentation machine learning algorithms can indicate discrete objects in the area of the property, discrete surfaces of particular objects in the area of the property based on the images, individual areas (e.g., outlines and/or discrete areas) each corresponding to only a single discrete object in the area of the property based on the images, and/or individual areas (e.g., outlines and/or discrete areas) each corresponding to only a single discrete surface of particular objects in the area of the property based on the images. For example, the output of the one or more scene segmentation machine learning algorithms may include a layer (e.g., a mask) for each of the objects or viewable surfaces of the objects. The layer may indicate the location, size, and/or shape of the corresponding object or surface of the object. For example, the output of a scene segmentation machine learning algorithm may be a mask corresponding to the table 126 depicted in the first image of the set of images 108.

The output of the one or more scene segmentation machine learning algorithms may be used by the drone 102 and/or the monitoring server 130 to determine if objects or surfaces of objects are planar. For example, the output of a scene segmentation machine learning algorithm may indicate an area corresponding to a particular surface of an object. The monitoring server 130 may identify a set of interest points within the area, and determine if the set of interest points are coplanar (e.g., threshold percent of the interest points are coplanar, and/or the interest points are coplanar within an acceptable error). The interest points may be determined using, for example, a point cloud generated from time-of-flight camera data and/or lidar data. The interest points may be determined using, for example, image analysis of visible-light and/or infrared light images to select points in the area and to proceed to estimate the distance of those points from the corresponding camera.

In some cases, the one or more scene segmentation machine learning algorithms receive additional information as input. For example, the one or more scene segmentation machine learning algorithms may also receive IR camera images, time-of-flight camera data, and/or lidar data to more accurately identify the discrete objects and/or surfaces in the area of the property 120, the locations of discrete objects and/or surfaces in the area of the property 120, and/or the sizes of discrete objects and/or surfaces in the area of the property 120.

In some cases, the one or more scene segmentation machine learning algorithms first receive an indication of the locations of discrete objects and/or surfaces of objects generated using one or more localization algorithms. For example, the monitoring server 130 may obtain bounding boxes for each of the objects (or surfaces of objects) that include representations in the set of images 108 (e.g., that are located in the property 120) generated using one or more localization machine learning algorithms. The monitoring server 130 may proceed to provide portions of the images corresponding to the identified bounding boxes to the one or more scene segmentation machine learning algorithms as input. Accordingly, the one or more scene segmentation machine learning algorithms may only analyze particular portions of images in the set of images 108 that have already been identified as corresponding to a particular object or a particular surface of an object, thereby reducing the processing burden and improving the scene segmentation results. The output of the one or more scene segmentation machine learning algorithms may include an outline and/or discrete area (e.g., corresponding to only the object or the surface of the object) for each bounding box.

In some cases, in order to be considered a landmark, an object or a surface of an object must meet some particular criteria. For example, as discussed in more detail below, the drone 102 or the monitoring server 130 may consider an object or a surface of an object a landmark if it meets one or more of the following: has a minimum size, can be viewed from a threshold number of vantage points, has a reliability score that meets a threshold reliability score, has a stability score that meets a threshold stability score, is identified as an acceptable type of object (e.g., is not a person, an animal, a pet, etc.), etc.

In some cases, identifying the landmarks in the area includes identifying groupings of related surfaces. For example, the drone 102 may identify a grouping of connected surfaces, and determine that these surfaces correspond to a single object. The drone 102 may determine that the object is and/or should be used as a landmark. Identifying groupings of related surfaces can include identifying one or more of the following: surfaces that are within a threshold distance from one another; surfaces that are adjacent to one another; surfaces that are coplanar; surfaces that are observed as having the same or substantially the same color; or surfaces that are in contact with one another. For example, the drone 102 and/or the monitoring server 130 may determine using the set of images 108 that a first surface corresponding to a first leg of the table 126 contacts two other surfaces corresponding to the first leg of the table. The drone 102 and/or the monitoring server 130 may also determine that two of the three surfaces are coplanar. Based on these determinations, the drone 102 and/or the monitoring server 130 may determine that the three surfaces together are considered a landmark (e.g., the first leg of the table 126 is considered a landmark).

In some cases, identifying groupings of related surfaces includes identifying groupings of surfaces that each correspond to a particular object or a portion of a particular object in the area of the property. For example, the drone 102 and/or monitoring server 130 may determine that a first surface corresponding to a first leg of the table 126, three surfaces that make up a first corner of the table 126, and a surface that corresponds to the top of the table 126 are related as all belong to the table 126. The drone 102 and/or the monitoring server 130 may make this determination by, for example, comparing the locations of the surfaces with a previous known location of the table 126. Alternatively, the drone 102 and/or the monitoring server 130 may make this determination by determining, e.g., using one or more machine learning algorithms, that the surfaces are directly or indirectly connected to one another, and are located in an area that has been classified as a table.

The process 600 includes determining that a particular landmark of the landmarks is planar (606). With respect to FIG. 1, the monitoring server 130 can determine that a particular landmark is planar. The monitoring server 130 can use the subset of images 108 and/or other sensor data in determining if a particular landmark is planar.

Determining that a particular landmark is planar can include determining that a set of interest points of the landmark are coplanar. For example, when a landmark is a set of interest points, the drone 102, the control unit 110, and/or the monitoring server 130 may determine whether the points in the set of interest points are coplanar. If it determined that the set of interest points are coplanar or, in some cases, that a significant portion of the interest points are coplanar (e.g., greater than 90%, 95%, 97%, etc.), then the drone 102, the control unit 110, and/or the monitoring server 130 may increase the reliability score of the landmark and/or mark the landmark as a stable landmark. Similarly, when a landmark is a superset of interest points, the drone 102, the control unit 110, and/or the monitoring server 130 may determine whether the points in the sets of interest points that make up the superset are coplanar in their respective sets, whether a significant portion of points in the sets of interest points that make up the superset are coplanar (e.g., greater than 90%, 95%, 97%, etc.), whether the points in the superset of interest points are coplanar, and/or whether a significant portion of points in the superset of interest points are coplanar (e.g., greater than 90%, 95%, 97%, etc.).

Determining that a particular landmark is planar can include determining that one or more surfaces, e.g., viewable surfaces, of the landmark are planar. For example, the table 126 can be determined to be a planar landmark because its table top is determined to be planar. Determining that a particular landmark is planar can include determining that the majority of surfaces, e.g., viewable surfaces, of the landmark are planar. For example, the table 126 can be determined to be a planar landmark because its table top is determined to be planar, and because each of its four legs are determined to have four planar surfaces.

Determining that a particular landmark is planar can include determining that the majority of the surface area, e.g., viewable surface area, is planar. For example, the table 126 can be determined to be a planar landmark because its table top is determined to be planar and makes up a majority of the table 126's total viewable surface area.

Determining that a particular landmark is planar can include determining that all of surfaces of the landmark are planar. For example, the table 126 can be determined to be a planar landmark because its table top is determined to be planar and to make up a majority of the table 126's total viewable surface area.

In determining if a surface is planar, the system, e.g., the monitoring server 130, can use data from one or more sensors. For example, the monitoring server 130 can use the images captured by the camera to visually determine what surfaces are planar, can use images captured by a time-of-flight sensor, and/or can use LiDAR data in determining if a surface is planar.

In determining if a surface is planar, the system, e.g., the monitoring server 130, can employ planar homography. For example, the monitoring server 130 can use planar homography, e.g., a pinhole camera model, to predict an expected change to a surface, e.g., change in distance to the surface and/or a change to the appearance of the surface, based on a change to the perspective and/or position of the camera (or other sensor) if the surface is planar. The monitoring server 130 can make a prediction as to the distance and/or appearance for one or more perspectives and/or positions of the camera (or other sensor) assuming that the surface is planar. If the prediction(s) match the measured distance(s) (or are within a threshold percentage of the measured distance(s)) and/or the actual appearance(s), then the monitoring server 130 can determine that the particular surface is planar and/or the corresponding landmark is planar.

As another example, the monitoring server 130 can identify planar surfaces by detecting and matching features between the images, and identifying regions in the images which conform to a planar homography as predicted by the change in pose as given by the visual inertial odometry (VIO) which is generally accurate over relatively small distances. This process of identifying planar surfaces can be augmented by filtering for regions which exhibit a degree of continuity in motion flow, and/or using a previously generated 3D map to estimate the orientation of the camera to the candidate surface.

In some cases, if a landmark is determined to be planar, the system, e.g., the monitoring server 130, can determine a landmark score for the landmark. The landmark score for the landmark can depend on, for example, the relative size of the planar surfaces that landmark has (e.g., compared to the total surface area of the landmark), the percentage of surfaces of the landmark that are planar, the absolute size of a planar surface of the landmark, an absolute number of planar surfaces of the landmark, one or more scores assigned to features of the landmark, and/or a reliability score of the landmark. In some implementations, each of the surfaces of a landmark can be considered a feature of the landmark. In some implementations, only planar surfaces of a landmark can be considered a feature of the landmark. In some implementations, only the planar surfaces of a landmark are considered a feature of the landmark.

In some cases, determining the expected stability for each of the landmarks includes: determining a reliability score for each of the landmarks that corresponds to the consistency in location of objects or surfaces of objects over time; determining a stability score for each of the landmarks that corresponds to the consistency in appearance of objects or surfaces of objects across viewpoint locations; and calculating the expected stability using the reliability score and the stability score. For example, the monitoring server 130 may average the reliability score for each of the landmarks with its corresponding stability score to determine an overall score for the landmark (e.g., the expected stability for the landmark). As another example, the monitoring server 130 may apply a first weight to the reliability score and a second weight to the stability score before combining the weighted reliability score and the weighted stability score. The monitoring server 130 may combine the two weighted scores by averaging them, adding them, multiplying them, etc. The result of combining the two weighted scores may be an overall score for the corresponding landmark (e.g., the expected stability for the landmark).

In some cases, determining a reliability score for a landmark includes determining a reliability score for each feature of the landmark and aggregating the feature reliability scores. Each feature may be a surface of a landmark (e.g., a surface of an object) or a group of surfaces of surfaces of a landmark. For example, a feature of the table 126 shown in FIG. 1 may be a first leg that is made up of four individual surfaces, each corresponding to a face of the first leg. As another example, the automatic blinds 112 may include a first feature corresponding to the blinds themselves and a second feature corresponding to the headrail. The monitoring server 130 may determine a low reliability score (e.g., 24/100) for the first feature/blinds to reflect that the blinds are often changing position and/or appearance, and a high reliability score for the second feature/headrail (e.g., 94/100) to reflect that the headrail is not often changing position and/or appearance. The monitoring server 130 may aggregate the two feature reliability scores to determine an overall reliability score for the blinds 112 by averaging the two scores, multiplying the two scores, adding the two scores, etc. Alternatively, the monitoring server 130 may apply a weight to each feature reliability score first before averaging the two scores, multiplying the two scores, adding the two scores, etc. The weight may be based on the size of the features (e.g., combined surface area of each of the features; the first feature of the blinds 112 may be weighted greater than the second feature due to having a larger surface area than a surface area of the second feature), a classification of the features, a location of the features, etc.

Continuing the previous example, the monitoring server 130 may determine to only use the second feature/headrail as a landmark instead of the blinds 112 as a whole. For example, the monitoring server 130 may apply a threshold reliability score to the feature reliability scores in determining if an entire object or only a portion of an object should be used as a landmark. If all features meet the threshold reliability score (e.g., 80/100), then the monitoring server 130 may determine that the entire object can be used as a landmark (e.g., if stability score requirements are met). However, if one or more features do not meet the threshold reliability score, then the monitoring server 130 may determine to use only the passing features as landmarks.

In some cases, determining a stability score for a landmark includes determining a stability score for each feature of the landmark and aggregating the feature stability scores. Each feature may be a surface of a landmark (e.g., a surface of an object) or a group of surfaces of surfaces of a landmark. For example, a feature of the table 126 shown in FIG. 1 may be a first leg that is made up of four individual surfaces, each corresponding to a face of the first leg. A second feature of the table 126 may be a top of the table that is made up of a single surface. The monitoring server 130 may determine a low stability score (e.g., 40/100) for the first leg to reflect that the leg appears differently from different vantage points, is not planar (e.g., if the first leg is cylindrical), and/or is hidden from view from many vantage points, and a high reliability score for the top (e.g., 91/100) to reflect that the top is visible from many vantage points, is large, and is planar. The monitoring server 130 may aggregate the two feature stability scores to determine an overall stability score for the table 126 by averaging the two scores, multiplying the two scores, adding the two scores, etc. Alternatively, the monitoring server 130 may apply a weight to each feature stability score first before averaging the two scores, multiplying the two scores, adding the two scores, etc. The weight may be based on the size of the features (e.g., combined surface area of each of the features; the top of the table 126 may be weighted greater than the first leg due to the top having a larger surface area than a surface area of the first leg), a classification of the features, a location of the features, etc.

Continuing the previous example, the monitoring server 130 may determine to only use the second feature/top as a landmark instead of the table 126 as a whole. For example, the monitoring server 130 may apply a threshold reliability score to the feature stability scores in determining if an entire object or only a portion of an object should be used as a landmark. If all features meet the threshold stability score, then the monitoring server 130 may determine that the entire object can be used as a landmark (e.g., if reliability score requirements are also met). However, if one or more features do not meet the threshold stability score, then the monitoring server 130 may determine to use only the passing features as landmarks.

In some cases, calculating the expected stability using the reliability score and the stability score includes aggregating the reliability score and the stability score. For example, the drone 102 or the monitoring server 130 can average the reliability score and the stability score to determine an overall score (e.g., a landmark score) corresponding to the expected stability of the landmark. Similarly, the drone 102 or the monitoring server 130 can multiply the two scores, add the two scores, or perform other operations with the two scores to derive an overall score corresponding to the expected stability of the landmark. The drone 102 or the monitoring server 130 may, in some cases, apply a first weight to the reliability score and a second weight to the stability score, and proceed to use the weighted scores to determine an overall score corresponding to the expected stability of the landmark. The weights applied may be determined using one or more machine learning algorithms. For example, the weights applied may be updated over time to reflect improvements in identifying stable/reliable landmarks for drone navigation. The drone 102 and/or the monitoring server 130 may compare the overall score to a threshold score to determine if the landmark should be added to a three-dimensional map of the property 120 and/or area of the property 120.

In some cases, determining the reliability score for each of the landmarks includes determining the reliability score for each of the landmarks based one on or more of the following: frequency that a landmark or a portion of a landmark changes position; frequency that a landmark or a portion of a landmark changes appearance; level of uncertainty associated with a landmark or a portion of a landmark; or a classification of a landmark. For example, the monitoring server 130 may determine a high reliability score (e.g., 94/100) for a top surface of the table 126 based on the table 126 changing position infrequently (e.g., position changes more than 10.0 cm only once a month on average), position changes being below a threshold level (e.g., 98% of position changes are less than 1.0 cm), being classified as a table (e.g., which may have a default reliability score of 85/100), and/or there being a low uncertainty corresponding to the top surface of the table 126 (e.g., due to its large surface area).

In some cases, determining the stability score for each of the landmarks includes determining the stability score for each of the landmarks based one on or more of the following: number of vantage points that a landmark or a portion of a landmark is capable of being viewed from with respect to the camera; variability in appearance of a landmark or a portion of a landmark from different perspectives of the camera or different vantage points; maximum distance from which a landmark or a portion of a landmark is capable of being viewed from with respect to the camera; magnitude of parallax observed with a landmark or a portion of a landmark; level of uncertainty associated with a landmark or a portion of a landmark; a classification of a landmark; or prevalence of planar surfaces of a landmark or a portion of a landmark. For example, the monitoring server 130 may determine a high stability score for the top surface of the table 126 (e.g., 96/100) due to the top surface being viewable from a high percent of vantage points of the drone 102 (e.g., from at least 90% of possible vantage points in the area of the property 120), due the top surface being identifiable from far away (e.g., can be identified with at least 97% accuracy from the one or more furthest vantage points in the area of the property 120), and/or due to the top surface being coplanar.

In some cases, determining the stability score for each of the landmarks includes determining that the respective landmark or a surface of the respective landmark is planar by: identifying a set of interest points corresponding to the landmark or to a surface of the landmark; and determining that a threshold percent of the interest points are coplanar. For example, as described above, the monitoring server 130 and/or the drone 102 may generate a point cloud using the set of images 108, other images (e.g., IR images), time-of-flight camera data, and/or lidar data. The point cloud may include points corresponding to the landmark or the surface of the landmark. The monitoring server 130 and/or the drone 102 may, if the point cloud includes points other than those corresponding to the landmark or the surface of the landmark, identify a subset of points in the point cloud corresponding to the landmark or the surface of the landmark. The monitoring server 130 and/or the drone 102 may proceed to determine if a threshold percent of the interest points are coplanar. For example, the monitoring server 130 may determine that at least 95% of the points corresponding to the top surface of the table 126 to conclude that the top surface of the table 126 is planar. Determining if points are coplanar may include determining that the points are substantially in the same plane (e.g., within an acceptable level of error to account for sensor inaccuracies).

In some cases, where no landmark (e.g., no landmark in the viewable vicinity of the drone 102) is detected with a sufficient reliability score (or an insufficient number of landmarks have a sufficient reliability score), a refinement algorithm may be executed with positions of detected landmarks that could have moved. For example, a threshold reliability score may be set to 95%. If the drone 102 detects a landmark that has a reliability score of at least 95%, then there is sufficient confidence in the landmark for the drone 102 to determine, for example, its current position and/or pose, and/or to continue navigation using the detected landmarks. However, if the drone 102 fails to detect a landmark with a reliability score of at least 95%, then the drone 102 may trigger the execution of a refinement algorithm (e.g., iterative closest point algorithm) with positions of detected landmarks that could have moved. For example, the drone 102 may detect a chair with a reliability score of 80% and a table with a reliability score of 90%. The drone 102 may provide the positions of the chair and the table to a refinement algorithm which may use the positions as an initial estimate (e.g., an initial estimate of the drone 102's location in the property and/or of the positions of the table and the chair). However, leveraging a sufficiently reliable landmark, when detected, may be preferred over executing a refinement algorithm since such algorithms can be to CPU demanding.

The output of the refinement algorithm may be a more accurate location of the drone 102 in the property, and/or more accurate positions of the chair and table. The drone 102 may compare the positions of chair and table to the positions of the chair and table shown in the map, and, based on the comparison, update the reliability scores for the chair and table. For example, if the position of the table indicated by the output of the refinement algorithm is in the same position or substantially same position as indicated by the map (e.g., within an acceptable percent error), then the drone 102 may increase the reliability score of the table from 90% to 95%.

As another example, the refinement algorithm may be executed in response to determining that that the detected landmarks do not have a sufficient reliability score and stability score. For example, the drone 102 may compare reliability scores corresponding to the landmarks detected at the current location of the drone 102 (e.g., landmarks that are viewable and/or recognizable from one or more sensors of the drone 102; landmarks that the drone 102 is currently relying on to navigate thought the property 120, etc.) to a threshold reliability score, and stability scores corresponding to those landmarks to a threshold stability score. If no landmarks (or an insufficient number of landmarks) meet the threshold reliability score and the threshold stability score, the drone 102 may execute one or more refinement algorithms (e.g., to improve localization of the drone 102 in the property 120).

The output of the refinement algorithm(s) may be used to improve localization (e.g., to identify a more accurate location of the drone 102 with respect to the property 120). The output may also or alternatively be used to update the locations of landmarks in a map of the property 120. For example, after the drone 102 is localized using the output of the refinement algorithms, the drone 102 may update the positions of one or more landmarks in a map of the property 120.

In some cases, the drone 102 (or the monitoring server 130) may compare the updated positions of the landmarks to the detected positions or to previously determined positions of the landmarks (e.g., positions of landmarks in an existing map for the property 120 that the drone 102 is using to navigate the property 120). The reliability scores and/or stability scores for the landmarks may be updated to account for the change in position of the landmarks (e.g., the change in the landmarks' positions within a coordinate system for the property 120). For example, if the drone 102 determines that a landmark's position needs to be update, the drone 102 may reduce the reliability score for the landmark. Similarly, the extent to which the reliability scores and/or stability scores are changed may depend on the extent of the change in position of the landmarks. For example, the drone 102 may reduce the reliability score for a landmark by 5% if the change in position was between 1.0 and 5.0 cm in magnitude. However, the drone 102 may reduce the reliability score by 10% if the change was greater than 10.0 cm in magnitude.

The process 600 includes generating a map for the area that indicates that the particular landmark is planar (608). The map can be a 3D map. The 3D map can be a 3D representation of all or part of the area. The 3D map can be a filtered 3D representation of the area, e.g., after one or more indications of physical objects have been removed from the 3D representation due to the physical objects having a corresponding landmark score that did not meet a threshold landmark score. As example, as described with respect to FIG. 1, the monitoring server 130 can generate a 3D environment map.

As shown in FIGS. 2A-2B, an environment map 230 can be generated based on the physical objects within the floor 220 of a property such that each physical object corresponds with a visual landmark. Each visual landmark may be provided a reliability score. A threshold landmark score may be applied to the identified landmarks such that those landmarks having a reliability score that does not meet the threshold landmark score are removed from the environment map. Additionally or alternatively, those landmarks that are not planar landmarks might not be added to the environment map during generation of the environment map, and/or can be removed from the environment map.

In some cases, the map generated only includes landmarks that are determined to be planar landmarks.

In some cases, the map generated includes landmarks that are determined to be planar landmarks and landmarks that are not determined to be planar landmarks. The system, e.g., the monitoring server 130 shown in FIG. 1, can determine a higher landmark score for those landmarks that are determined to be planar landmarks, and/or can increase the landmark score for those landmarks that are determined to be planar landmarks. Accordingly, planar landmarks are more likely to be added to the environment map due to being more likely to meet a landmark score threshold.

In some cases, the map includes indications of those landmarks that are planar landmarks. For example, the landmarks in the map can have corresponding metadata. This metadata can include an indication for each of the identified landmarks whether the landmark is planar or non-planar. As another example, the system, e.g., the monitoring server 130 shown in FIG. 1, can overlay (e.g., highlight) those landmarks that are planar landmarks with a particular shading and/or color in the map to identify those landmarks as planar landmarks.

In some cases, the map includes indications of surfaces of landmarks that are planar. For example, the surfaces in the map can have corresponding metadata. This metadata can include an indication for each of the surfaces whether the surfaces is planar or non-planar. As another example, the system, e.g., the monitoring server 130 shown in FIG. 1, can overlay (e.g., highlight) those surfaces that are planar surfaces with a particular shading and/or color in the map to identify those surfaces as planar surfaces.

In some cases, generating the map includes updating a previously generated map. For example, the structure of the area can be initially produced based on a known layout of the property (e.g., property blueprint) and/or by a first flight of a drone in the area. This structure of the area can serve as a map, e.g., the previously generated map, or can be converted into a map, e.g., by the monitoring server 130 shown in FIG. 1. The structure can include the physical objects that are in the area. These physical objects can include, for example, walls, obstacles, doorways, or the like. The structure be captured using the methods described above. For example, the structure of the area can be captured using one or more of a camera, a time-of-flight sensor, or a LiDAR system. Specifically, the structure of the area can be captured using, for example, VIO-assisted SLAM, RGB-D SLAM, or other techniques.

Generating the map can include updating the initial structure of the area to include, for example, landmarks that are determined to be planar landmarks.

Generating the map can alternatively or additionally include updating the initial structure of the area to include, for example, surfaces that are determined to be planar surfaces.

Generating the map can alternatively or additionally include updating the initial structure of the area to include, for example, landmarks that are determined to not be planar landmarks.

Generating the map can alternatively or additionally include updating the initial structure of the area to include, for example, surfaces that are determined to not be planar surfaces.

Generating the map can alternatively or additionally include updating the initial structure of the area to include, for example, indications of landmarks that are determined to be planar landmarks.

Generating the map can alternatively or additionally include updating the initial structure of the area to include, for example, indications of surfaces that are determined to be planar surfaces.

In some cases, updating the previously generated map can include identifying one or more regions or groupings of surfaces in the previously generated map as a landmark. After these regions or groupings are identified, updating the previously generated map can include one or more of the following: highlighting (e.g., shade and/or color overlay) those regions or groupings of surfaces if the corresponding landmark is determined to be a planar landmark; highlighting (e.g., shade and/or color overlay) those regions or groupings of surfaces if one or more of the surfaces are determined to be planar surfaces; highlighting (e.g., shade and/or color overlay) those regions or groupings of surfaces if a number of the surfaces determined to be planar surfaces meet a threshold number; removing those regions or groupings of surfaces if the corresponding landmark is determined to not be a planar landmark; removing those regions or groupings of surfaces if none of the surfaces are determined to be planar surfaces; removing those regions or groupings of surfaces if a number of the surfaces determined to be planar surfaces does not meet a threshold number; adding metadata corresponding to the regions or groupings of surfaces if the corresponding landmark is determined to be a planar landmark, the metadata indicating that the landmark is a planar landmark; adding metadata corresponding to the regions or groupings of surfaces if one or more of the surfaces are determined to be planar surfaces, the metadata indicating that the corresponding landmark is a planar landmark; or adding metadata corresponding to the regions or groupings of surfaces if a number of the surfaces determined to be planar surfaces meet a threshold number, the metadata indicating that the corresponding landmark is a planar landmark.

In some cases, updating the previously generated map can include identifying one or more surfaces in the previously generated map as planar. After these one or more surfaces are identified, updating the previously generated map can include one or more of the following: highlighting (e.g., shade and/or color overlay) the one or more surfaces if the corresponding landmark is determined to be a planar landmark; highlighting (e.g., shade and/or color overlay) the one or more surfaces if they are determined to be planar surfaces; removing the one or more surfaces if the corresponding landmark is determined to not be a planar landmark; removing the one or more surfaces if the surfaces are determined to not be planar surfaces; adding metadata corresponding to the one or more surfaces if the corresponding landmark is determined to be a planar landmark, the metadata indicating that the landmark is a planar landmark and/or that the surfaces are planar surfaces; or adding metadata corresponding to the one or more surfaces if the surfaces are determined to be planar surfaces, the metadata indicating that the surfaces are planar surfaces.

The process 600 optionally includes transmitting the map to one or more electronic devices. For example, with respect to FIG. 1, the drone 102 may transmit the generated map to the monitoring server 130 over the network 140. Alternatively, the monitoring server 130 may transmit the generated map to the drone 102. The drone 102 may proceed to store the map and/or use the map to navigate through the property 120.

In some cases, the process 600 optionally includes comparing the expected stability for each of the landmarks to a minimum level of stability to identify a subset of landmarks that meet the minimum level of stability. For example, the drone 102 and/or the monitoring server 130 may compare the expected stability for each of the landmarks to a threshold landmark score to identify a subset of landmarks that have a sufficient expected stability (e.g., to be used for consistent and/or reliable navigation). Generating the map for the area can include generating a map for the area (e.g., a three-dimensional map) that includes representations of only the landmarks in the subset of landmarks; or generating a map for the area that includes representations of the landmarks in the subset of landmarks, the representations tagged to indicate that the corresponding landmarks have a sufficient level of stability.

In some cases, comparing the expected stability for each of the landmarks to the minimum level of stability includes: comparing reliability scores for the landmarks to a threshold reliability score to identify the subset of landmarks that meet the threshold reliability score; and comparing stability scores for the landmarks to a threshold stability score to identify the subset of landmarks that meet the threshold stability score. For example, the drone 102 and/or the monitoring server 130 may determine that a representation of the table 126 should only be added to the three-dimensional map for the property 120 or should only be tagged as a sufficiently stable/reliable landmark after determining that a reliability score of the table 126 meets a threshold reliability score (e.g., 80/100), and that a stability score of the table 126 meets a threshold stability score (e.g., 85/100).

Figure 7:
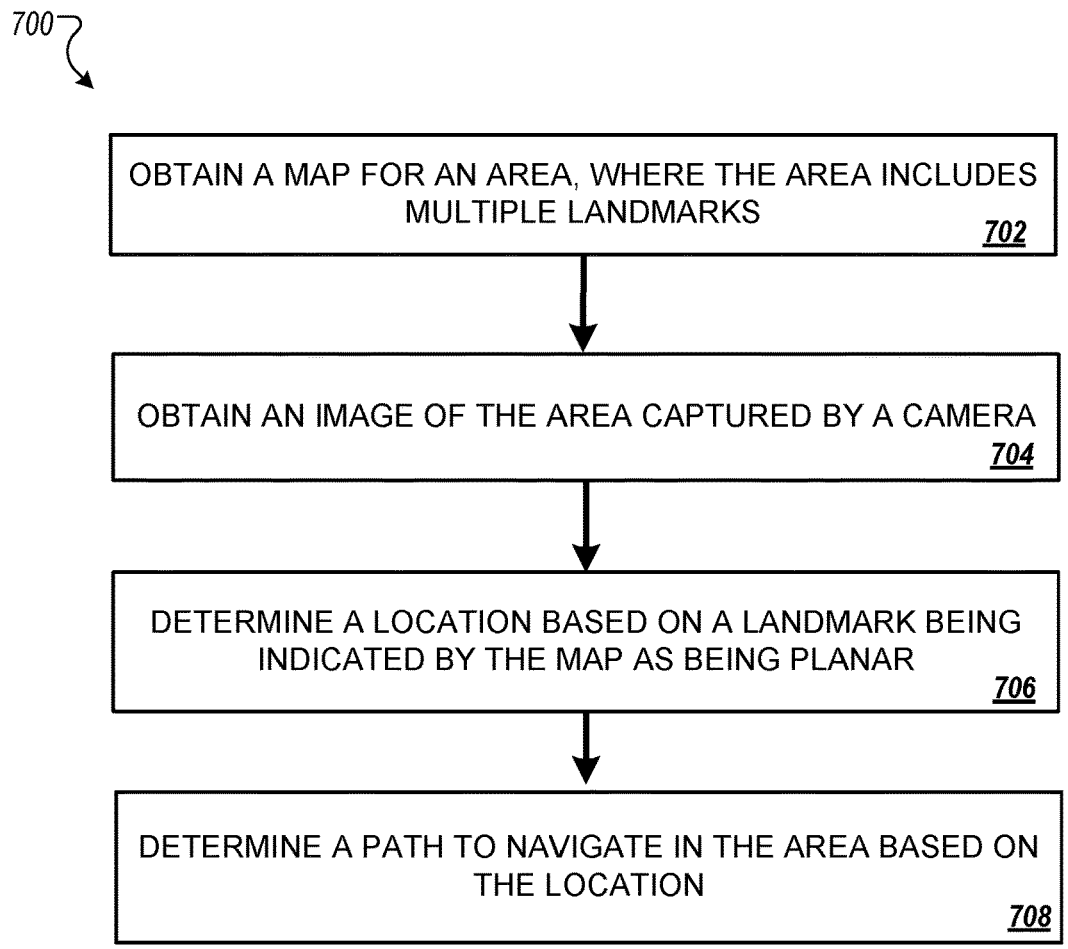
FIG. 7 is a flowchart of an example process for navigating through an area using an environment map.

FIG. 7 is a flowchart of an example process 700 for navigating through an area using an environment map. The process 700 can be performed, at least in part, using the system 100 described in FIG. 1 or the monitoring system 900 described in FIG. 9.

The process 700 includes obtaining a map for an area, where the area includes multiple landmarks (702). The map can indicate the structure of the area, e.g., one or more of the physical objects in the area. These physical objects can include walls, obstacles, doorways, etc. For example, as shown in FIG. 3, the drone 302 can access or be provided an environment map 230. As shown in FIGS. 2A-2B, the environment map 230 contains multiple landmarks that each correspond to a physical object located in the area of the floor 220. Each of the landmarks in the environment map 230 are provided a reliability score, e.g., by the monitoring server 130 shown in FIG. 1.

The map can include indications of the structure of the area, e.g., the walls, obstacles, and/or doorways, in the area. The map can be generated and/or updated using sensor data, such as image data captured by a camera or a time-of-flight sensor, and/or LiDAR data. The map can be generated using, for example, VIO-assisted SLAM, RGB-D SLAM, or other techniques.

With respect to FIG. 1, the map can be stored on the monitoring server 130. Additionally or alternatively, the map, or another version of the map, can be stored on the drone 102.

In some cases, the system, e.g., the monitoring server 130, analyzes the map to identify planar landmarks and/or planar surfaces in the map. In identifying planar landmarks and/or planar surfaces, the system, e.g., the monitoring server 130, can employ planar homography. In identifying planar landmarks and/or planar surfaces, the system, e.g., the monitoring server 130, can use the techniques described above with respect to FIG. 6.

The process 700 includes obtaining an image of the area captured by a camera (704). The image captured can be of a region in the area, as indicated by the map, that includes a planar landmark and/or a planar surface. For example, the image captured can be of a region in the map that includes landmark having one or more planar surfaces, or having a robust planar surface. A robust planar surface may refer to a planar surface of a landmark having a sufficient number of unique local interest points so that the planar surface is easily detectable (e.g., the drone 102 can consistently match a template to the planar surface) in a variety of lighting conditions and from a variety of angles (e.g., poses of the drone 102 and/or positions of the camera 104). The map can identify surfaces on the map which appear to be planar or have been previously identified as being planar. For example, with respect to FIG. 1, the drone 102 can orientate itself or its camera 104 using the map such that the camera 104 is aimed at a region in the map that includes a planar landmark, e.g., a landmark having one or more planar surfaces.

The camera can be a visible light camera. The camera can be a time-of-flight sensor. The camera can capture one or more other images in addition to the image.

In some cases, multiple images are captured. For example, with respect to FIG. 1, the drone 102 can capture multiple images and can then sample those images to generate the subset of images 108 to provide to the monitoring server 130. The drone can provide other sensor data to the monitoring server 130 in addition to the images or in place of the images. This other sensor data can include LiDAR data. The drone can provide metadata corresponding to the subset of images 108, such as orientation data (e.g., coordinates) that indicates that orientation of the camera 104 and/or the drone 102 for each of the images in the subset of images 108. The images captured can be those regions in the map that were identified as having a larger number of image features, e.g., planar surfaces of planar landmarks. For example, the drone 102 can use the map to identify those regions in the map that were identified as having a relatively large number of planar surfaces, and can position itself or the camera 104 in order to capture one or more images of each of these regions.

In some cases, obtaining an image of the area captured by a camera includes obtaining multiple images of a region in the area that includes a planar landmark, e.g., as indicated by the map. For example, with respect to FIG. 1, the drone 102 can use the camera 104 to capture multiple images of a region of the property 120 that includes the table 126 due to an environment map for the property 120 indicating that the table 126 is planar landmark and/or has one or more planar surfaces. In capturing the multiple images, the drone 102 can change its orientation or the orientation of the camera 104 to capture images of the table 126 from a variety of poses, e.g., the drone 102 can rotate in place which would introduce minimum VIO drift.

In some cases, obtaining an image of the area captured by a camera includes obtaining multiple images of a region in the area that includes a candidate landmark, e.g., as indicated by the map. A candidate landmark can be defined as a landmark that might be added to the map. The candidate landmark can be a planar landmark. For example, the physical object can be identified as candidate landmark due to having one or more planar surfaces, and/or due to being identified as a planar landmark. With respect to FIG. 1, the table 126 can be identified as a candidate landmark due to the drone 102 determining that its table top forms a planar surface.

In some cases, sensor data other than images is captured. For example, LiDAR data can be captured. With respect to FIG. 1, the drone 102 can include a LiDAR system. This system can be used in generating the map or an initial version of the map. For example, the LiDAR system can be used to generate a 3D representation of the area which is then augmented with other collected sensor data.

The process 700 includes determining a location based on a landmark being indicated by the map as being planar (706). The map can include, for example, only landmarks meeting a threshold landmark score, only landmarks that are determined to be planar landmarks, and/or landmarks having a planar surface. The captured image can include the landmark that was identified by the map as being planar, and can be used by the system, e.g., the drone 102 shown in FIG. 1, in determining a location based on the landmark that was identified by the map as being planar. The location can be a location of a camera used to capture the image. For example, the location can be the location of the camera 104 of the drone 102, and/or can be a location of the drone 102.

In determining a location based on a landmark being indicated by the map as being planar, the system, e.g., the drone 102 shown in FIG. 1, can compare surfaces on the map which appear to be planar or have been previously identified as being planar with the captured image. The drone 102 can then determine its location, or the location of the camera 104, in the map by matching the planar surfaces in the captured images with those that are shown or are indicated in the map. The location determined can be an approximate location.

In some cases, where multiple images are captured, determining a location based on a landmark being indicated by the map as being planar can include the system, e.g., the drone 102 shown in FIG. 1, identifying planar surfaces in the multiple images, detecting and matching features (e.g., particular planar surfaces) between subsequent images (e.g., captured by the drone 102 and/or the camera 104 in different poses), and identifying regions in the images which conform to a planar homography as predicted by the change in pose as given by, for example, the VIO. This process can be augmented by, for example, filtering for regions in the images which exhibit a degree of continuity in motion flow, and/or using the map to estimate the orientation of the camera 104 to the candidate surface. These augmentations can be used to, for example, reduce processing requirements. The location determined can be, for example, the location of the camera 104 and/or the drone 102 in the map. The location determined can be an approximate location.

In some cases, prior to this point, the drone 102 shown in FIG. 1, may have been navigating through the area using SLAM techniques. However, these techniques can suffer from VIO drift. Accordingly, the drone 102 can use the location determined based on a landmark being indicated by the map as being planar to update or correct its location in the area and/or in the map.

In some cases, the process 700 optionally includes refining a location based on the location of the landmark. For example, with respect to FIG. 1, once the approximate location of the drone 102 and/or the camera 104 is determined within the map, the drone 102 can approximate transformation between itself and the landmark, e.g., the table 126, based on a planar homography estimation. The planar homography estimation may have been previously made by the drone 102 and/or the monitoring server 130. The drone 102 can proceed to observe the landmark, e.g., the table 126, from a variety of poses, use the camera 104 to capture images from those variety of poses, and use the captured images to refine the planar homography. In some implementations, the captured images are sent to the monitoring server 130 which uses the captured images to refine the planar homography.

The drone 102 and/or the monitoring server 130 can use the refined planar homography to, for example, verify that the landmark is planar and robust to changes in view angle while also reducing the error in the drone-to-landmark transformation. If the landmark is determined not to actually be planar and/or not to be robust to changes (e.g., its planar surfaces are observable to the drone 102 and/or the camera 104 from a variety of poses), then the drone 102 and/or the monitoring server 130 can remove the landmark from the map, can lower a landmark score for the landmark, can update the landmark on the map to indicate that the landmark is no longer a planar landmark (which can also affect the landmark score), can update a feature of the landmark (e.g., remove a planar feature of the landmark which could lower the landmark score for the landmark), or the like.

The drone 102 can additionally or alternatively confirm the planar nature of the landmark and drone-to-landmark transformation by using a time-of-flight sensor or some other depth sensor. For example, if after further observation, the drone 102 suspects that the landmark is not actually a planar landmark, the drone 102 can use a time-of-flight sensor (e.g., used to measure distance between the sensor and the landmark or between the sensor and a particular surface of the landmark) and planar homography techniques to verify that the landmark does not have a planar surface and/or does not have a robust planar surface (e.g., the planar surface is difficult to observe due to planar surface's size, not being observable from one or more poses of the drone 102 and/or the camera 104, lacking distinct visual features, being too reflective, poor lighting such as too dark in the area where the planar surface is located, etc.).

In some cases, once a location has been refined based on a location of the landmark, the process 700 optioning includes locating any other previously mapped landmarks. For example, with respect to FIG. 1, locating any other previously mapped landmarks can include using the drone 102 to locate any previously mapped landmarks such as physical objects and 3D structures with the drone. Using the locations of these one or more previously mapped landmarks, the drone 102 and/or the monitoring server 130 can refine the position of the landmark, can update a location of the landmark in the map, and/or can further refine a location of the drone 102 and/or the camera 104.

These previously mapped landmarks can be located by the drone 102 rotating in place. For example, the drone 102 can rotate 360 degrees and use the camera 104 to obtain an image every two degrees, 10 degrees, or 15 degrees of rotation.

These previously mapped landmarks can be those that are only considered highly reliable, e.g., those landmarks that are determined to be both robust and planar, and/or those landmarks that are determined to be planar, robust, and stable.

Stability of a landmark can be determined by, for example, how often the landmark moves, how often the landmark is able to be identified (e.g., might be easy for a drone to find the landmark in the morning, but difficult or impossible for the drone to identify the landmark in the afternoon), input provided by a user, and/or by detected conditions. As an example, a doorway can be considered highly reliable due to never moving significantly. If the doorway is near the drone 102 when it is refining a location of a landmark, the drone 102 can always locate the doorway relative to the landmark due to the doorways high reliability.

The stability of a landmark may also be dependent on detected conditions and, therefore, may be able to change over time. For example, the blinds 112 on the window 128 may have a higher stability (e.g., which may result in a higher reliability score) when the control unit 110 detects that the window 128 is closed (e.g., using a magnetic window sensor). However, if the control unit 110 detects that the window 128 is open, then the reliability score of the blinds 112 may be lowered (e.g., by the control unit 110) due to the increased likelihood of the blinds 112 moving, e.g., due to wind. The control unit 110 may reference weather data in determining the stability and/or adjusting the reliability score for the blinds 112. For example, the reliability score of the blinds 112 may be left unchanged if weather data indicates that the winds are 5 mph or less and the window 128 is open. However, the stability of the blinds 112 may be significantly lowered if the weather data indicates that the winds are greater than 40 mph and the window 128 is open.

In determining an absolute location with respect to the map, the drone 102 and/or the monitoring server 130 can give preferences to more reliable landmarks, e.g., those with higher landmark scores.

In some cases, the process 700 optionally includes securing the landmark to the map. For example, the landmark, e.g., if determined to be a planar landmark and/or a robust landmark, can be secured to the map, e.g., as part of the structure of the area. For example, if the landmark is a painting on a wall of the area, the drone 102 and/or the monitoring server 130 can assume that the painting is reasonably flush with the wall surface and parallel with it. The drone 102 and/or the monitoring server 130 can update the map to integrate the landmark with the wall, e.g., to treat the painting and wall combined as a single landmark with a single planar surface.

In some cases, the process 700 optionally includes updating a location of the landmark in the map. For example, the drone 102 can use the location of one or more other landmarks to update the location of the landmark.

The process 700 includes determining a path to navigate in the area based on the location (708). For example, as shown in FIG. 3, the drone 302 can generate a route through the floor 220 such that one or more landmarks, such as one or more planar landmarks, of the floor 220 will be observable and/or unobstructed along the entirety of the route or at certain points along the route. As shown in FIG. 3, the drone 302 generates a route from its current position 306b, to a second position 310 near the landmark 238, to a third position 312 near the landmark 234, and to a fourth position 314 near the landmark 232.

Figure 8:
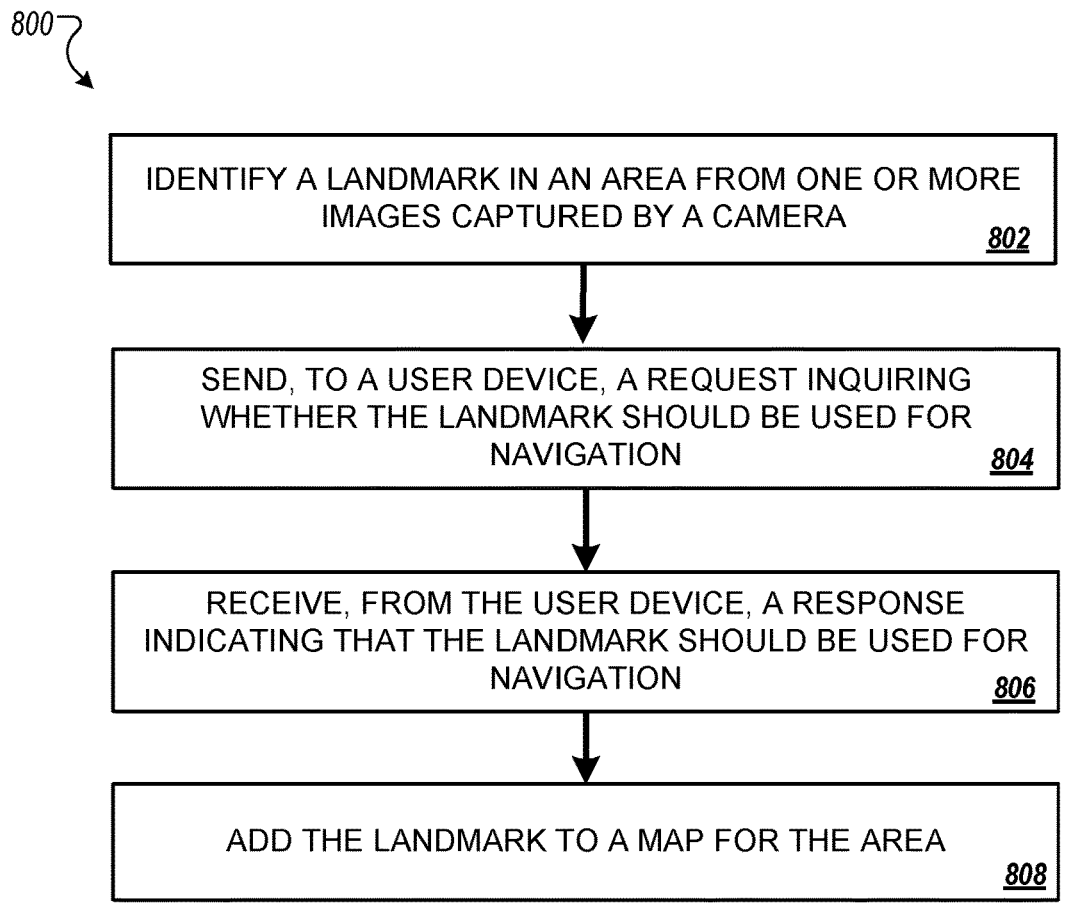
FIG. 8 is a flowchart of an example process for updating an environment map to be used in visual navigation.

FIG. 8 is a flowchart of an example process 800 for updating an environment map to be used in visual navigation. The process 800 can be performed, at least in part, using the system 100 described in FIG. 1 or the monitoring system 900 described in FIG. 9.

The process 800 includes, for example, identifying a landmark in an area from one or more images captured by a camera (802). The landmark can be identified as a planar landmark and/or as a landmark having one or more planar surfaces using the techniques described above with respect to FIGS. 6-7. The camera can be a visible light camera. The camera can be a time-of-flight sensor.

The process 800 includes sending, to a user device, a request inquiring whether the landmark should be used for navigation (804). As an example, with respect to FIG. 1, the request can be sent by the monitoring server 130 over the network 140 to a user device. The user device can be a computing devices such as a smartphone, a laptop computer, a desktop computer, a tablet, or the like.

The request can include an inquiry as to whether the landmark is reliable (e.g., asking how often the landmark moves, if there are plans to move the landmark, if other objects near the landmark frequently move, or the like).

The request can include an inquiry as to whether the landmark has planar surfaces and/or robust planar surfaces.

The request can include an inquiry for a binary response (e.g., a yes or no response) as to whether the landmark should be used for navigation.

In some cases, the request is only sent to the user device after the system, e.g., the drone 102 and/or the monitoring server 130, has identified the landmark as a candidate landmark. The landmark can be identified as a candidate landmark based on having one or more planar surfaces, a majority of its observable surfaces being planar surfaces, having a robust planar surface (e.g., a relatively large planar surface and/or a planar surface that readily observable from various poses of a camera), or the like.

In some cases, the request is only sent to the user device after the system, e.g., the drone 102 and/or the monitoring server 130, has identified the landmark as a planar landmark.

In some cases, the request is only sent to the user device after the system, e.g., the drone 102 and/or the monitoring server 130, has identified the landmark as a robust landmark.

The process 800 includes receiving, from the user device, a response indicating that the landmark should be used for navigation (806).

The process 800 includes add the landmark to a map for the area (808). As an example, with respect to FIG. 1, the landmark can be added to the map by the monitoring server 130. The monitoring server 130 can send the drone 102 an updated map containing that landmark. The drone 102 can proceed to use the updated map to navigate through the property 120. The previous map used by the drone 102 may have only, for example, included landmarks in the property 120 corresponding to structure (e.g., walls, doors, ceiling, floors, or the like), and/or landmarks that were previously approved to be used for navigation.

In some cases, adding the landmark to the map includes securing the landmark to the map. For example, the landmark, e.g., if determined to be a planar landmark and/or a robust landmark based on the response, can be secured to the map, e.g., as part of the structure of the area. For example, if the landmark is a painting on a wall of the area, the drone 102 and/or the monitoring server 130 can assume that the painting is reasonably flush with the wall surface and parallel with it. The drone 102 and/or the monitoring server 130 can update the map to integrate the landmark with the wall, e.g., to treat the painting and wall combined as a single landmark with a single planar surface.

Figure 9:
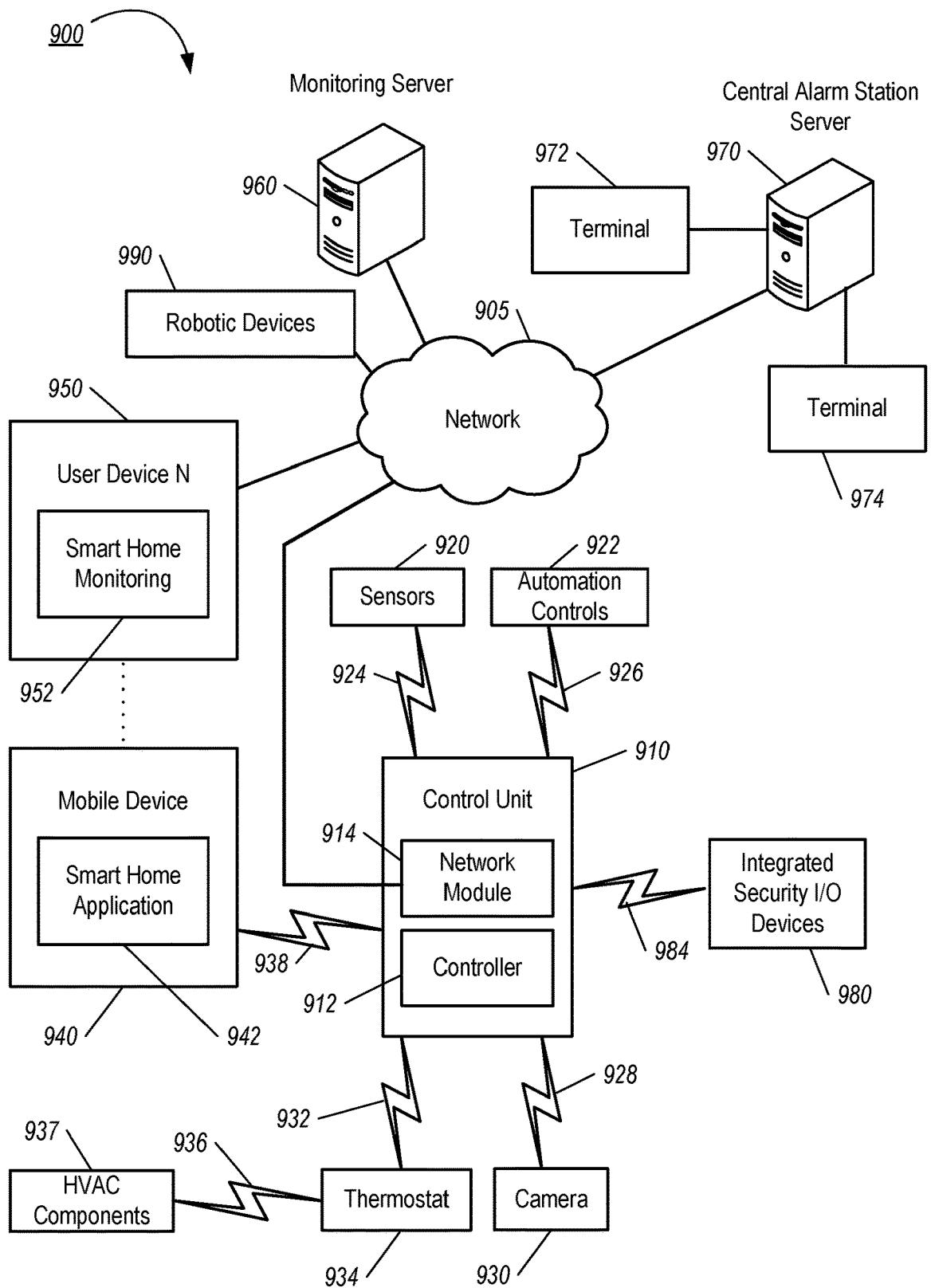
FIG. 9 is a block diagram illustrating an example security monitoring system.

FIG. 9 is a diagram illustrating an example of a home monitoring system 900. The monitoring system 900 includes a network 905, a control unit 910, one or more user devices 940 and 950, a monitoring server 960, and a central alarm station server 970. In some examples, the network 905 facilitates communications between the control unit 910, the one or more user devices 940 and 950, the monitoring server 960, and the central alarm station server 970.

The network 905 is configured to enable exchange of electronic communications between devices connected to the network 905. For example, the network 905 may be configured to enable exchange of electronic communications between the control unit 910, the one or more user devices 940 and 950, the monitoring server 960, and the central alarm station server 970. The network 905 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 905 may include multiple networks or subnetworks, each of which may include, for example, a wired or wireless data pathway. The network 905 may include a circuit-switched network, a packet-switched data network, or any other network able to carry electronic communications (e.g., data or voice communications). For example, the network 905 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 905 may include one or more networks that include wireless data channels and wireless voice channels. The network 905 may be a wireless network, a broadband network, or a combination of networks including a wireless network and a broadband network.

The control unit 910 includes a controller 912 and a network module 914. The controller 912 is configured to control a control unit monitoring system (e.g., a control unit system) that includes the control unit 910. In some examples, the controller 912 may include a processor or other control circuitry configured to execute instructions of a program that controls operation of a control unit system. In these examples, the controller 912 may be configured to receive input from sensors, flow meters, or other devices included in the control unit system and control operations of devices included in the household (e.g., speakers, lights, doors, etc.). For example, the controller 912 may be configured to control operation of the network module 914 included in the control unit 910.

The network module 914 is a communication device configured to exchange communications over the network 905. The network module 914 may be a wireless communication module configured to exchange wireless communications over the network 905. For example, the network module 914 may be a wireless communication device configured to exchange communications over a wireless data channel and a wireless voice channel. In this example, the network module 914 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 914 also may be a wired communication module configured to exchange communications over the network 905 using a wired connection. For instance, the network module 914 may be a modem, a network interface card, or another type of network interface device. The network module 914 may be an Ethernet network card configured to enable the control unit 910 to communicate over a local area network and/or the Internet. The network module 914 also may be a voice band modem configured to enable the alarm panel to communicate over the telephone lines of Plain Old Telephone Systems (POTS).

The control unit system that includes the control unit 910 includes one or more sensors. For example, the monitoring system may include multiple sensors 920. The sensors 920 may include a lock sensor, a contact sensor, a motion sensor, or any other type of sensor included in a control unit system. The sensors 920 also may include an environmental sensor, such as a temperature sensor, a water sensor, a rain sensor, a wind sensor, a light sensor, a smoke detector, a carbon monoxide detector, an air quality sensor, etc. The sensors 920 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 920 can also include a radio-frequency identification (RFID) sensor that identifies a particular article that includes a pre-assigned RFID tag.

The control unit 910 communicates with the home automation controls 922 and a camera 930 to perform monitoring. The home automation controls 922 are connected to one or more devices that enable automation of actions in the home. For instance, the home automation controls 922 may be connected to one or more lighting systems and may be configured to control operation of the one or more lighting systems. In addition, the home automation controls 922 may be connected to one or more electronic locks at the home and may be configured to control operation of the one or more electronic locks (e.g., control Z-Wave locks using wireless communications in the Z-Wave protocol). Further, the home automation controls 922 may be connected to one or more appliances at the home and may be configured to control operation of the one or more appliances. The home automation controls 922 may include multiple modules that are each specific to the type of device being controlled in an automated manner. The home automation controls 922 may control the one or more devices based on commands received from the control unit 910. For instance, the home automation controls 922 may cause a lighting system to illuminate an area to provide a better image of the area when captured by a camera 930.

The camera 930 may be a video/photographic camera or other type of optical sensing device configured to capture images. For instance, the camera 930 may be configured to capture images of an area within a building or home monitored by the control unit 910. The camera 930 may be configured to capture single, static images of the area and also video images of the area in which multiple images of the area are captured at a relatively high frequency (e.g., thirty images per second). The camera 930 may be controlled based on commands received from the control unit 910.

The camera 930 may be triggered by several different types of techniques. For instance, a Passive Infra-Red (PIR) motion sensor may be built into the camera 930 and used to trigger the camera 930 to capture one or more images when motion is detected. The camera 930 also may include a microwave motion sensor built into the camera and used to trigger the camera 930 to capture one or more images when motion is detected. The camera 930 may have a "normally open" or "normally closed" digital input that can trigger capture of one or more images when external sensors (e.g., the sensors 920, PIR, door/window, etc.) detect motion or other events. In some implementations, the camera 930 receives a command to capture an image when external devices detect motion or another potential alarm event. The camera 930 may receive the command from the controller 912 or directly from one of the sensors 920.

In some examples, the camera 930 triggers integrated or external illuminators (e.g., Infra-Red, Z-wave controlled "white" lights, lights controlled by the home automation controls 922, etc.) to improve image quality when the scene is dark. An integrated or separate light sensor may be used to determine if illumination is desired and may result in increased image quality.

The camera 930 may be programmed with any combination of time/day schedules, system "arming state", or other variables to determine whether images should be captured or not when triggers occur. The camera 930 may enter a low-power mode when not capturing images. In this case, the camera 930 may wake periodically to check for inbound messages from the controller 912. The camera 930 may be powered by internal, replaceable batteries if located remotely from the control unit 910. The camera 930 may employ a small solar cell to recharge the battery when light is available. Alternatively, the camera 930 may be powered by the controller 912's power supply if the camera 930 is co-located with the controller 912.

In some implementations, the camera 930 communicates directly with the monitoring server 960 over the Internet. In these implementations, image data captured by the camera 930 does not pass through the control unit 910 and the camera 930 receives commands related to operation from the monitoring server 960.

The system 900 also includes thermostat 934 to perform dynamic environmental control at the home. The thermostat 934 is configured to monitor temperature and/or energy consumption of an HVAC system associated with the thermostat 934, and is further configured to provide control of environmental (e.g., temperature) settings. In some implementations, the thermostat 934 can additionally or alternatively receive data relating to activity at a home and/or environmental data at a home, e.g., at various locations indoors and outdoors at the home. The thermostat 934 can directly measure energy consumption of the HVAC system associated with the thermostat, or can estimate energy consumption of the HVAC system associated with the thermostat 934, for example, based on detected usage of one or more components of the HVAC system associated with the thermostat 934. The thermostat 934 can communicate temperature and/or energy monitoring information to or from the control unit 910 and can control the environmental (e.g., temperature) settings based on commands received from the control unit 910.

In some implementations, the thermostat 934 is a dynamically programmable thermostat and can be integrated with the control unit 910. For example, the dynamically programmable thermostat 934 can include the control unit 910, e.g., as an internal component to the dynamically programmable thermostat 934. In addition, the control unit 910 can be a gateway device that communicates with the dynamically programmable thermostat 934. In some implementations, the thermostat 934 is controlled via one or more home automation controls 922.

A module 937 is connected to one or more components of an HVAC system associated with a home, and is configured to control operation of the one or more components of the HVAC system. In some implementations, the module 937 is also configured to monitor energy consumption of the HVAC system components, for example, by directly measuring the energy consumption of the HVAC system components or by estimating the energy usage of the one or more HVAC system components based on detecting usage of components of the HVAC system. The module 937 can communicate energy monitoring information and the state of the HVAC system components to the thermostat 934 and can control the one or more components of the HVAC system based on commands received from the thermostat 934.

In some examples, the system 900 further includes one or more robotic devices 990. The robotic devices 990 may be any type of robots that are capable of moving and taking actions that assist in home monitoring. For example, the robotic devices 990 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 990 may be devices that are intended for other purposes and merely associated with the system 900 for use in appropriate circumstances. For instance, a robotic vacuum cleaner device may be associated with the monitoring system 900 as one of the robotic devices 990 and may be controlled to take action responsive to monitoring system events.

In some examples, the robotic devices 990 automatically navigate within a home. In these examples, the robotic devices 990 include sensors and control processors that guide movement of the robotic devices 990 within the home. For instance, the robotic devices 990 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 990 may include control processors that process output from the various sensors and control the robotic devices 990 to move along a path that reaches the desired destination and avoids obstacles. In this regard, the control processors detect walls or other obstacles in the home and guide movement of the robotic devices 990 in a manner that avoids the walls and other obstacles.

In addition, the robotic devices 990 may store data that describes attributes of the home. For instance, the robotic devices 990 may store a floorplan and/or a three-dimensional model of the home that enables the robotic devices 990 to navigate the home. During initial configuration, the robotic devices 990 may receive the data describing attributes of the home, determine a frame of reference to the data (e.g., a home or reference location in the home), and navigate the home based on the frame of reference and the data describing attributes of the home. Further, initial configuration of the robotic devices 990 also may include learning of one or more navigation patterns in which a user provides input to control the robotic devices 990 to perform a specific navigation action (e.g., fly to an upstairs bedroom and spin around while capturing video and then return to a home charging base). In this regard, the robotic devices 990 may learn and store the navigation patterns such that the robotic devices 990 may automatically repeat the specific navigation actions upon a later request.

In some examples, the robotic devices 990 may include data capture and recording devices. In these examples, the robotic devices 990 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 990 to take and store a biometric sample that can be used to identify the person (e.g., a biometric sample with DNA that can be used for DNA testing).

In some implementations, the robotic devices 990 may include output devices. In these implementations, the robotic devices 990 may include one or more displays, one or more speakers, and/or any type of output devices that allow the robotic devices 990 to communicate information to a nearby user.

The robotic devices 990 also may include a communication module that enables the robotic devices 990 to communicate with the control unit 910, each other, and/or other devices. The communication module may be a wireless communication module that allows the robotic devices 990 to communicate wirelessly. For instance, the communication module may be a Wi-Fi module that enables the robotic devices 990 to communicate over a local wireless network at the home. The communication module further may be a 900 MHz wireless communication module that enables the robotic devices 990 to communicate directly with the control unit 910. Other types of short-range wireless communication protocols, such as Bluetooth, Bluetooth LE, Z-wave, Zigbee, etc., may be used to allow the robotic devices 990 to communicate with other devices in the home. In some implementations, the robotic devices 990 may communicate with each other or with other devices of the system 900 through the network 905.

The robotic devices 990 further may include processor and storage capabilities. The robotic devices 990 may include any suitable processing devices that enable the robotic devices 990 to operate applications and perform the actions described throughout this disclosure. In addition, the robotic devices 990 may include solid-state electronic storage that enables the robotic devices 990 to store applications, configuration data, collected sensor data, and/or any other type of information available to the robotic devices 990.

The robotic devices 990 are associated with one or more charging stations. The charging stations may be located at predefined home base or reference locations in the home. The robotic devices 990 may be configured to navigate to the charging stations after completion of tasks needed to be performed for the monitoring system 900. For instance, after completion of a monitoring operation or upon instruction by the control unit 910, the robotic devices 990 may be configured to automatically fly to and land on one of the charging stations. In this regard, the robotic devices 990 may automatically maintain a fully charged battery in a state in which the robotic devices 990 are ready for use by the monitoring system 900.

The charging stations may be contact based charging stations and/or wireless charging stations. For contact based charging stations, the robotic devices 990 may have readily accessible points of contact that the robotic devices 990 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 990 may charge through a wireless exchange of power. In these cases, the robotic devices 990 need only locate themselves closely enough to the wireless charging stations for the wireless exchange of power to occur. In this regard, the positioning needed to land at a predefined home base or reference location in the home may be less precise than with a contact based charging station. Based on the robotic devices 990 landing at a wireless charging station, the wireless charging station outputs a wireless signal that the robotic devices 990 receive and convert to a power signal that charges a battery maintained on the robotic devices 990.

In some implementations, each of the robotic devices 990 has a corresponding and assigned charging station such that the number of robotic devices 990 equals the number of charging stations. In these implementations, the robotic devices 990 always navigate to the specific charging station assigned to that robotic device. For instance, a first robotic device may always use a first charging station and a second robotic device may always use a second charging station.

In some examples, the robotic devices 990 may share charging stations. For instance, the robotic devices 990 may use one or more community charging stations that are capable of charging multiple robotic devices 990. The community charging station may be configured to charge multiple robotic devices 990 in parallel. The community charging station may be configured to charge multiple robotic devices 990 in serial such that the multiple robotic devices 990 take turns charging and, when fully charged, return to a predefined home base or reference location in the home that is not associated with a charger. The number of community charging stations may be less than the number of robotic devices 990.

In addition, the charging stations may not be assigned to specific robotic devices 990 and may be capable of charging any of the robotic devices 990. In this regard, the robotic devices 990 may use any suitable, unoccupied charging station when not in use. For instance, when one of the robotic devices 990 has completed an operation or is in need of battery charge, the control unit 910 references a stored table of the occupancy status of each charging station and instructs the robotic device to navigate to the nearest charging station that is unoccupied.

The system 900 further includes one or more integrated security devices 980. The one or more integrated security devices may include any type of device used to provide alerts based on received sensor data. For instance, the one or more control units 910 may provide one or more alerts to the one or more integrated security input/output devices 980. Additionally, the one or more control units 910 may receive one or more sensor data from the sensors 920 and determine whether to provide an alert to the one or more integrated security input/output devices 980.

The sensors 920, the home automation controls 922, the camera 930, the thermostat 934, and the integrated security devices 980 may communicate with the controller 912 over communication links 924, 926, 928, 932, 938, and 984. The communication links 924, 926, 928, 932, 938, and 984 may be a wired or wireless data pathway configured to transmit signals from the sensors 920, the home automation controls 922, the camera 930, the thermostat 934, and the integrated security devices 980 to the controller 912. The sensors 920, the home automation controls 922, the camera 930, the thermostat 934, and the integrated security devices 980 may continuously transmit sensed values to the controller 912, periodically transmit sensed values to the controller 912, or transmit sensed values to the controller 912 in response to a change in a sensed value.

The communication links 924, 926, 928, 932, 938, and 984 may include a local network. The sensors 920, the home automation controls 922, the camera 930, the thermostat 934, and the integrated security devices 980, and the controller 912 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 960 is an electronic device configured to provide monitoring services by exchanging electronic communications with the control unit 910, the one or more user devices 940 and 950, and the central alarm station server 970 over the network 905. For example, the monitoring server 960 may be configured to monitor events generated by the control unit 910. In this example, the monitoring server 960 may exchange electronic communications with the network module 914 included in the control unit 910 to receive information regarding events detected by the control unit 910. The monitoring server 960 also may receive information regarding events from the one or more user devices 940 and 950.

In some examples, the monitoring server 960 may route alert data received from the network module 914 or the one or more user devices 940 and 950 to the central alarm station server 970. For example, the monitoring server 960 may transmit the alert data to the central alarm station server 970 over the network 905.

The monitoring server 960 may store sensor and image data received from the monitoring system and perform analysis of sensor and image data received from the monitoring system. Based on the analysis, the monitoring server 960 may communicate with and control aspects of the control unit 910 or the one or more user devices 940 and 950.

The monitoring server 960 may provide various monitoring services to the system 900. For example, the monitoring server 960 may analyze the sensor, image, and other data to determine an activity pattern of a resident of the home monitored by the system 900. In some implementations, the monitoring server 960 may analyze the data for alarm conditions or may determine and perform actions at the home by issuing commands to one or more of the controls 922, possibly through the control unit 910.

The monitoring server 960 can be configured to provide information (e.g., activity patterns) related to one or more residents of the home monitored by the system 900. For example, one or more of the sensors 920, the home automation controls 922, the camera 930, the thermostat 934, and the integrated security devices 980 can collect data related to a resident including location information (e.g., if the resident is home or is not home) and provide location information to the thermostat 934.

The central alarm station server 970 is an electronic device configured to provide alarm monitoring service by exchanging communications with the control unit 910, the one or more user devices 940 and 950, and the monitoring server 960 over the network 905. For example, the central alarm station server 970 may be configured to monitor alerting events generated by the control unit 910. In this example, the central alarm station server 970 may exchange communications with the network module 914 included in the control unit 910 to receive information regarding alerting events detected by the control unit 910. The central alarm station server 970 also may receive information regarding alerting events from the one or more user devices 940 and 950 and/or the monitoring server 960.

The central alarm station server 970 is connected to multiple terminals 972 and 974. The terminals 972 and 974 may be used by operators to process alerting events. For example, the central alarm station server 970 may route alerting data to the terminals 972 and 974 to enable an operator to process the alerting data. The terminals 972 and 974 may include general-purpose computers (e.g., desktop personal computers, workstations, or laptop computers) that are configured to receive alerting data from a server in the central alarm station server 970 and render a display of information based on the alerting data. For instance, the controller 912 may control the network module 914 to transmit, to the central alarm station server 970, alerting data indicating that a sensor 920 detected motion from a motion sensor via the sensors 920. The central alarm station server 970 may receive the alerting data and route the alerting data to the terminal 972 for processing by an operator associated with the terminal 972. The terminal 972 may render a display to the operator that includes information associated with the alerting event (e.g., the lock sensor data, the motion sensor data, the contact sensor data, etc.) and the operator may handle the alerting event based on the displayed information.

In some implementations, the terminals 972 and 974 may be mobile devices or devices designed for a specific function. Although FIG. 9 illustrates two terminals for brevity, actual implementations may include more (and, perhaps, many more) terminals.

The one or more authorized user devices 940 and 950 are devices that host and display user interfaces. For instance, the user device 940 is a mobile device that hosts or runs one or more native applications (e.g., the home monitoring application 942). The user device 940 may be a cellular phone or a non-cellular locally networked device with a display. The user device 940 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 940 may perform functions unrelated to the monitoring system, such as placing personal telephone calls, playing music, playing video, displaying pictures, browsing the Internet, maintaining an electronic calendar, etc.

The user device 940 includes a home monitoring application 952. The home monitoring application 942 refers to a software/firmware program running on the corresponding mobile device that enables the user interface and features described throughout. The user device 940 may load or install the home monitoring application 942 based on data received over a network or data received from local media. The home monitoring application 942 runs on mobile devices platforms, such as iPhone, iPod touch, Blackberry, Google Android, Windows Mobile, etc. The home monitoring application 942 enables the user device 940 to receive and process image and sensor data from the monitoring system.

The user device 940 may be a general-purpose computer (e.g., a desktop personal computer, a workstation, or a laptop computer) that is configured to communicate with the monitoring server 960 and/or the control unit 910 over the network 905. The user device 940 may be configured to display a smart home user interface 952 that is generated by the user device 940 or generated by the monitoring server 960. For example, the user device 940 may be configured to display a user interface (e.g., a web page) provided by the monitoring server 960 that enables a user to perceive images captured by the camera 930 and/or reports related to the monitoring system. Although FIG. 9 illustrates two user devices for brevity, actual implementations may include more (and, perhaps, many more) or fewer user devices.

In some implementations, the one or more user devices 940 and 950 communicate with and receive monitoring system data from the control unit 910 using the communication link 938. For instance, the one or more user devices 940 and 950 may communicate with the control unit 910 using various local wireless protocols such as Wi-Fi, Bluetooth, Z-wave, Zigbee, HomePlug (ethernet over power line), or wired protocols such as Ethernet and USB, to connect the one or more user devices 940 and 950 to local security and automation equipment. The one or more user devices 940 and 950 may connect locally to the monitoring system and its sensors and other devices. The local connection may improve the speed of status and control communications because communicating through the network 905 with a remote server (e.g., the monitoring server 960) may be significantly slower.

Although the one or more user devices 940 and 950 are shown as communicating with the control unit 910, the one or more user devices 940 and 950 may communicate directly with the sensors and other devices controlled by the control unit 910. In some implementations, the one or more user devices 940 and 950 replace the control unit 910 and perform the functions of the control unit 910 for local monitoring and long range/offsite communication.

In other implementations, the one or more user devices 940 and 950 receive monitoring system data captured by the control unit 910 through the network 905. The one or more user devices 940, 950 may receive the data from the control unit 910 through the network 905 or the monitoring server 960 may relay data received from the control unit 910 to the one or more user devices 940 and 950 through the network 905. In this regard, the monitoring server 960 may facilitate communication between the one or more user devices 940 and 950 and the monitoring system.

In some implementations, the one or more user devices 940 and 950 may be configured to switch whether the one or more user devices 940 and 950 communicate with the control unit 910 directly (e.g., through link 938) or through the monitoring server 960 (e.g., through network 905) based on a location of the one or more user devices 940 and 950. For instance, when the one or more user devices 940 and 950 are located close to the control unit 910 and in range to communicate directly with the control unit 910, the one or more user devices 940 and 950 use direct communication. When the one or more user devices 940 and 950 are located far from the control unit 910 and not in range to communicate directly with the control unit 910, the one or more user devices 940 and 950 use communication through the monitoring server 960.

Although the one or more user devices 940 and 950 are shown as being connected to the network 905, in some implementations, the one or more user devices 940 and 950 are not connected to the network 905. In these implementations, the one or more user devices 940 and 950 communicate directly with one or more of the monitoring system components and no network (e.g., Internet) connection or reliance on remote servers is needed.

In some implementations, the one or more user devices 940 and 950 are used in conjunction with only local sensors and/or local devices in a house. In these implementations, the system 900 includes the one or more user devices 940 and 950, the sensors 920, the home automation controls 922, the camera 930, and the robotic devices 990. The one or more user devices 940 and 950 receive data directly from the sensors 920, the home automation controls 922, the camera 930, and the robotic devices 990, and sends data directly to the sensors 920, the home automation controls 922, the camera 930, and the robotic devices 990. The one or more user devices 940, 950 provide the appropriate interfaces/processing to provide visual surveillance and reporting.

In other implementations, the system 900 further includes network 905 and the sensors 920, the home automation controls 922, the camera 930, the thermostat 934, and the robotic devices 990, and are configured to communicate sensor and image data to the one or more user devices 940 and 950 over network 905 (e.g., the Internet, cellular network, etc.). In yet another implementation, the sensors 920, the home automation controls 922, the camera 930, the thermostat 934, and the robotic devices 990 (or a component, such as a bridge/router) are intelligent enough to change the communication pathway from a direct local pathway when the one or more user devices 940 and 950 are in close physical proximity to the sensors 920, the home automation controls 922, the camera 930, the thermostat 934, and the robotic devices 990 to a pathway over network 905 when the one or more user devices 940 and 950 are farther from the sensors 920, the home automation controls 922, the camera 930, the thermostat 934, and the robotic devices 990.

In some examples, the system leverages GPS information from the one or more user devices 940 and 950 to determine whether the one or more user devices 940 and 950 are close enough to the sensors 920, the home automation controls 922, the camera 930, the thermostat 934, and the robotic devices 990 to use the direct local pathway or whether the one or more user devices 940 and 950 are far enough from the sensors 920, the home automation controls 922, the camera 930, the thermostat 934, and the robotic devices 990 that the pathway over network 905 is required.

In other examples, the system leverages status communications (e.g., pinging) between the one or more user devices 940 and 950 and the sensors 920, the home automation controls 922, the camera 930, the thermostat 934, and the robotic devices 990 to determine whether communication using the direct local pathway is possible. If communication using the direct local pathway is possible, the one or more user devices 940 and 950 communicate with the sensors 920, the home automation controls 922, the camera 930, the thermostat 934, and the robotic devices 990 using the direct local pathway. If communication using the direct local pathway is not possible, the one or more user devices 940 and 950 communicate with the sensors 920, the home automation controls 922, the camera 930, the thermostat 934, and the robotic devices 990 using the pathway over network 905.

In some implementations, the system 900 provides end users with access to images captured by the camera 930 to aid in decision making. The system 900 may transmit the images captured by the camera 930 over a wireless WAN network to the user devices 940 and 950. Because transmission over a wireless WAN network may be relatively expensive, the system 900 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 930). In these implementations, the camera 930 may be set to capture images on a periodic basis when the alarm system is armed in an "away" state, but set not to capture images when the alarm system is armed in a "home" state or disarmed. In addition, the camera 930 may be triggered to begin capturing images when the alarm system detects an event, such as an alarm event, a door-opening event for a door that leads to an area within a field of view of the camera 930, or motion in the area within the field of view of the camera 930. In other implementations, the camera 930 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining images captured by a camera, the images depicting an area of a property;
identifying landmarks in the area based on the images;
determining an expected stability for each of the landmarks including one or more values indicating a likelihood that a given landmark will move or stay in place;
generating a map for the area based on the expected stability for each of the landmarks; and
transmitting the map to one or more electronic devices.

2. The method of claim 1, wherein obtaining images captured by the camera comprises obtaining a set of images captured by a camera of a drone flying in the property.

3. The method of claim 1, wherein obtaining images captured by the camera comprises obtaining a set of images captured from a particular location in the property, the set of images including images corresponding to different perspectives of the camera.

4. The method of claim 1, wherein identifying the landmarks in the area comprises identifying an object or a surface of an object using one or more algorithms,
wherein the object or the surface of the object is a landmark of the landmarks.

5. The method of claim 4, wherein identifying the object or the surface of an object using the one or more algorithms comprises performing object localization on the images using at least one algorithm of the one or more algorithms to identify one or more of the following:
discrete objects in the area of the property based on the images;
discrete surfaces of particular objects in the area of the property based on the images; or
an area corresponding to discrete objects in the area of the property based on the images.

6. The method of claim 4, wherein identifying the object or the surface of an object using the one or more algorithms comprises classifying the object or the surface of an object using at least one algorithm of the one or more algorithms, and
wherein:
classifying the object or the surface of an object comprises classifying the object or the surface of an object as belonging to a type of object, and determining the expected stability for each of the landmarks comprises determining the expected stability for the object or the surface of an object based on the type of object.

7. The method of claim 4, wherein identifying the object or the surface of an object using the one or more algorithms comprises classifying the object or the surface of an object using at least one algorithm of the one or more algorithms, and
wherein:
classifying the object or the surface of an object comprises classifying the object or the surface of an object as planar or non-planar, and
determining the expected stability for each of the landmarks comprises determining the expected stability for the object or the surface of an object based on the planar classification or the non-planar classification.

8. The method of claim 4, wherein identifying the object or the surface of an object using the one or more algorithms comprises performing scene segmentation on the images using at least one algorithm of the one or more algorithms to identify one or more of the following:
discrete objects in the area of the property based on the images;
discrete surfaces of particular objects in the area of the property based on the images;
individual areas each corresponding to only a single discrete object in the area of the property based on the images; or
individual areas each corresponding to only a single discrete surface of particular objects in the area of the property based on the images.

9. The method of claim 1, wherein identifying the landmarks in the area comprises identifying groupings of related surfaces.

10. The method of claim 9, wherein identifying groupings of related surfaces comprises identifying one or more of the following:
surfaces that are within a threshold distance from one another;
surfaces that are adjacent to one another;
surfaces that are coplanar;
surfaces that are observed as having the same or substantially the same color; or
surfaces that are in contact with one another.

11. The method of claim 9, wherein identifying groupings of related surfaces comprises identifying groupings of surfaces that each correspond to a particular object or a portion of a particular object in the area of the property.

12. The method of claim 1, wherein determining the expected stability for each of the landmarks comprises:
determining a reliability score for each of the landmarks that corresponds to consistency in location of objects or surfaces of objects over time;
determining a stability score for each of the landmarks that corresponds to consistency in appearance of objects or surfaces of objects across viewpoint locations; and
calculating the expected stability using the reliability score and the stability score.

13. The method of claim 12, wherein determining the reliability score for each of the landmarks comprises:
determining reliability scores for features of each of the landmarks; and
determining the reliability score from the reliability scores for the features of each of the landmarks.

14. The method of claim 12, wherein determining the reliability score for each of the landmarks comprises determining the reliability score for each of the landmarks based one on or more of the following:
frequency that a landmark or a portion of a landmark changes position;
frequency that a landmark or a portion of a landmark changes appearance;
level of uncertainty associated with a landmark or a portion of a landmark; or
a classification of a landmark.

15. The method of claim 12, wherein determining the stability score for each of the landmarks comprises determining the stability score for each of the landmarks based one on or more of the following:
number of vantage points that a landmark or a portion of a landmark is capable of being viewed from with respect to the camera;
variability in appearance of a landmark or a portion of a landmark from different perspectives of the camera or different vantage points;
maximum distance from which a landmark or a portion of a landmark is capable of being viewed from with respect to the camera;
magnitude of parallax observed with a landmark or a portion of a landmark;
level of uncertainty associated with a landmark or a portion of a landmark;
a classification of a landmark; or
prevalence of planar surfaces of a landmark or a portion of a landmark.

16. The method of claim 12, wherein determining the stability score for each of the landmarks comprises determining that the landmark or a surface of the landmark is planar by:
identifying a set of interest points corresponding to the landmark or to a surface of the landmark; and
determining that a threshold percent of the interest points are coplanar.

17. The method of claim 1, comprising comparing the expected stability for each of the landmarks to a minimum level of stability to identify a subset of landmarks that meet the minimum level of stability,
wherein generating the map for the area comprises:
generating a map for the area that includes representations of only the landmarks in the subset of landmarks; or
generating a map for the area that includes representations of the landmarks in the subset of landmarks, the representations tagged to indicate that the corresponding landmarks have a sufficient level of stability.

18. The method of claim 17, wherein comparing the expected stability for each of the landmarks to the minimum level of stability comprises:
comparing reliability scores for the landmarks to a threshold reliability score to identify the subset of landmarks that meet the threshold reliability score; and
comparing stability scores for the landmarks to a threshold stability score to identify the subset of landmarks that meet the threshold stability score.

19. The method of claim 1, wherein the one or more values indicating a likelihood that the given landmark will move or stay in place indicate one or more of the following: a number of vantage points that the given landmark or a portion of the given landmark is capable of being viewed; a variability in appearance of the given landmark or a portion of the given landmark; a maximum distance from which the given landmark or a portion of the given landmark is capable of being viewed; a magnitude of parallax observed with the given landmark or a portion of the given landmark; a level of uncertainty associated with the given landmark or a portion of the given landmark; a classification of the given landmark; or a prevalence of planar surfaces of the given landmark or a portion of the given landmark.

20. A system comprising:
one or more computers; and
one or more computer-readable media storing instructions that, when executed, cause the one or more computers to perform operations comprising:
  obtaining images captured by a camera, the images depicting an area of a property;
  identifying landmarks in the area based on the images;
  determining an expected stability for each of the landmarks including one or more values indicating a likelihood that a given landmark will move or stay in place;
  generating a map for the area based on the expected stability for each of the landmarks; and
  transmitting the map to one or more electronic devices.

21. One or more non-transitory computer-readable media storing instructions that, when executed by one or more computers, cause the one or more computers to perform operations comprising:
  obtaining images captured by a camera, the images depicting an area of a property;
  identifying landmarks in the area based on the images;
  determining an expected stability for each of the landmarks including one or more values indicating a likelihood that a given landmark will move or stay in place;
  generating a map for the area based on the expected stability for each of the landmarks; and
  transmitting the map to one or more electronic devices.

* * * * *

UNITED STATES PATENT AND TRADEMARK OFFICE
CERTIFICATE OF CORRECTION

PATENT NO. : 11,640,677 B2
APPLICATION NO. : 17/071680
DATED : May 2, 2023
INVENTOR(S) : Daniel Todd Kerzner et al.

Page 1 of 1

It is certified that error appears in the above-identified patent and that said Letters Patent is hereby corrected as shown below:

In the Claims

In Claim 14, Column 72, Line 4, delete "one on" and insert -- on one --.

In Claim 15, Column 72, Line 15, delete "one on" and insert -- on one --.

Signed and Sealed this
Thirteenth Day of June, 2023

Katherine Kelly Vidal
*Director of the United States Patent and Trademark Office*